(12) United States Patent
Lee et al.

(10) Patent No.: US 8,487,064 B2
(45) Date of Patent: *Jul. 16, 2013

(54) POLYMER COMPOUNDS AND A PREPARATION METHOD THEREOF

(75) Inventors: Young Moo Lee, Seoul (KR); Ho-Bum Park, Seoul (KR); Chul-Ho Jung, Gwangju (KR); Sang-Hoon Han, Seoul (KR)

(73) Assignee: Industry-University Cooperation Foundation, Hanyang University, Seoul (KR)

( * ) Notice: Subject to any disclaimer, the term of this patent is extended or adjusted under 35 U.S.C. 154(b) by 88 days.

This patent is subject to a terminal disclaimer.

(21) Appl. No.: 13/112,586

(22) Filed: May 20, 2011

(65) Prior Publication Data

US 2011/0306687 A1 Dec. 15, 2011

Related U.S. Application Data

(63) Continuation-in-part of application No. 12/249,159, filed on Oct. 10, 2008, now Pat. No. 8,013,103.

(51) Int. Cl.
*C08G 73/22* (2006.01)
*C08G 73/06* (2006.01)
*C08G 73/18* (2006.01)

(52) U.S. Cl.
USPC ........... 528/183; 528/184; 528/185; 528/310; 528/322

(58) Field of Classification Search
None
See application file for complete search history.

(56) References Cited

U.S. PATENT DOCUMENTS

| | | | |
|---|---|---|---|
| 3,461,096 A | 8/1969 | Rabilloud et al. | |
| 3,532,673 A | 10/1970 | Bell, Jr. et al. | |
| 3,598,786 A | 8/1971 | Yoda et al. | |
| 4,087,409 A | 5/1978 | Preston | |
| 4,820,793 A | 4/1989 | Imai et al. | |
| 4,978,733 A | 12/1990 | Khanna | |
| 4,980,447 A | 12/1990 | Khanna | |
| 5,030,706 A | 7/1991 | Harris et al. | |
| 5,071,948 A | 12/1991 | Khanna | |
| 5,120,825 A | 6/1992 | Vora et al. | |
| 5,173,561 A | 12/1992 | Gupta | |
| 5,262,056 A | 11/1993 | Koros et al. | |
| 5,494,991 A | 2/1996 | Kaneko et al. | |

(Continued)

FOREIGN PATENT DOCUMENTS

| | | |
|---|---|---|
| JP | 2001-348428 | 12/2001 |
| KR | 10-20060085845 | 7/2006 |

(Continued)

OTHER PUBLICATIONS

Kim et al. "Synthesis and Characterization of Soluble Polyimides Containing Trifluoromethyl Groups in their Backbone" Journal of Polymer Science: Part B: Polymer Physics, 2004, 42, 4303-4312.*

(Continued)

*Primary Examiner* — Robert S Loewe
(74) *Attorney, Agent, or Firm* — Stradley Ronon Stevens & Young, LLP

(57) ABSTRACT

Disclosed herein are polymer compounds and a method for preparing thereof. More specifically, provided are polymer compounds with well-connected, narrow size distribution free-volume element and a method for preparing the polymer compounds by thermal rearrangement for aromatic polyimides containing ortho-positioned functional groups in the solid state.

16 Claims, 12 Drawing Sheets

U.S. PATENT DOCUMENTS

| | | | |
|---|---|---|---|
| 5,525,436 | A | 6/1996 | Savinell et al. |
| 5,716,727 | A | 2/1998 | Savinell et al. |
| 5,723,086 | A | 3/1998 | Ledjeff et al. |
| 5,919,892 | A | 7/1999 | Hwang et al. |
| 5,985,969 | A | 11/1999 | Harris et al. |
| 6,099,988 | A | 8/2000 | Savinell et al. |
| 6,204,356 | B1 | 3/2001 | Saito et al. |
| 6,291,635 | B1 | 9/2001 | Maeda et al. |
| 6,548,621 | B1 | 4/2003 | Tsai et al. |
| 6,602,415 | B2 | 8/2003 | Koros et al. |
| 7,745,516 | B2 | 6/2010 | Dueber et al. |
| 2002/0153315 | A1 | 10/2002 | Koros et al. |
| 2004/0229160 | A1 | 11/2004 | Naiini et al. |
| 2004/0229166 | A1 | 11/2004 | Rushkin et al. |
| 2004/0229167 | A1 | 11/2004 | Naiini et al. |
| 2004/0249110 | A1 | 12/2004 | Naiini et al. |
| 2004/0253537 | A1 | 12/2004 | Rushkin et al. |
| 2004/0253542 | A1 | 12/2004 | Rushkin et al. |
| 2005/0181297 | A1 | 8/2005 | Naiini et al. |
| 2006/0216641 | A1 | 9/2006 | Naiini et al. |
| 2006/0275699 | A1 | 12/2006 | Naiini et al. |
| 2007/0099111 | A1 | 5/2007 | Naiini et al. |
| 2009/0111050 | A1 | 4/2009 | Naiini et al. |
| 2009/0197067 | A1 | 8/2009 | Naiini et al. |
| 2009/0282982 | A1 | 11/2009 | Jung et al. |
| 2009/0286078 | A1 | 11/2009 | Lee et al. |
| 2009/0286904 | A1 | 11/2009 | Lee et al. |
| 2009/0297850 | A1 | 12/2009 | Jung et al. |

FOREIGN PATENT DOCUMENTS

| | | |
|---|---|---|
| KR | 10-0782959 | 12/2007 |
| WO | WO2006/080766 | 8/2006 |
| WO | WO2009107889 | 9/2009 |
| WO | WO2009113747 | 9/2009 |
| WO | WO2009142434 | 11/2009 |

OTHER PUBLICATIONS

Bruma et al, "Fluorinated Poly(benzoxazole-Imide)s" Polymers for Advanced Technologies, vol. 5, Sep. 7, 1993, 535-540.

Burns and Koros, "Structure-Property Relationships for Poly(pyrrolone-imide) Gas Separation Membranes" Macromolecules 2003, 36, 2374-2381.

Chen et al., "2,6-Diamino-4-phenylphenol (DAPP) copolymerized polyimides: synthesis and characterization" Polym. Int., 55 (2006) 93-100.

Doyle et al, "The Structure of the Potassium Channel: Molecular Basis of K+ Conduction and Selectivity" Science, vol. 280, Apr. 3, 1998, 69-77.

Freeman, "Basis of Permeability/Selectivity Tradeoff Relations in Polymeric Gas Separation Membranes" Macromolecules 1999, 32, 375-380.

He et al., "Proton conductivity of phosphoric acid doped polybenzimidazole and its composites with inorganic proton conductors" Journal of Membrane Science 226, (2003) 169-184.

Hickner et al., "Alternative Polymer Systems for Proton Exchange Membranes (PEMs)" Chem. Rev. 2004, 104, 4587-4612.

Ho Bum Park, et al., Polymers with Cavities Tunes for Fast Selective Transport of Small Molecules and Ions, Science 318, 254 (Oct. 12, 2007).

Ho Bum Park, et al., Supporting Online Material for Polymers with Cavities Tunes for Fast Selective Transport of Small Molecules and Ions, Science 318, 254 (Oct. 12, 2007).

Jeong et al., "Biodegradable block copolymers as injectable drug-delivery systems" Nature, vol. 388, Aug. 28, 1997, 860-862.

Jung and Lee "Gas Permeation Properties of Hydroxyl-Group Containing Polyimide Membranes" Macromolecular Research, vol. 16, No. 6, 2008, 555-560.

Khanna & Mueller, "New High Temperature Stable Positive Photoresists Based on Hydroxy Polyimides and Polyamides Containing the Hexafluoroisopropylidene (6-F) Linking Group" Polymer Engineering & Science, Jul. 1989, vol. 29, No. 14, 954-959.

Kozono et al., "Aquaporin Water Channels: Atomic Structure and Molecular Dynamics Meet Clinical Medicine" The Journal of Clinical Investigation, Jun. 2002, vol. 109, No. 11, 1395-1399.

Lai et al. "Microstructural Optimization of a Zeolite Membrane for Organic Vapor Separation" Science, vol. 300, Apr. 18, 2003, 456-460.

Lee et al., "Preparation Method and Characterization of Polyimide-co-Polybenzoxazole Membrane for Gas Separation" The Membrane Society of Korea, 2007, 322-325.

Lightfoot et al., "Crystal Structure of the Polymer Electrolyte Poly-(ethylene oxide)3:LiCF3SO3" Science, vol. 262, Nov. 5, 1993, 883-885.

Lin et al., "Plasticization-Enhanced Hydrogen Purification Using Polymeric Membranes" Science, vol. 311, Feb. 3, 2006, 639-642.

Mercer et al., "Synthesis and Characterization of New Fluorinated Poly(imide benzoxazole)s" High Perform. Polym. 8 (1996) 395-406.

Nagai et al, "Poly[1-(trimethylsilyl)-1-propyne] and related polymers: synthesis, properties and functions" Prog. Polym. Sci. 26, 2001, 721-798.

Okamoto et al, "Gas Permeability and Permselectivity of Fluorinated Polybenzoxazoles" Journal of Polymer Science: Part B: Polymer Physics, vol. 30, (1992) 1215-1221.

Park and Lee, "Fabrication and Characterization of Nanoporous Carbon/Silica Membranes" Advanced Materials 2005, 17, No. 4, 477-483.

Preston et al, "New High-Temperature Polymers. VIII. Ordered Benzoxazole- and Benzothiazole-Imide Copolymers" Journal of Polymer Science: Part A-1, vol. 7, 283-296 (1969).

Robeson, "Correlation of Separation Factor Versus Permeability for Polymeric Membranes" Journal of Membrane Science, 62, (1991) 165-185.

Robeson, "The Upper Bound Revisited" Journal of Membrane Science 320 (2008) 390-400.

Search Report for International Application No. PCT/KR2009/005806 (corresponding with U.S. Appl. No. 12/249,159) dated May 7, 2010 (and partial English language translation of same).

Sundar and Mathias, "Novel Thermooxidatively Stable Poly (ether-imide-benzoxazole) and Poly (ester-imide-benzoxazole)" Journal of Polymer Science: Part A: Polymer Chemistry, vol. 32, 2825-2839 (1994).

Tseitlin et al. "Destruction of Polymers with Benzoxazole and Imide Fragments in the Main Chain" J. Polymer Sci.: Symposium No. 42, (1973) 1305-1312.

Tullos et al., "Thermal Conversion of Hydroxy-Containing Imides to Benzoxazoles: Polymer and Model Compound Study," Macromolecules, 1999, 32, 3598-3612.

Ueda et al, "Synthesis of Poly(benzoxazole)s by Direct Polycondensation of Dicarboxylic Acids with 3,3'-Dihydroxybenzidine Dihydrochloride Using Phosphorous Pentoxide/Methanesulfonic Acid as Condensing Agent and Solvent" Journal of Polymer Science: Part A, Polymer Chemistry, vol. 24, (1986), 1019-1026.

Vasudevan and McGrath, "Atomistic Modeling of Amorphous Aromatic Polybenzoxazoles" Macromolecules 1996, 29, 637-645.

Welsh et al., "Phenylene Group Rotations and Nonplanar Conformations in Some cis- and trans-Poly(benzobisoxazoles) and -Poly(benzobisthiazoles)" Macromolecules, 1981, 14 947-950.

Wilks et al., "Impact of Average Free-Volume Element Size on Transport in Stereoisomers of Polynorbornene. I. Properties at 35° C." Journal of Polymer Science: Part B: Polymer Physics, vol. 41, 2003, 2185-2199.

Wu et al, "Synthesis and Properties of Aromatic Polyimide, Poly(benzoxazole imide), and Poly(benzoxazole amide imide)" Journal of Applied Polymer Science, vol. 113, 2301-2312 (2009).

* cited by examiner

POLYMER COMPOUNDS AND A PREPARATION METHOD THEREOF

CROSS-REFERENCE TO RELATED APPLICATIONS

This application is a continuation-in-part of U.S. patent application Ser. No. 12/249,159 filed Oct. 10, 2008 and entitled "POLYMER COMPOUNDS AND A PREPARATION METHOD THEREOF," the contents of which are incorporated in this application by reference.

BACKGROUND OF THE INVENTION (a) Field of the Invention

The present invention relates to polymer compounds and a preparation method thereof. More specifically, the present invention relates to polymer compounds with well-connected, narrow size distribution free-volume element and a method for preparing the polymer compounds by thermal rearrangement of aromatic polyimides containing ortho-positioned functional groups in the solid state.

(b) Description of the Related Art

Small-molecule and ion diffusion through cavities (i.e., free-volume elements) in soft organic materials is an inherently subnano- or nanoscopic phenomenon. It has important implications for membrane separation processes in chemicals production as well as energy conversion and storage applications [e.g., pharmaceutical separations (B. Jeong et al., Nature 1997, 388, 860), organic batteries (P. Lightfoot et al., Science 1993, 262, 883), fuel cells (M. A. Hickner et al., Chem. Rev. 2004, 104, 4587), and gas separation (H. Lin et al., Science 2006, 311, 639)]. Transport of small gas molecules through polymers occurs by diffusion through transient free-volume elements or cavities formed by random, thermally stimulated motion of the flexible organic chains.

Unlike pore sizes and shapes in rigid microporous inorganic materials such as zeolites (Z. Lai et al., Science 2003, 300, 456) and carbon molecular sieve materials (H. B. Park et al., Adv. Mater. 2005, 17, 477), cavity sizes and shapes are not uniform in amorphous polymers. The cavity radius (r) of the most selective polymers such as polyimides, polysulfones, and polycarbonates, as measured by positron annihilation lifetime spectroscopy (PALS), is 0.3 nm or less with a broad distribution of cavity sizes, and gas permeability is rather low (Y. Yampolskii, I. Pinnau, B. D. Freeman, Materials Science of Membranes for Gas and Vapor Separation (Wiley, London, 2006).

Conversely, the most permeable polymer, poly(1-trimethylsilyl-1-propyne) (PTMSP), exhibits an approximately bimodal cavity size distribution centered at around r=0.3 nm and r=0.6 to 0.7 nm (K. Nagai et al., Polym. Sci. 2001, 26, 721). The high concentration of large cavities and the high connectivity among cavities results in very high permeability for a polymer, but its ability to separate small molecules (kinetic diameter <0.45 nm) is too low to be useful, and the large cavities collapse over time due to physical aging (K. Nagai et al., Polym. Sci. 2001, 26, 721). Thus, among known polymers, free-volume element size and distribution play a key role in determining permeability and separation characteristics. However, the broad size range of free-volume elements in such materials precludes the preparation of polymers having both high permeability and high selectivity.

The inventors of the present invention demonstrate that polymers with an intermediate cavity size, a narrow cavity size distribution, and a shape reminiscent of bottlenecks connecting adjacent chambers, such as those found elegantly in nature in the form of ion channels (D. A. Doyle et al., Science 1998, 280) and aquaporins (D. Kozono et al., Invest. 2002, 109, 1395), yield both high permeability and high selectivity. Central to approach for preparing these intermediate-sized cavities is controlled free-volume element formation through spatial rearrangement of the flat, rigid-rod structure with high-torsional energy barriers to rotation between two rings (V. J. Vasudevan, J. E. McGrath, Macromolecules 1996, 29, 637). The stiff, rigid ring units in such flat topologies pack efficiently, leaving very small penetrant accessible free-volume elements. This tight packing is also promoted by intersegmental interactions such as charge-transfer complexes between heteroatoms containing lone electron pairs (e.g., O, S and N) (W. J. Welsh, D. Bhaumik, J. E. Mark, Macromolecules 1981, 14, 947). The genesis of these materials was the demand for highly thermally and chemically stable polymers. However, their application as gas separation membranes was frustrated by their lack of solubility in common solvents, which effectively prevents them from being prepared as thin membranes by solvent casting, which is the most widely practiced method for membrane preparation.

Consequently, the present inventors suggested that completely aromatic, insoluble, infusible polymers can be prepared from highly soluble precursors by irreversible molecular rearrangement at about 350° C. to 450° C. for aromatic polyimides containing ortho-positioned functional groups (e.g., —OH, —SH and —NH$_2$) [H. B. Park, C. H. Jung, Y. M. Lee et al., Polymers with cavities tuned for fast selective transport of small molecules and ions, Science 2007, 318, 254. 38]. In addition, the present inventors ascertained that aromatic polymers interconnected with heterocyclic rings (e.g., benzoxazole, benzothiazole and benzopyrrolone) showed higher gas permeation performance due to their well-controlled free-volume element formation by thermal rearrangement in the solid state.

SUMMARY OF THE INVENTION

Therefore, the present invention has been made in view of the above problems, and it is an object of the present invention to provide polymer compounds with well-connected cavities, an intermediate cavity size and a narrow cavity size distribution.

It is another object of the present invention to provide a method for preparing the polymer compounds by thermally treating aromatic polyimides containing ortho-positioned functional groups (e.g., polyhydroxyimide, polythiolimide, and polyaminoimide).

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
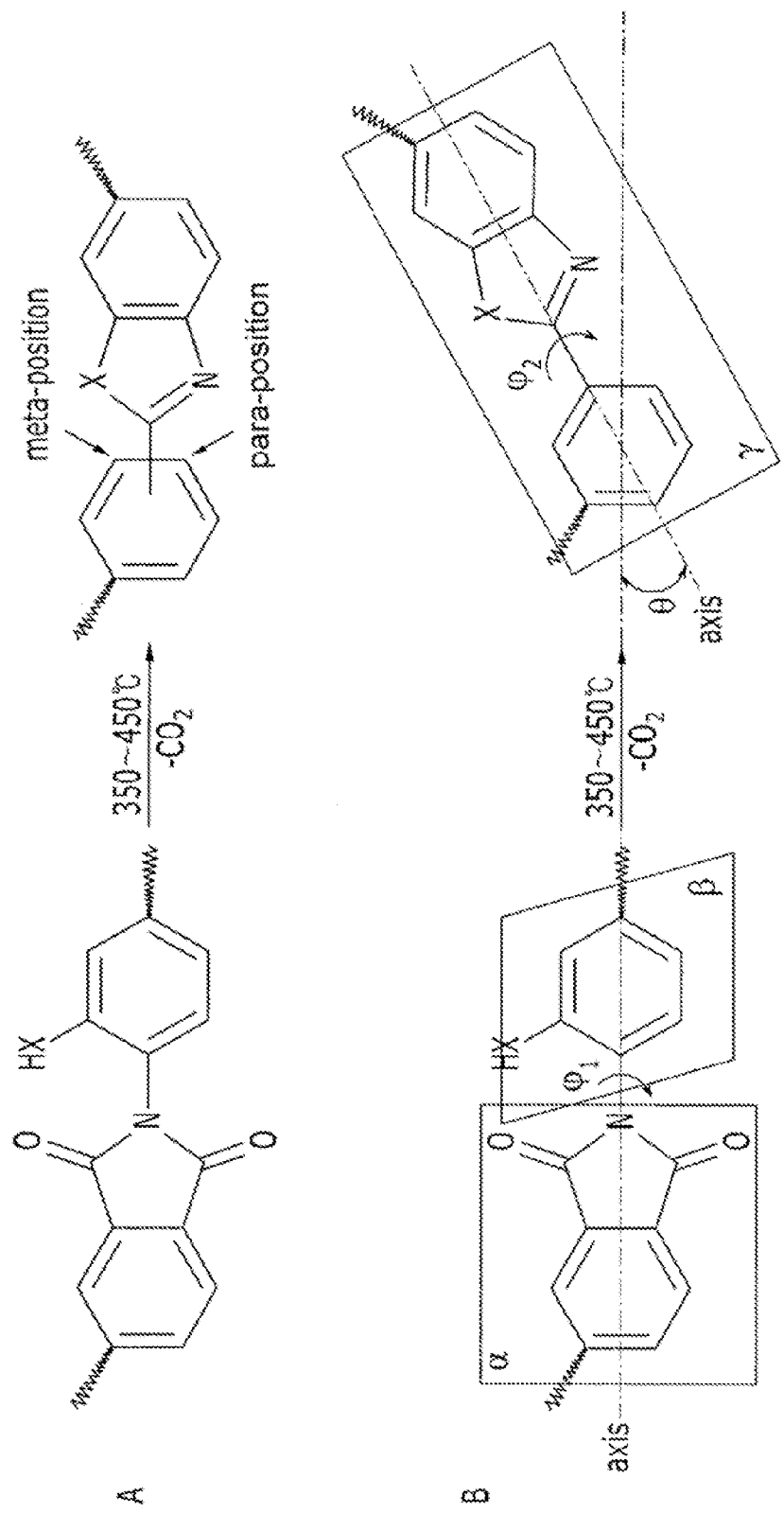
FIG. 1 is showing two types of changes in chain structure occur during the rearrangement.

Hereinafter, the invention will be illustrated in more detail.

In one aspect, the invention is directed to a co-polymer compound comprising at least one repeating unit represented by the following Formulae in Group A and at least one repeating unit represented by the following Formulae in Group B:

Group A:

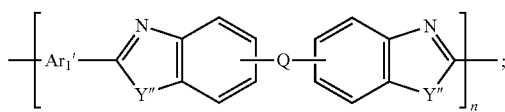

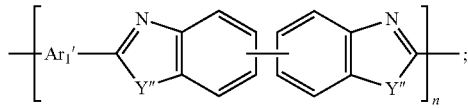

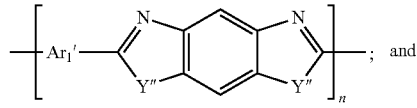

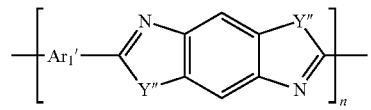

Group B:

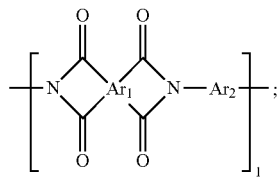

wherein $Ar_1$ is a tetravalent $C_5$-$C_{24}$ arylene group or a tetravalent $C_5$-$C_{24}$ heterocyclic ring, which is substituted or unsubstituted with at least one substituent selected from the group consisting of $C_1$-$C_{10}$ alkyl, $C_1$-$C_{10}$ alkoxy, $C_1$-$C_{10}$ haloalkyl and $C_1$-$C_{10}$ haloalkoxy, or two or more of which are fused together to form a condensation ring or covalently bonded to each other via a functional group selected from the group consisting of O, S, C(=O), CH(OH), S(=O)$_2$, Si(CH$_3$)$_2$, (CH$_2$)$_p$ (in which $1 \leq p \leq 10$), (CF$_2$)$_q$ (in which $1 \leq q \leq 10$), C(CH$_3$)$_2$, C(CF$_3$)$_2$ and C(=O)NH;

$Ar_1'$ is a bivalent $C_5$-$C_{24}$ arylene group or a bivalent $C_5$-$C_{24}$ heterocyclic ring, which is substituted or unsubstituted with at least one substituent selected from the group consisting of $C_1$-$C_{10}$ alkyl, $C_1$-$C_{10}$ alkoxy, $C_1$-$C_{10}$ haloalkyl and $C_1$-$C_{10}$ haloalkoxy, or two or more of which are fused together to form a condensation ring or covalently bonded to each other via a functional group selected from the group consisting of O, S, C(=O), CH(OH), S(=O)$_2$, Si(CH$_3$)$_2$, (CH$_2$)$_p$ (in which $1 \leq p \leq 10$), (CF$_2$)$_q$ (in which $1 \leq q \leq 10$), C(CH$_3$)$_2$, C(CF$_3$)$_2$ and C(=O)NH;

$Ar_2$ is a bivalent $C_5$-$C_{24}$ arylene group or a bivalent $C_5$-$C_{24}$ heterocyclic ring, which is substituted or unsubstituted with at least one substituent selected from the group consisting of $C_1$-$C_{10}$ alkyl, $C_1$-$C_{10}$ alkoxy, $C_1$-$C_{10}$ haloalkyl and $C_1$-$C_{10}$ haloalkoxy, or two or more of which are fused together to form a condensation ring or covalently bonded to each other via a functional group selected from the group consisting of O, S, C(=O), CH(OH), S(=O)$_2$, Si(CH$_3$)$_2$, (CH$_2$)$_p$ (in which $1 \leq p \leq 10$), (CF$_2$)$_q$ (in which $1 \leq q \leq 10$), C(CH$_3$)$_2$, C(CF$_3$)$_2$ and C(=O)NH, provided that $Ar_1'$ and $Ar_2$ are different if either $Ar_1'$ or $Ar_2$ is $C_6H_4$;

Q is O, S, C(=O), CH(OH), S(=O)$_2$, Si(CH$_3$)$_2$, (CH$_2$)$_p$ (in which $1 \leq p \leq 10$), (CF$_2$)$_q$ (in which $1 \leq q \leq 10$), C(CH$_3$)$_2$, C(CF$_3$)$_2$, C(=O)NH, C(CH$_3$)(CF$_3$), $C_1$-$C_6$ alkyl-substituted phenyl or $C_1$-$C_6$ haloalkyl-substituted phenyl in which Q is linked to opposite both phenyl rings in the position of m-m, m-p, p-m or p-p;

Y" is —O or S;

n is an integer from 10 to 400; and l is an integer from 10 to 400.

$Ar_1$ and $Ar_2$ may be the same arylene or heterocyclic ring. Preferably, $Ar_1$ is selected from the following compounds and the linkage position thereof includes all of o-, m- and p-positions.

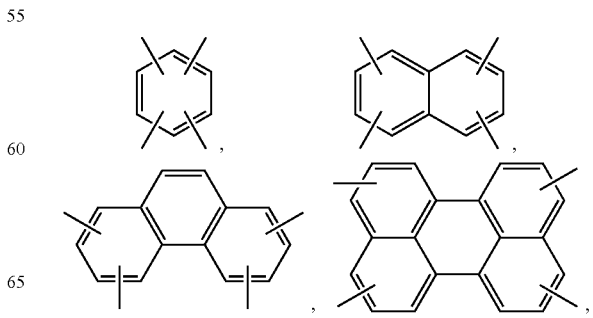

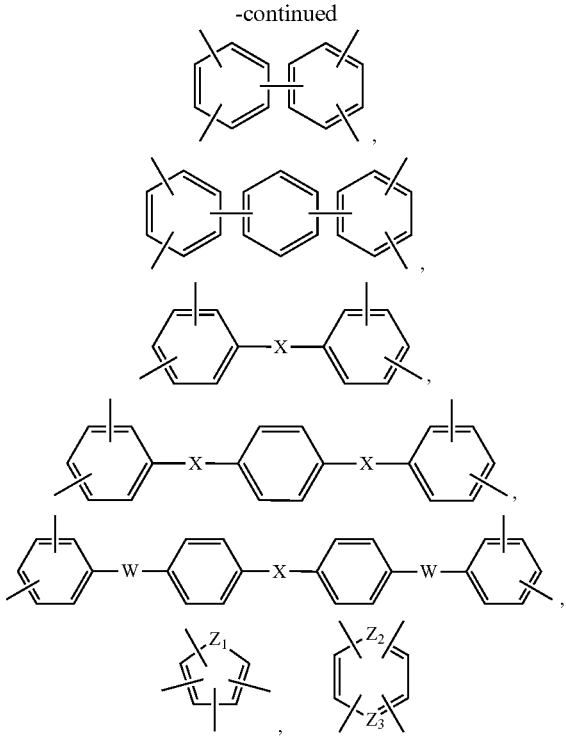
wherein X is O, S, C(=O), CH(OH), S(=O)$_2$, Si(CH$_3$)$_2$, (CH$_2$)$_p$ (in which $1 \leq p \leq 10$), (CF$_2$)$_q$ (in which $1 \leq q \leq 10$), C(CH$_3$)$_2$, C(CF$_3$)$_2$, or C(=O)NH; W is O, S or C(=O); and Z$_1$, Z$_2$ and Z$_3$ are identical to or different from each other and are O, N or S.
More preferably, Ar$_1$ is selected from the following compounds:
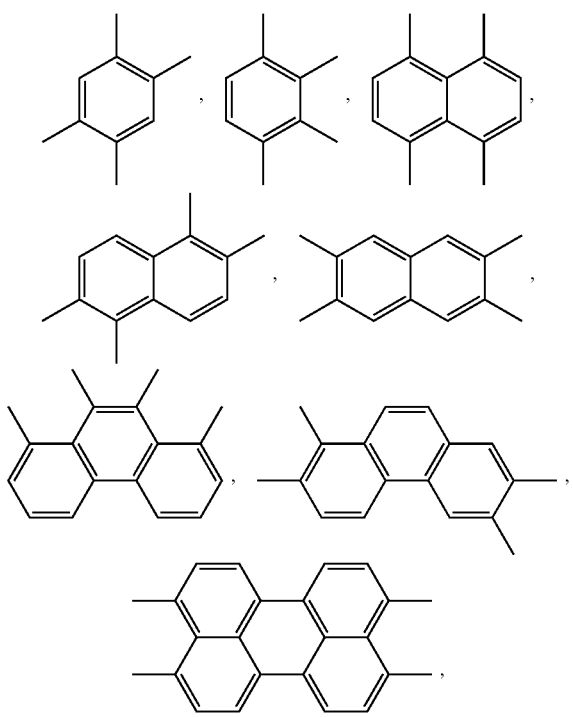
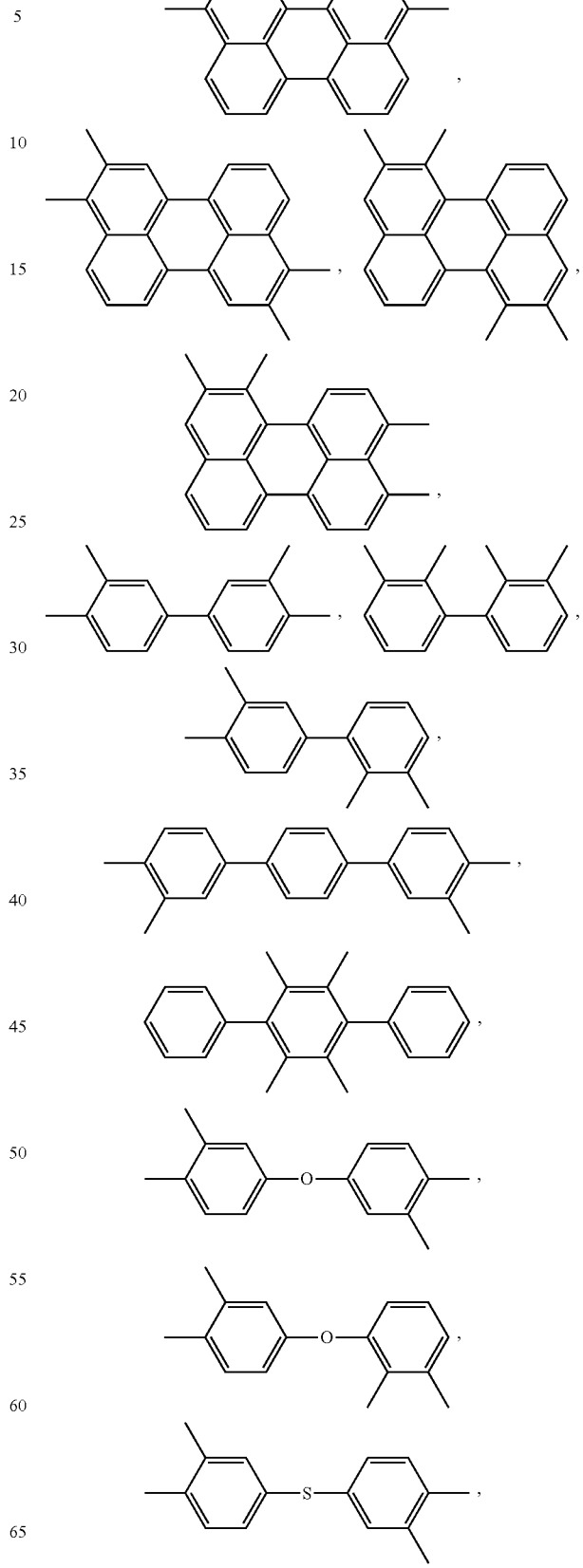

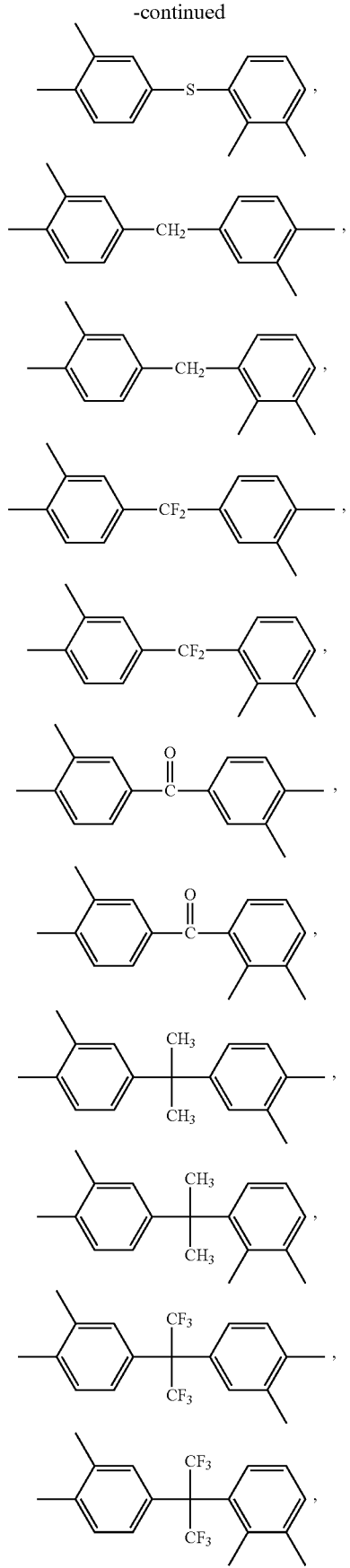
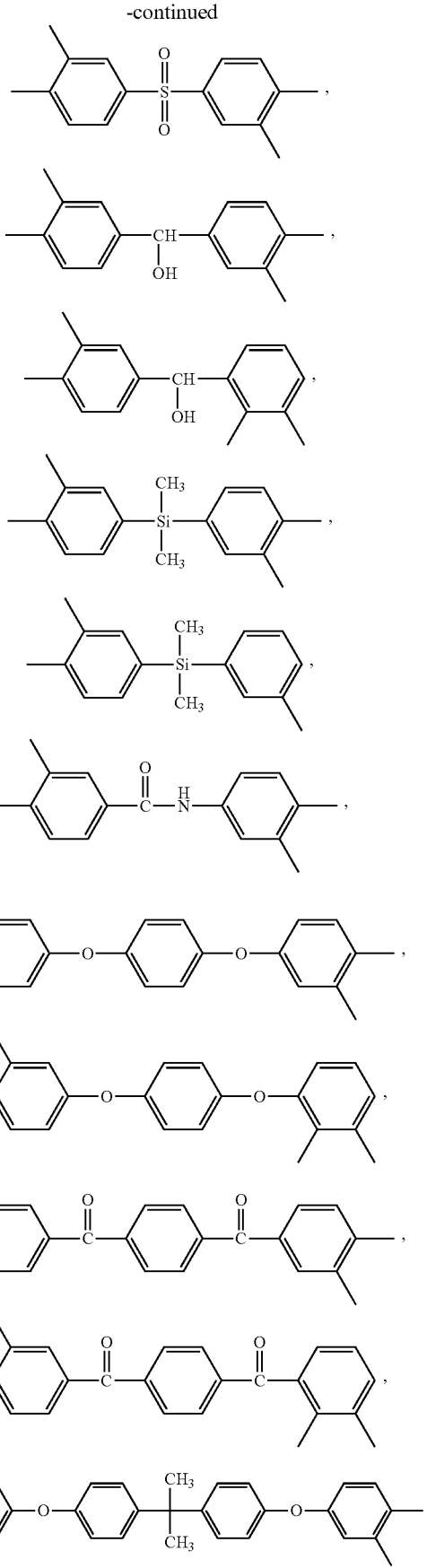

-continued

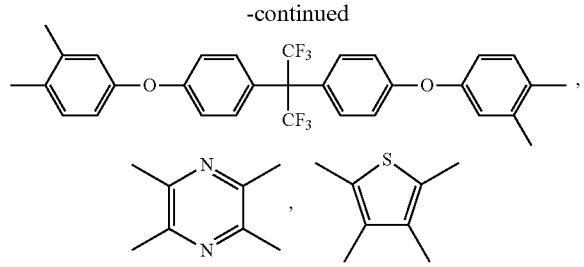

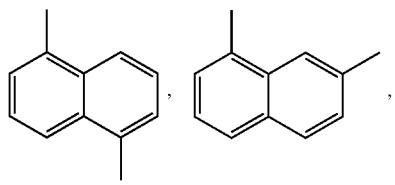

Preferably, $Ar_1'$ and $Ar_2$ are selected from the following compounds and the linkage position thereof includes all of o-, m- and p-positions.

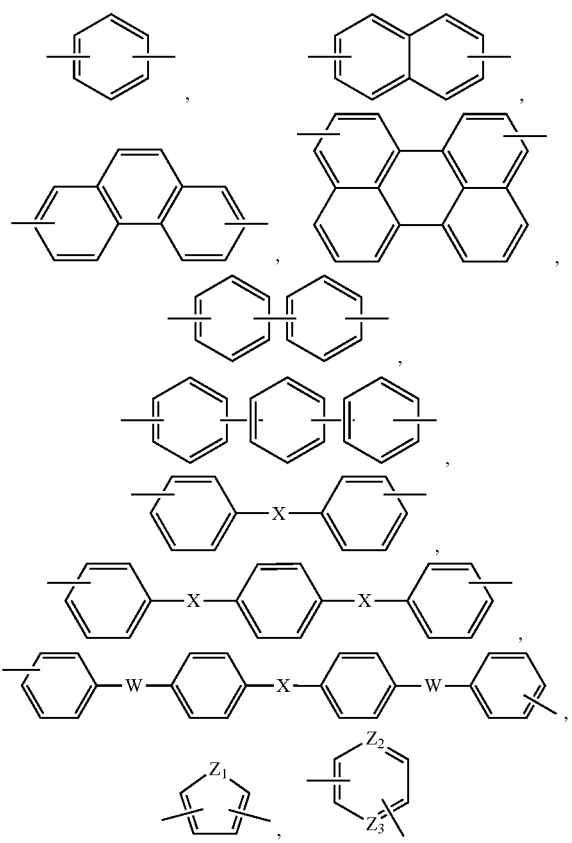

wherein X is O, S, C(=O), CH(OH), S(=O)$_2$, Si(CH$_3$)$_2$, (CH$_2$)$_p$ (in which $1 \leq p \leq 10$), (CF$_2$)$_q$ (in which $1 \leq q \leq 10$), C(CH$_3$)$_2$, C(CF$_3$)$_2$, or C(=O)NH; W is O, S or C(=O); and $Z_1$, $Z_2$ and $Z_3$ are identical to or different from each other and are O, N or S.

More preferably, $Ar_1'$ and $Ar_2$ are selected from the following compounds:

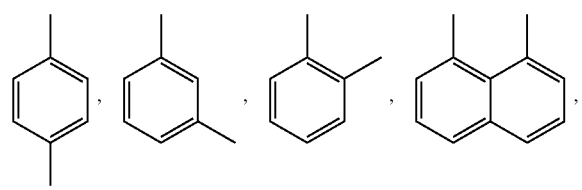

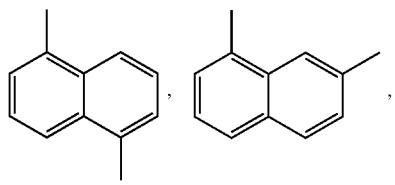

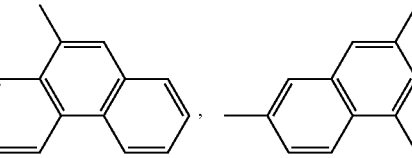

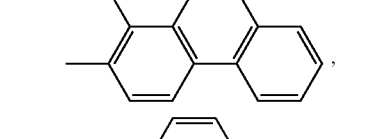

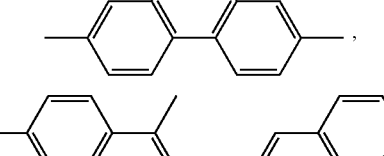

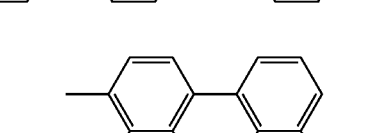

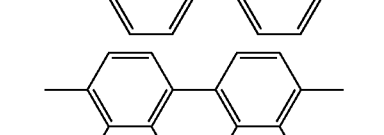

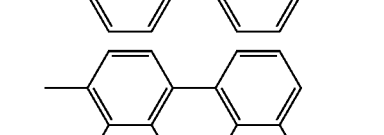

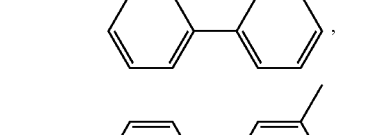

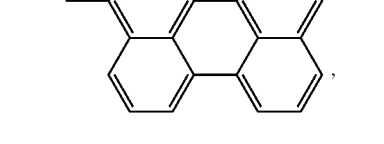

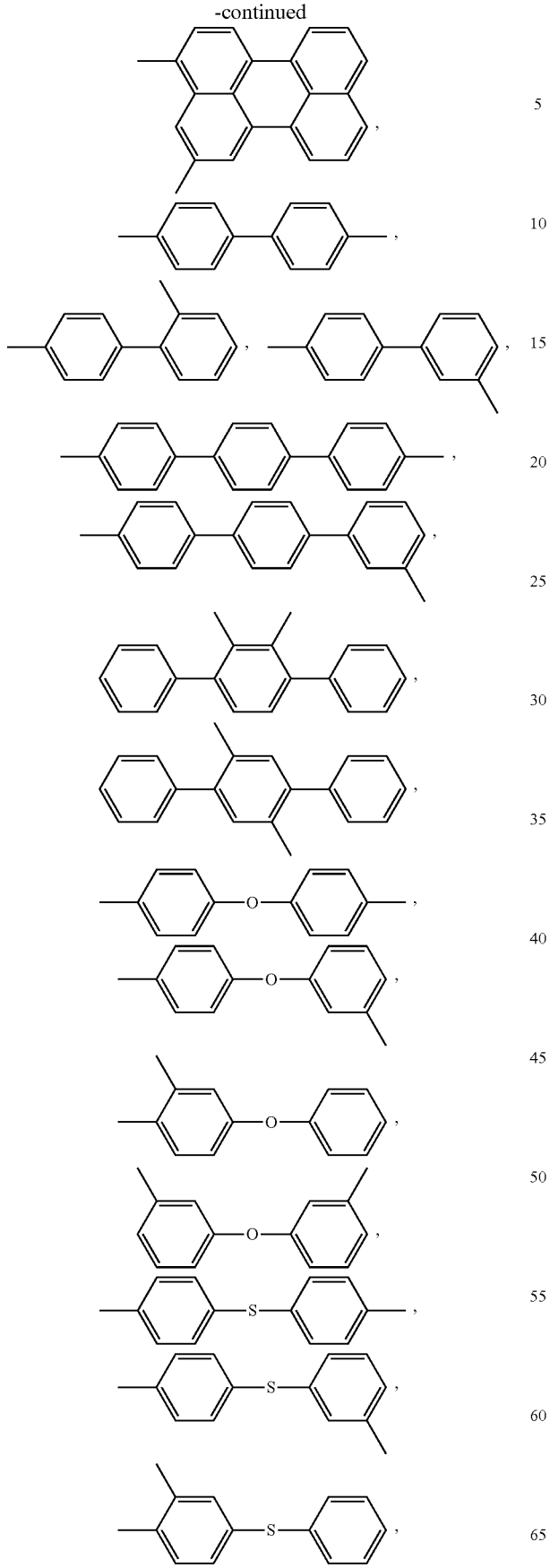
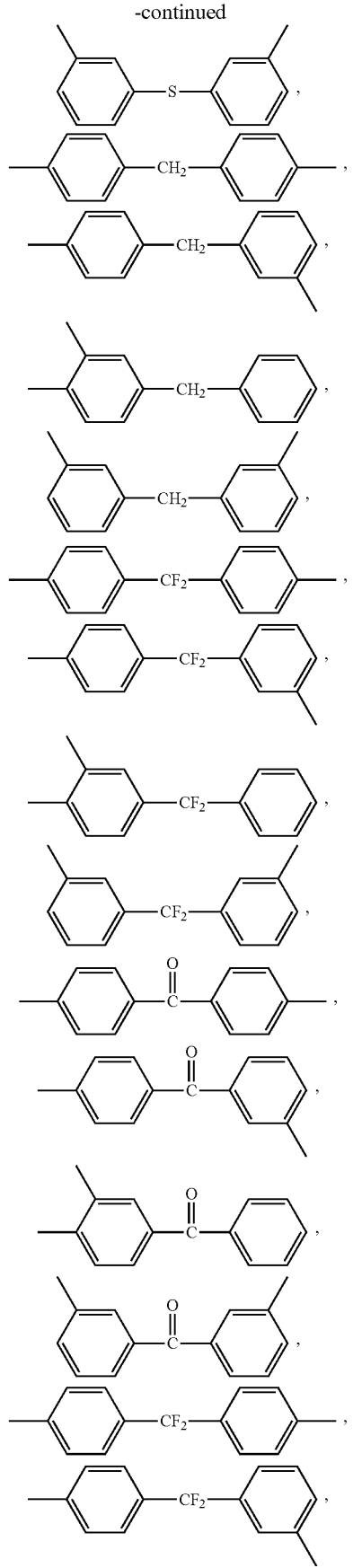

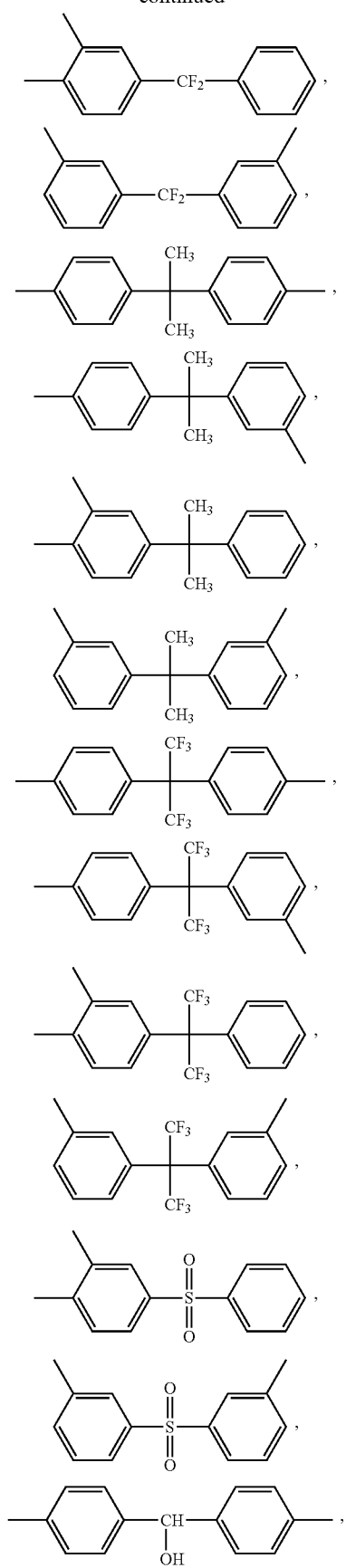
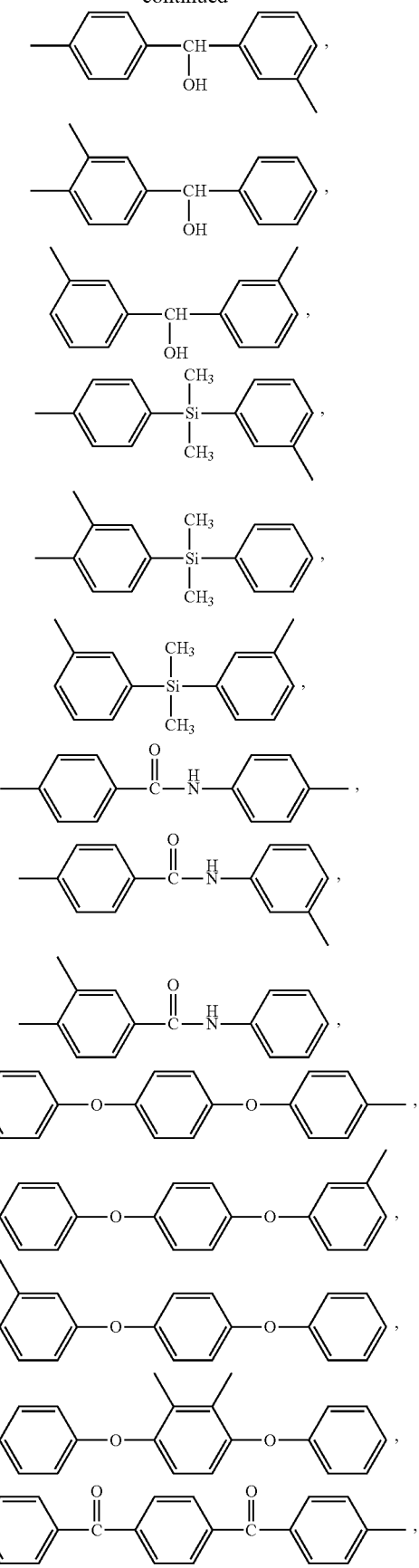

-continued
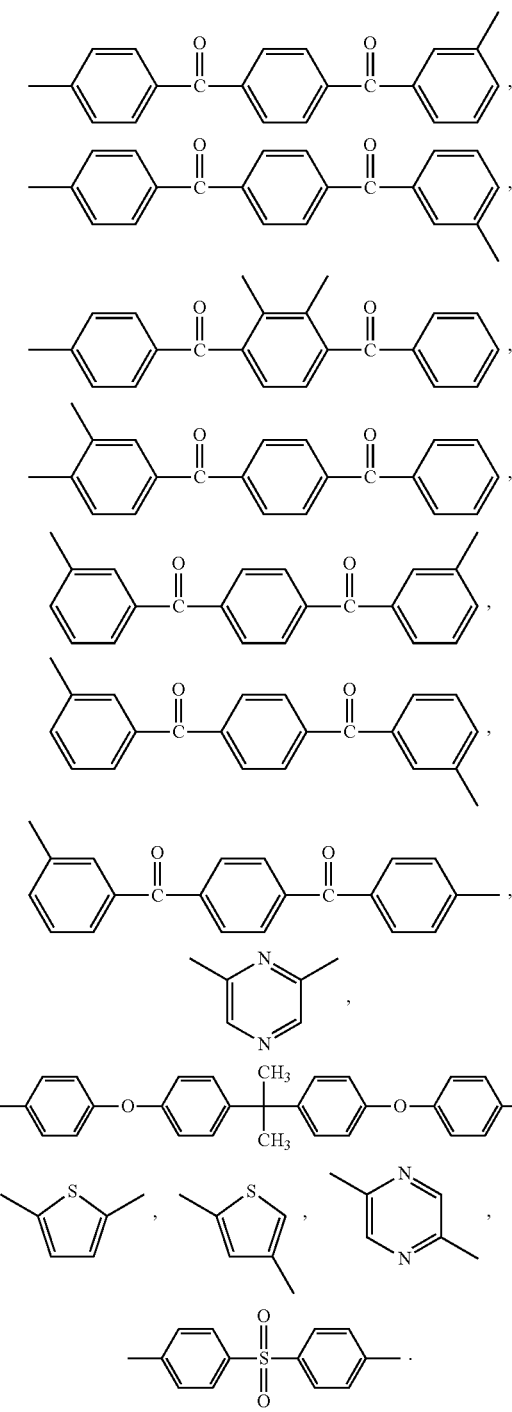
Preferably, Q is $CH_2$, $C(CH_3)_2$, $C(CF_3)_2$, O, S, $S(=O)_2$ or $C(=O)$.
In one preferred embodiment, $Ar_2$ is selected from the group consisting of:
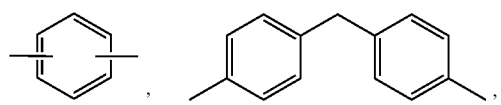
-continued
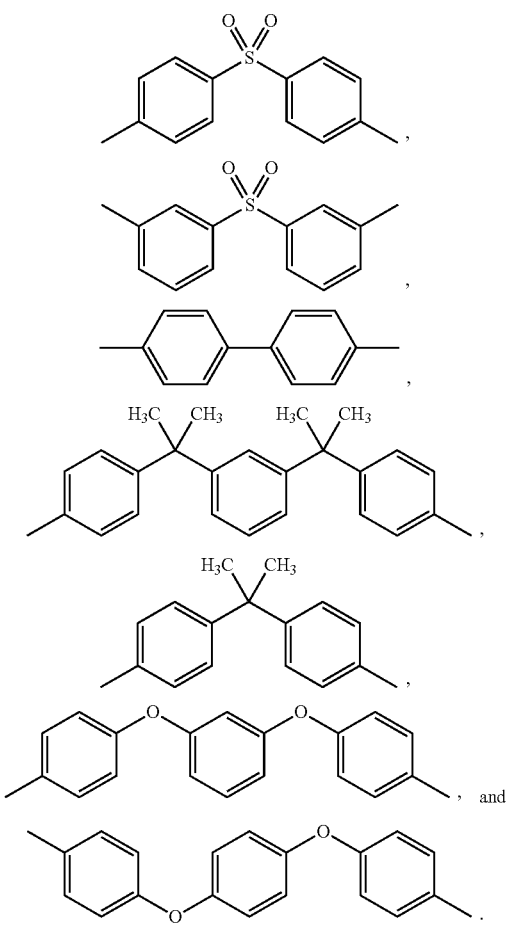
In another preferred embodiment, $Ar_2$ is selected from the group consisting of:

-continued

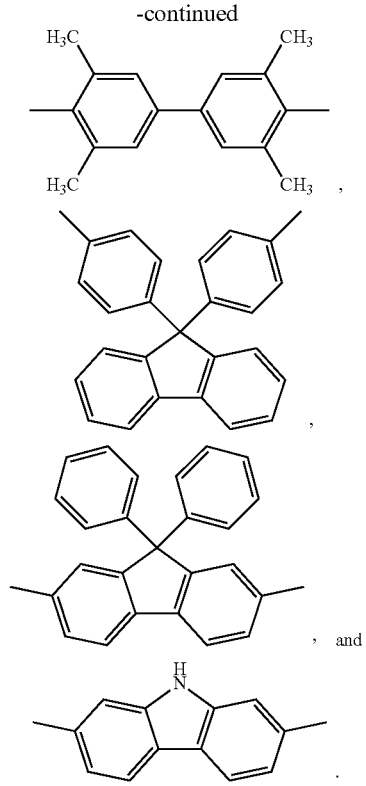

In one preferred embodiment, $Ar_1$ is

-continued

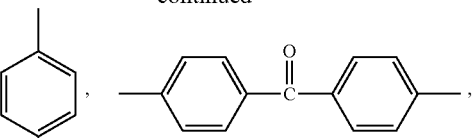

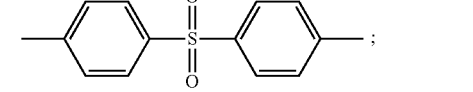

and Q is $C(CF_3)_2$.

Preferably, the polymer compounds have a fractional free volume (FFV) of 0.18 to 0.40, a d-spacing of 0.58 to 0.80 nm and a cavity radius difference of 0.1 to 0.4 Å between maximum cavity radius and minimum cavity radius.

The polymer compounds of the present invention may be doped with an acid. By adding small acidic dopants, the cavity size and shape of the polymer compounds can be tuned. For example, after doping, the $CO_2$ permeability decreases but $CO_2/CH_4$ selectivity increases.

Suitable acidic dopant for use with the present invention includes sulfuric acid, hydrochloric acid, phosphoric acid, nitric acid, $HBrO_3$, $HClO_4$, $HPF_6$, $HBF_6$, 1-methyl-3-methylimidazolium cation (BMIM+) and mixtures thereof.

Preferably, the polymer compounds of the present invention are organic-inorganic composite polymers via incorporation of inorganic oxides or inorganic fillers into the polymer matrix. Here, the organic-inorganic composite polymers can be prepared by adding an inorganic oxides or inorganic fillers to polyamic acid or polyimide which is subsequently subjected to imidization and thermal-treating or only thermal-treating.

Suitable inorganic oxides for use with the present invention include fumed silica, zirconium oxide, tetraethoxy silane, montmorillonite clay and mixtures thereof. Here, the preferable content of the inorganic oxide is 0.1 to 10% by weight, based on the total weight of the organic-inorganic composite polymer compound. When the amount of inorganic oxide is less 0.1% by weight, the effect of adding the inorganic oxide is too low to expect the improvement of mechanical, thermal, and chemical stabilities. Conversely, when the amount of inorganic oxide exceeds 10% by weight, excessive amount of inorganic oxides cause the composite polymer compounds to rapidly lose the mechanical strength and to be broken.

Suitable inorganic fillers for use with the present invention include phosphotungstic acid (PWA), phosphomolybdenic acid, silicotungstic acid (SiWA), molybdophosphoric acid, silicomolybdic acid, phosphotin acid, zirconium phosphate (ZrP) and mixtures thereof. Here, the preferable content of the inorganic fillers is 0.5 to 60% by weight, based on the total weight of the organic-inorganic composite polymer compound. When the amount of inorganic filler is less 0.5% by weight, the effect of adding the inorganic filler is too low to expect the improvement of mechanical, thermal, and chemical stabilities. Conversely, when the amount of inorganic filler exceeds 60% by weight, excessive amount of inorganic fillers cause the composite polymer compounds to rapidly lose the mechanical strength and to be broken.

The polymer compounds of the present invention have well-connected hourglass shaped cavities, and narrow cavity size distribution. These free-volume elements are appropriate for molecular and ionic transport and molecular separations.

According to Experimental Example 5 of the present invention, the nitrogen absorption/desorption isotherm analysis indicates the presence of substantial amounts of free volume.

With reference to Experimental Example 6 of the present invention, it can be seen from PALS analysis that a precursor polymer [Comparative Example 1, synthesized from 4,4'-(hexafluoroisopropylidene)-diphthalic anhydride (6FDA) and 2,2'-bis(3-amino-4-hydroxylphenyl)hexafluoropropane (bisAPAF) via thermal imidization up to 300° C.] and its corresponding thermally rearranged polymers[Examples 1 to 3] undergoes microstructural change depending on the extent of rearrangement.

In detail, the cavity radius of a precursor polymer (which is centered at about 0.28 nm and is very broad) increases to 0.3 to 0.4 nm, and the distribution of cavity sizes becomes narrow as the thermal rearrangement temperature increases to 450° C. (see FIG. 10).

PALS analysis reveals an increase in o-positronium (o-Ps) lifetime as rearrangement temperature increases from 300 to 450° C. (see Table 4). In general, longer o-Ps lifetime indicates larger cavity sizes (B. R. Wilks et al., J. Polym. Sci. Part B: Polym. Phys. 2003, 41, 2185). The o-Ps intensity (%) increases by 700% as thermal rearrangement temperature is increased to 400° C., but decreases above this temperature. Notably, despite increasing o-Ps lifetime, the reduction of o-Ps intensity in the sample treated at 450° C. (Example 3) indicates that an increase in mean cavity size is accompanied by a decrease in the number of cavities, suggesting coalescence of smaller cavities to form larger ones. Hourglass shaped cavities, having narrow neck regions separating much larger adjacent chambers, are consistent with the above results.

To have excellent separation properties, the small neck regions must not be too large relative to the size of the molecules being separated, because large openings enable relatively nonselective flow mechanisms (e.g., Knudsen flow) (Y. Yampolskii, I. Pinnau, B. D. Freeman, Materials Science of Membranes for Gas and Vapor Separation (Wiley, London, 2006)). However, large cavities adjoining the necks will contribute to high rates of molecular transport. The large cavity size of the fully converted sample (Example 3) is smaller than that of PTMSP (0.675 nm) but substantially larger than that of common glassy polymers (e.g., 0.286 nm for polysulfone; 0.289 nm for polycarbonate) (B. R. Wilks et al., J. Polym. Sci. Part B: Polym. Phys. 2003, 41, 2185). Similar behavior is observed in other precursor polymers prepared by a combination of other monomers based on the same methodology.

Figure 11:
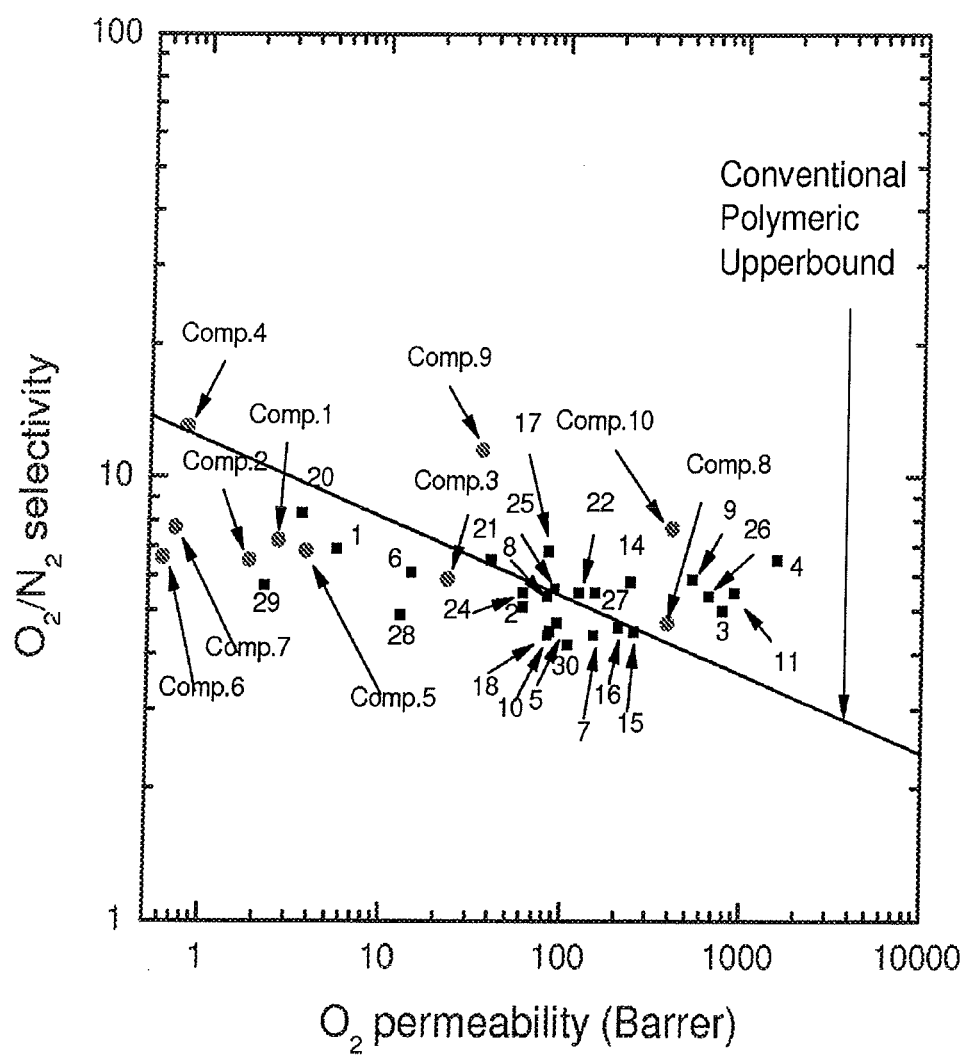
FIG. 11 is a graph comparing oxygen permeability (Barrer) and oxygen/nitrogen selectivity for flat films prepared in Examples 1 to 11, 14 to 18, 20 to 30 of the present invention and Comparative Examples 1 to 10 (the numbers 1 to 11, 14 to 18, 20 to 30 indicate Examples 1 to 11, 14 to 18, 20 to 30, respectively; and the numbers Comp. 1 to Comp. 10 indicate Comparative Examples 1 to 10, respectively)
Figure 12:
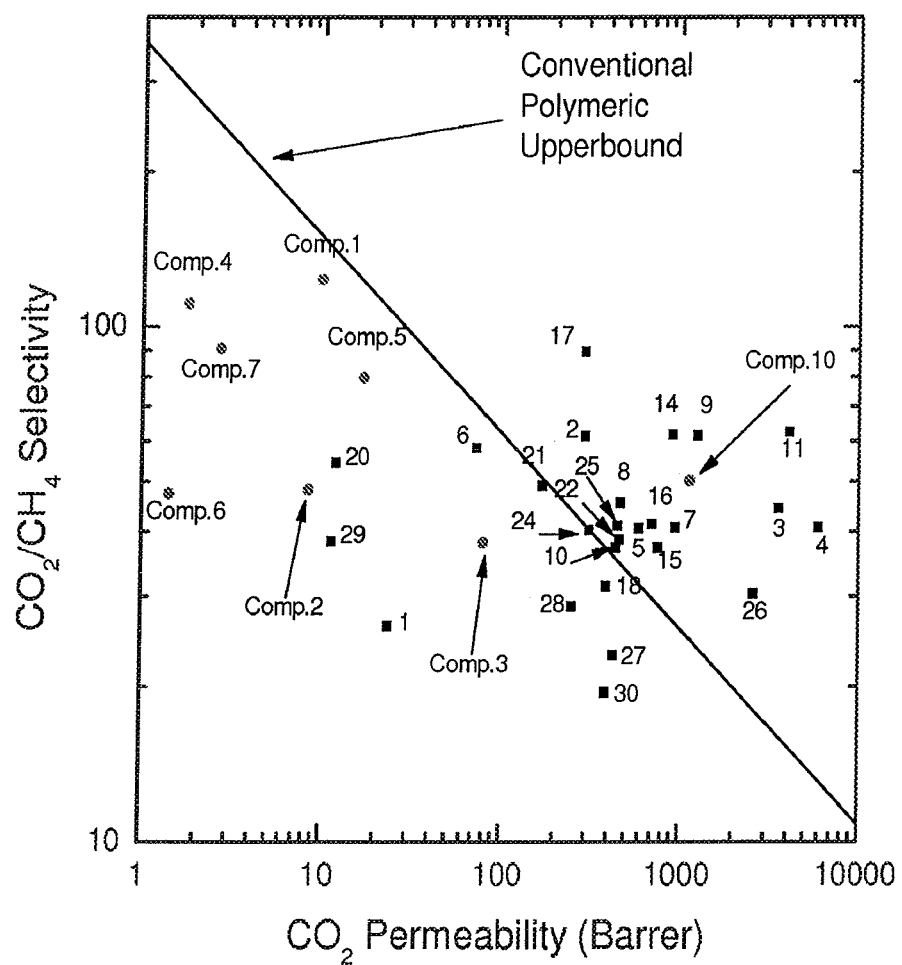
FIG. 12 is a graph comparing carbon dioxide permeability (Barrer) and carbon dioxide/methane selectivity for flat prepared in Examples 1 to 11, 14 to 18, 20 to 30 of the present invention and Comparative Examples 1 to 7, 10 (the numbers 1 to 11, 14 to 18, 20 to 30 indicate Examples 1 to 11, 14 to 18, 20 to 30, respectively; and the numbers Comp. 1 to Comp. 7, Comp. 10 indicate Comparative Examples 1 to 7, 10, respectively).

Referring to Experimental Example 7, it can be confirmed that the polymer compounds of the present invention demonstrate excellent $O_2/N_2$ and $CO_2/CH_4$ separation performance, surpassing the $O_2/N_2$ and $CO_2/CH_4$ separation limitation of typical polymer membranes (See FIGS. 11 to 12). Counterintuitively, the $O_2$ permeability, $O_2/N_2$ selectivity and the $CO_2$ permeability, $CO_2/CH_4$ selectivity are both high, in contrast to the behavior of conventional strongly size-sieving polymer membranes, where high $CO_2/CH_4$ selectivity invariably leads to low $CO_2$ permeability (B. D. Freeman, Macromolecules 1999, 32, 375). On the permeability-selectivity map, the separation performance of the polymer films according to the present invention is intermediate between the performance of common polymers and carbon molecular sieve membranes. As revealed by PALS in Experimental Example 6, the unusual microstructure of the polymer compounds according to the present invention (i.e., large cavities) provides an explanation for their high gas permeabilities, and the constriction formed by cavity coalescence is presumably responsible for their precise discrimination among gas molecules such as $CO_2$ and $CH_4$. As shown above, the polymer compounds of the present invention show superior gas permeability and gas selectivity. Therefore, the polymer compounds of the present invention are suitable for use in the preparation of gas separation, vapor separation, water purification, low dielectric constant materials, adsorbents, thermostable fiber, films, and so forth in a variety of forms such as powders, films, fibers and hollow fibers.

With reference to Experimental Example 8 of the present invention, it can be seen that after the thermal rearrangement through the thermal treatment, the polymer compounds of the present invention undergo morphological change including reduced density, considerably increased fractional free volume due to increased microcavity size and increased d-spacing, as compared to the precursor polymers. As a result, the polymer compounds exhibit considerably high gas permeability, as compared with the precursor polymers.

There are two advantages to the polymer compounds of the invention. First, the precursor polyimides (i.e., polyhydroxyimide, polythiolimide, polyaminoimide) are soluble in common solvents; that is, they can be prepared in the various forms (e.g., hollow fibers) and then continuously exposed to heat treatment because these polymer compounds produce tough, ductile, robust films rather than brittle, fragile specimens such as zeolite or carbon membranes. This feature markedly enhances their potential utility and ultimate reduction to practice.

Second, it is much easier and simpler to coat these organic polymer compounds without any defects or cracks onto microporous ceramic support membranes for the large scale production of membranes than to coat inorganic materials such as zeolite, silica, and carbon membranes onto such supports. Most of all, the greatest benefit of the polymer compounds according to the present invention is the ability to tune the cavity size and distribution of organic polymers for specific gas applications, vapor separation, water purification, low dielectric constant materials, adsorbents, thermostable fiber, films, and so forth by using various templating molecules and heat treatments, with one starting material.

In another aspect, the invention is directed to a co-polymer compound comprising at least one repeating unit represented by the following Formulae in Group E and at least one repeating unit represented by the following Formulae in Group F:

Group E:

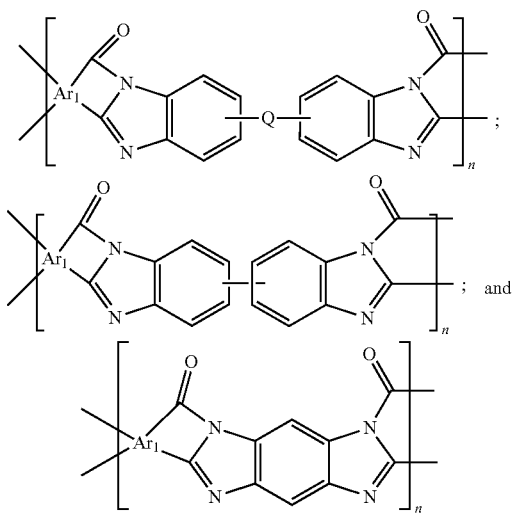

Group F:

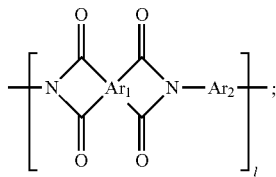

wherein $Ar_1$ is a tetravalent $C_5$-$C_{24}$ arylene group or a tetravalent $C_5$-$C_{24}$ heterocyclic ring, which is substituted or unsubstituted with at least one substituent selected from the group consisting of $C_1$-$C_{10}$ alkyl, $C_1$-$C_{10}$ alkoxy, $C_1$-$C_{10}$ haloalkyl and $C_1$-$C_{10}$ haloalkoxy, or two or more of which are fused together to form a condensation ring or covalently bonded to each other via a functional group selected from the group consisting of O, S, C(=O), CH(OH), S(=O)$_2$, Si(CH$_3$)$_2$, (CH$_2$)$_p$ (in which $1 \leq p \leq 10$), (CF$_2$)$_q$ (in which $1 \leq q \leq 10$), C(CH$_3$)$_2$, C(CF$_3$)$_2$ and C(=O)NH;

$Ar_1'$ and $Ar_2$ are identical to or different from each other and are each independently a bivalent $C_5$-$C_{24}$ arylene group or a bivalent $C_5$-$C_{24}$ heterocyclic ring, which is substituted or unsubstituted with at least one substituent selected from the group consisting of $C_1$-$C_{10}$ alkyl, $C_1$-$C_{10}$ alkoxy, $C_1$-$C_{10}$ haloalkyl and $C_1$-$C_{10}$ haloalkoxy, or two or more of which are fused together to form a condensation ring or covalently bonded to each other via a functional group selected from the group consisting of O, S, C(=O), CH(OH), S(=O)$_2$, Si(CH$_3$)$_2$, (CH$_2$)$_p$ (in which $1 \leq p \leq 10$), (CF$_2$)$_q$ (in which $1 \leq q \leq 10$), C(CH$_3$)$_2$, C(CF$_3$)$_2$ and C(=O)NH, provided that $Ar_1'$ and $Ar_2$ are different if either $Ar_1'$ or $Ar_2$ is C$_6$H$_4$ or C$_{10}$H$_6$;

Q is O, S, C(=O), CH(OH), S(=O)$_2$, Si(CH$_3$)$_2$, (CH$_2$)$_p$ (in which $1 \leq p \leq 10$), (CF$_2$)$_q$ (in which $1 \leq q \leq 10$), C(CH$_3$)$_2$, C(CF$_3$)$_2$, C(=O)NH, C(CH$_3$)(CF$_3$), $C_1$-$C_6$ alkyl-substituted phenyl or $C_1$-$C_6$ haloalkyl-substituted phenyl in which Q is linked to opposite both phenyl rings in the position of m-m, m-p, p-m or p-p;

Y" is —O or S;

n is an integer from 10 to 400; and l is an integer from 10 to 400.

With reference to FIG. 1, two types of changes in chain structure occur during the rearrangement that alter chain packing: (i) random chain conformations resulting from the formation of meta- and para-linked chains (See FIG. 1A); and (ii) relatively flexible, twisting pairs of short flat planes (α and β) that convert to single long flat planes (γ) (See FIG. 1B) that are much more rigid than those of the parent moieties [e.g., the torsional angle (φ2) of benzoxazole-phenylene ring is close to 0° at the energy-minimized state because the coplanar conformation is favored due to resonance stabilization].

The use of stiff, rigid chain elements (e.g., benzoxazole-phenylene ring, benzothiazole-phenylene ring or benzopyrrolone-phenylene ring) prevents large intrachain, indiscriminant torsional rotation, increases the efficiency of cavity formation, and inhibits rapid collapse of the created cavities. These materials are thermally stable, and the structural rearrangements occurring during this process do not correspond to partial rigid polymer chain segments in the solid state.

The polyimides may be thermally rearranged through a preparation process which will be mentioned later, to be converted polybenzoxazole, polybenzothiazole and polybenzopyrrolone, each having a high fractional free volume. Here, the polybenzoxazole is prepared from polyhydroxyimide in which Y is —OH, the polybenzothiazole is prepared from polythiolimide in which Y is —SH, and the polybenzopyrrolone is prepared from polyaminoimide in which Y is —NH$_2$.

In addition, the polyimide copolymers may be thermally rearranged to be converted benzoxazole-imide copolymer, benzothiazole-imide copolymer or benzopyrrolone-imide copolymers which have a high fractional free volume. Here, it is possible to control physical properties of the thermally rearranged polymer compounds by controlling the copolymerization ratio between blocks which will be thermally rearranged into polybenzoxazole, polybenzothiazole and polybenzopyrrolone, and blocks which will be thermally rearranged into polyimides.

In addition, the polyimide copolymers may be are thermally rearranged to be converted copolymers of polybenzoxazole, polybenzothiazole and polybenzopyrrolone, each having a high free volume. Here, it is possible to control the physical properties of thermally rearranged polymer compounds thus prepared can be controlled by controlling the copolymerization ratio between blocks which are thermally rearranged into polybenzoxazole, polybenzothiazole and polybenzopyrrolone.

Preferably, the copolymerization ratio between the blocks, m:l, is from 0.1:9.9 to 9.9:0.1, more preferably 2:8 to 8:2, most preferably 5:5. The copolymerization ratio affects the morphology of the thermally rearranged polymer compounds thus prepared. Since such morphologic change is associated with free volume elements, gas permeability and selectivity, it is considerably important to control the copolymerization ratio.

The thermal treatment is carried out under an inert atmosphere at 350 to 500° C., preferably 400 to 450° C., for 1 minute to 12 hours, preferably 10 minutes to 2 hours at a heating rate of 1 to 10° C./min. When the temperature is below this range, the thermal rearrangement is not completed and the polyimide precursor remains unreacted, causing deterioration in purity. On the other hand, when the temperature exceeds this range, polyimide is disadvantageously converted into a carbon substance as an inorganic due to polymer carbonization. Accordingly, it is preferable that the thermal treatment be suitably performed within this temperature range.

The thermal treatment of the present invention will be illustrated in detail with reference to Reaction Schemes 1 and 2 below:

Reaction Scheme 1

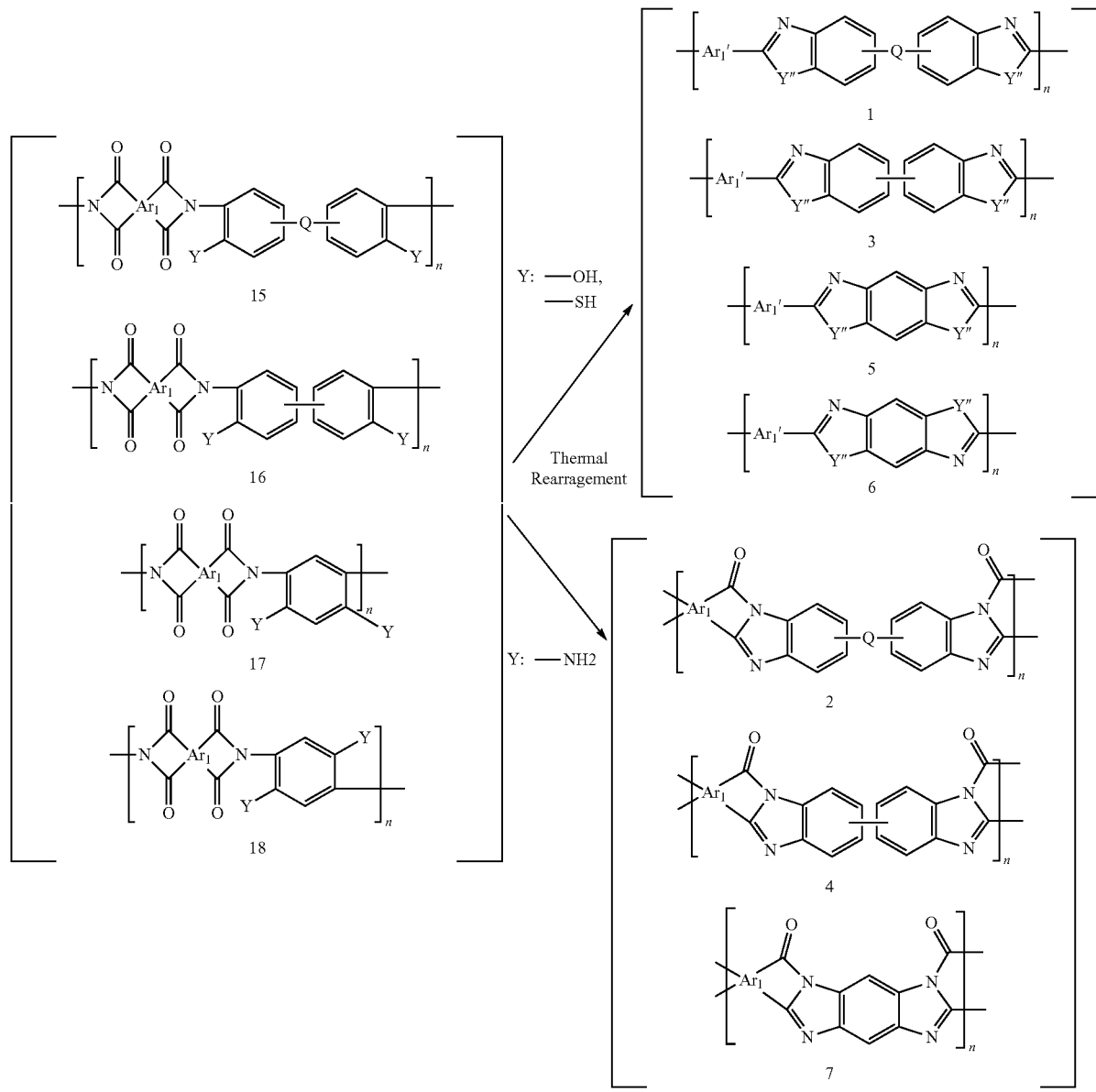

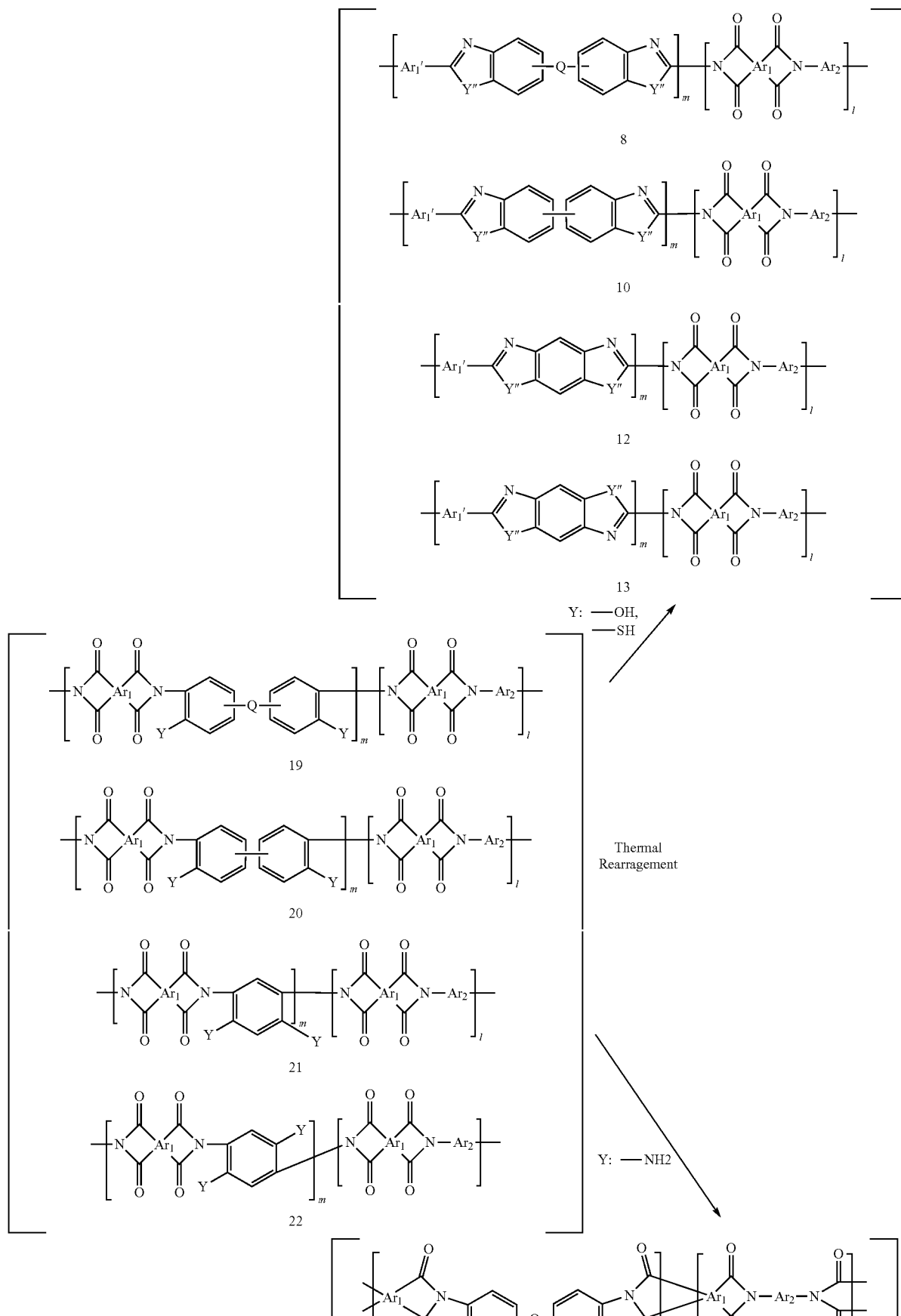
Reaction Scheme 2

In Reaction Schemes 1 and 2, $Ar_1$, $Ar_1'$, $Ar_2$, Q, Y, Y", n, m, and l are defined as above.

As can be seen from Reaction Scheme 1, the polyimides represented may be converted through thermal treatment into polybenzoxazole, polybenzothiazole, polybenzopyrrolone. The conversion of polyimide into the thermally rearranged polymer compounds is carried out through the removal reaction of $CO_2$ or $H_2O$.

At this time, the polyimides in which Y is —OH or —SH (i.e., polyhydroxyimide or polythiolimide) are thermally rearranged into polybenzoxazoles (Y"=O) or polybenzothiazoles (Y"=S). In addition, polyimides in which Y is —$NH_2$ (i.e., polyaminoimide) are thermally rearranged into polybenzopyrrolones.

As can be seen from Reaction Scheme 2, through the afore-mentioned thermal treatment, polyimide copolymers are converted through the removal reaction of $CO_2$ present in the polyimides into polymer compounds.

At this time, polyimide copolymers in which Y is —OH or —SH are thermally rearranged into benzoxazole (Y"=O)-imide copolymers or benzothiazole (Y"=S)-imide. In addition, polyimide copolymers in which Y is —$NH_2$ are thermally rearranged into benzopyrrolone-imide copolymers.

The blocks constituting polyimide copolymers are thermally rearranged into polybenzoxazole, polybenzothiazole and polybenzopyrrolone, depending upon the type of Y to be converted into copolymers thereof, i.e., copolymers of polymers.

The polyimides and polyimide copolymers may be prepared in accordance with methods well known in the art. For example, the polyimide and the polyimide copolymer may be prepared by imidizing and cyclizing hydroxyl group (—OH) containing polyamic acid (i.e., polyhydroxyamic acid), thiol group containing polyamic acid (i.e., polythiolamic acid) or amine group (—$NH_2$) containing polyamic acid (i.e., polyaminoamic acid) or copolymers thereof.

According to examples of the present invention, as depicted in Reaction Schemes 3 and 4 below, polyamic acids are imidized are then prepared into polyimides and polyimide copolymers.

The polyamic acids may be prepared in accordance with methods well known in the art. For example, the polyamic acids may be prepared by reacting tetracarboxylic acid anhydrides as monomers with aromatic diamines containing —OH, —SH or —$NH_2$.

Reaction Scheme 3

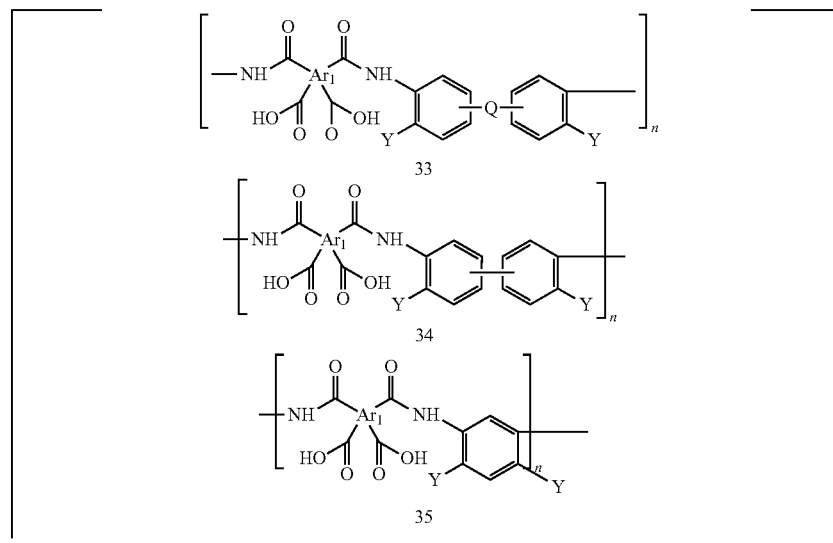

-continued
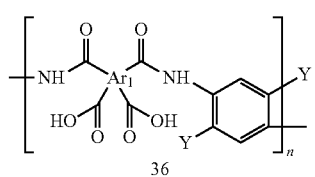
36
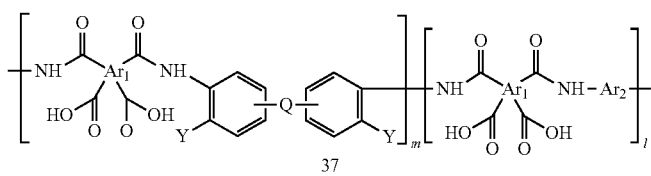
37
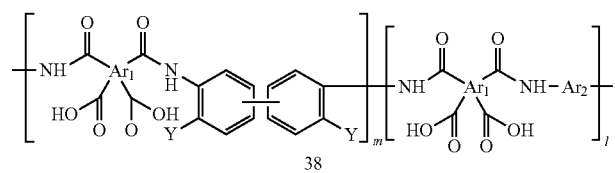
38
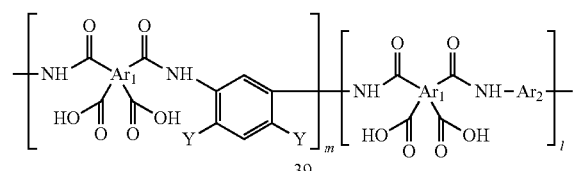
39
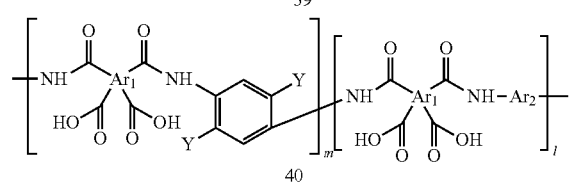
40
$\xrightarrow{\text{imidization}}$
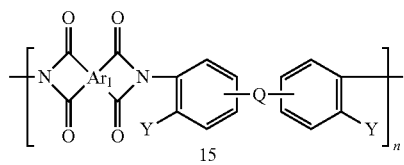
15
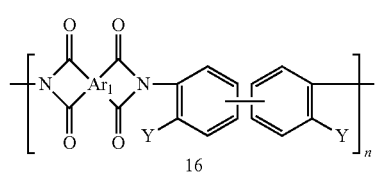
16
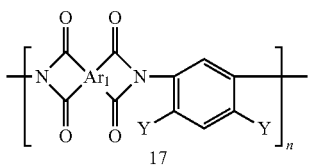
17
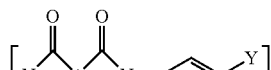

Reaction Scheme 4
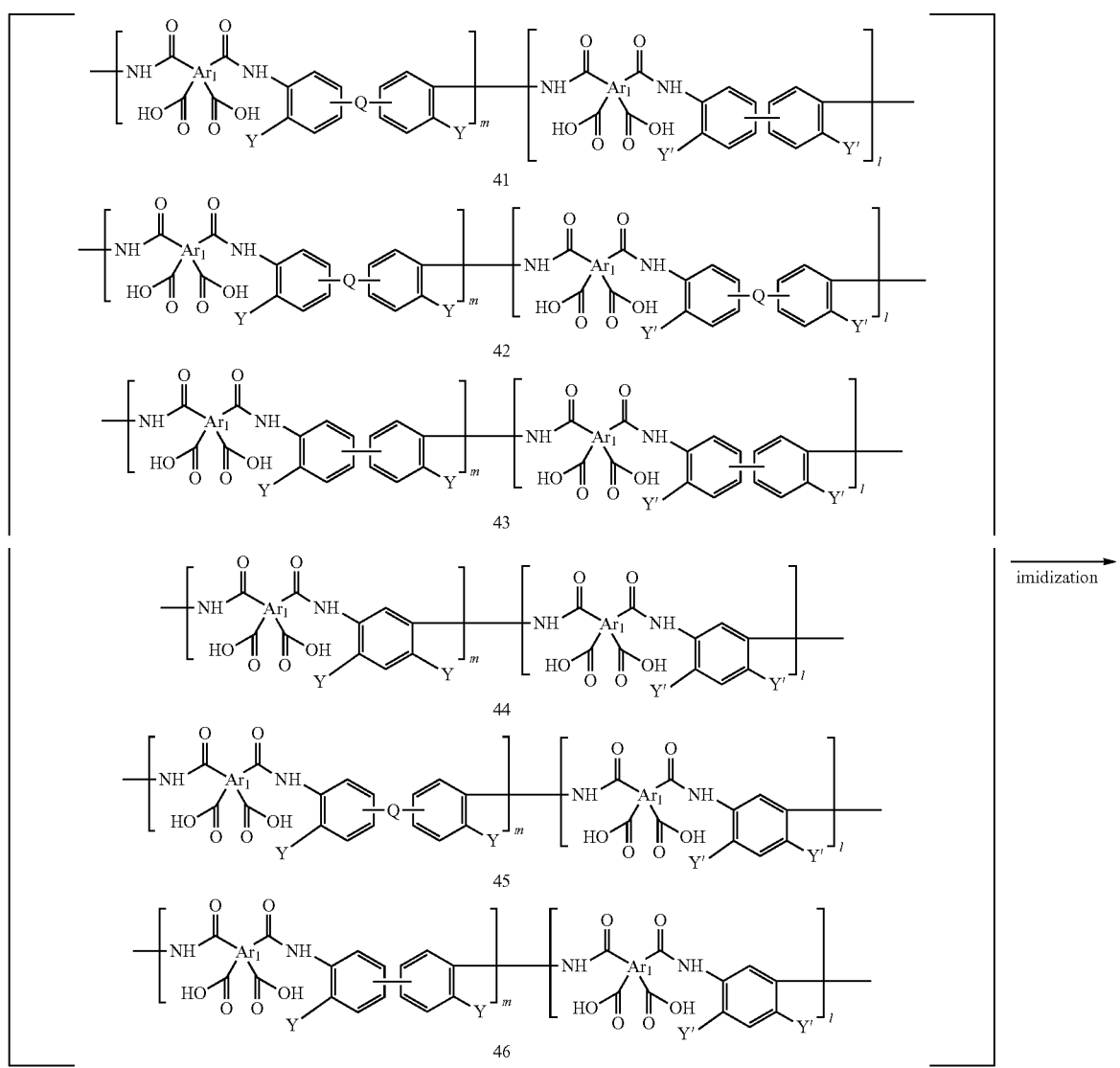

-continued
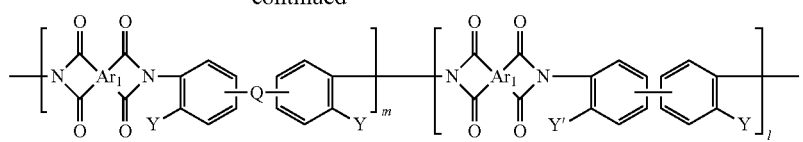
23
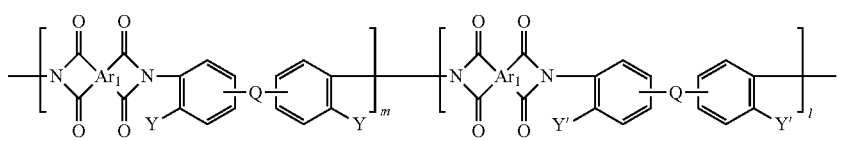
24
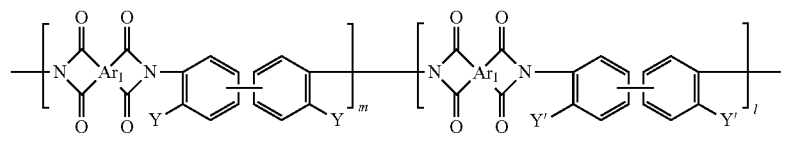
25
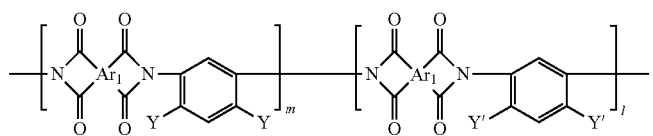
26
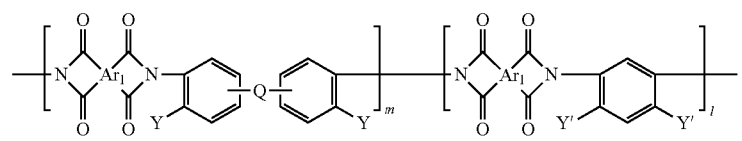
27
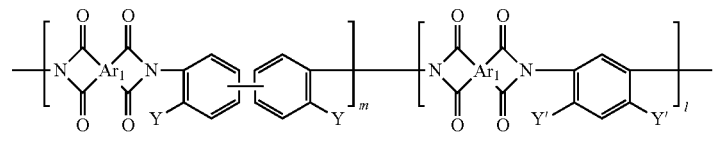
28
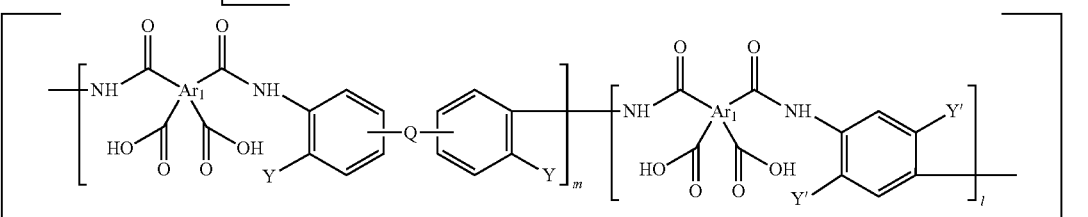
47
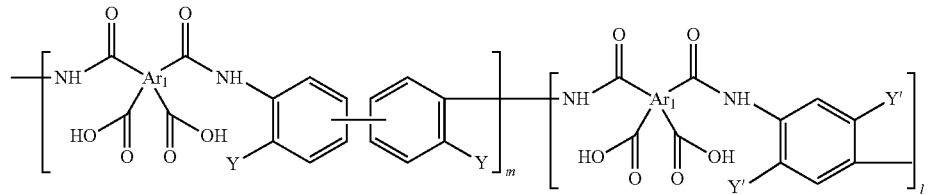

As can be seen from Reaction Scheme 3, polyamic acids (i.e., polyhydroxyamic acid, polythiolamic acid and polyaminoamic acid) may be converted through imidization i.e., cyclization reaction into polyimides. In addition, polyamic acid copolymers may be converted through imidization into polyimide copolymers.

As can be seen from Reaction Scheme 4, polyamic acid copolymers may be converted through imidization into polyimide copolymers. The imidization may be conducted in accordance with methods well known in the art. Representative examples of the imidization include chemical imidization, thermal imidization and solution-thermal imidization.

Preferably, the chemical imidization is carried out at 10 to 180° C. for 1 to 48 hours. At this time, acetic anhydride can be added to remove water as a byproduct along with pyridine as a catalyst.

Preferably, the thermal imidization is carried out under an inert atmosphere or vacuum state at 100 to 300° C. for 1 minute to 24 hours after casting the polymeric solution onto a glass plate.

In addition, preferably, the solution-thermal imidization is carried out in solution at 80 to 250° C. for 1 to 48 hours.

When the imidization temperature is below this range, polyamic acid as a precursor is only slightly imidized, and on the other hand, when the imidization temperature exceeds this range, significant effects cannot be obtained and economic efficiency is thus very low. The imidization conditions may be suitably controlled within the range according to the functional groups, $Ar_1$, $Ar_2$, Q and Y.

EXAMPLES

Hereinafter, preferred examples will be provided for a further understanding of the invention. These examples are for illustrative purposes only and are not intended to limit the scope of the present invention.

Example 1

A benzoxazole represented by Formula 51 was prepared as follows.

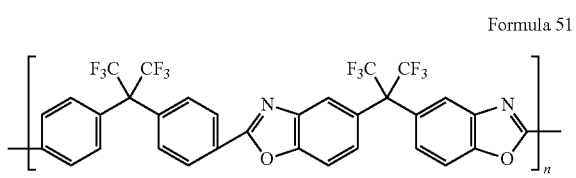

Formula 51

A 250 ml reactor fitted with a teflon stirring system, an inlet for an nitrogen gas and placed in an oil bath to constantly maintain the reaction temperature at room temperature. The reactor was charged with 3.66 g (10 mmol) of 2,2'-bis(3-amino-4-hydroxy-phenyl)hexafluoropropane and N-methylpyrrolidone (NMP) as a solvent. 4.44 g (10 mmol) of 4,4'-(hexafluoroisopropylidene)diphthalic anhydride was slowly added into the solution. Then, the solution was allowed to react for about 4 hours to prepare a pale yellow viscous polyhydroxyamic acid solution.

The solution was cast on a glass plate and cured in vacuum oven for 2 hours at 100° C., 1 hour for 150° C., 1 hour for 200° C., and 1 hour for 250° C.

Then, vacuum drying was carried out in a vacuum oven at 60° C. for 24 hours in order to completely remove the residual solvent. Consequently, the transparent brownish polyhydroxyimide film (4 cm×4 cm in size; 20-50 μm in thickness) was obtained. The polyhydroxyimide film was placed in the middle of a quartz tube, and thermally treated in the muffled tubular furnace at 350° C. at a heating rate of 5° C./min under argon flow (100 cm³[STP]/min). Films were held for one hour at 350□ and then cooled down slowly to room temperature.

As a result of FT-IR analysis, characteristic bands of the resulting polybenzoxazole at 1,553, 1,480 cm⁻¹ (C═N) and 1,058 cm⁻¹ (C—O) which were not detected in polyhydroxyimide were confirmed.

Example 2

A polybenzoxazole was prepared in the same manner as in Example 1, except that the polyhydroxyimide film was thermally treated at 400° C.

As a result of FT-IR analysis, characteristic bands of the resulting polybenzoxazole at 1,553, 1,480 cm⁻¹ (C═N) and 1,058 cm⁻¹ (C—O) which were not detected in polyhydroxyimide were confirmed.

Example 3

A polybenzoxazole was prepared in the same manner as in Example 1, except that the polyhydroxyimide film was thermally treated at 450° C.

As a result of FT-IR analysis, characteristic bands of the resulting polybenzoxazole at 1,553, 1,480 cm⁻¹ (C═N) and 1,058 cm⁻¹ (C—O) which were not detected in polyhydroxyimide were confirmed.

Example 4

A polybenzoxazole was prepared in the same manner as in Example 1, except that the polyhydroxyimide film was thermally treated at 500° C.

As a result of FT-IR analysis, characteristic bands of the resulting polybenzoxazole at 1,553, 1,480 cm⁻¹ (C═N) and 1,058 cm⁻¹ (C—O) which were not detected in polyhydroxyimide were confirmed.

Example 5

A polybenzoxazole represented by Formula 52 was prepared in the same manner as in Example 3, except that 2.94 g (10 mmol) of 3,3',4,4'-biphenyltetracarboxylic dianhydride as starting materials were reacted with 3.66 g (10 mmol) of 2,2'-bis(3-amino-4-hydroxy-phenyl)hexafluoropropane.

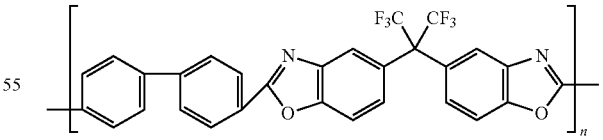

Formula 52

As a result of FT-IR analysis, characteristic bands of the resulting polybenzoxazole at 1,553, 1,480 cm⁻¹ (C═N) and 1,058 cm⁻¹ (C—O) which were not detected in polyhydroxyimide were confirmed.

Example 6

A polybenzoxazole represented by Formula 53 was prepared in the same manner as in Example 3, except that 3.10 g (10 mmol) of 4,4'-oxydiphthalic anhydride as starting materials were reacted with 3.66 g (10 mmol) of 2,2'-bis(3-amino-4-hydroxy-phenyl)hexafluoropropane.

Formula 53

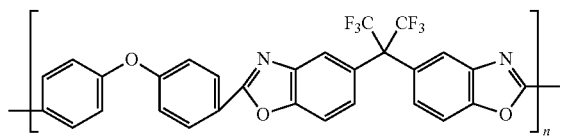

As a result of FT-IR analysis, characteristic bands of the resulting polybenzoxazole at 1,553, 1,480 cm$^{-1}$ (C=N) and 1,058 cm$^{-1}$ (C—O) which were not detected in polyhydroxyimide were confirmed.

Example 7

A polybenzoxazole represented by Formula 54 was prepared in the same manner as in Example 3, except that 2.18 g (10 mmol) of 1,2,4,5-benzenetetracarboxylic dianhydride as starting materials were reacted with 3.66 g (10 mmol) of 2,2'-bis(3-amino-4-hydroxy-phenyl)hexafluoropropane.

Formula 54

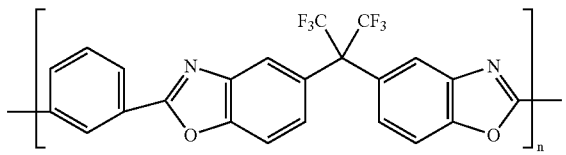

As a result of FT-IR analysis, characteristic bands of the resulting polybenzoxazole at 1,553, 1,480 cm$^{-1}$ (C=N) and 1,058 cm$^{-1}$ (C—N) which were not detected in polyhydroxyimide were confirmed.

Example 8

A polybenzoxazole represented by Formula 55 was prepared in the same manner as in Example 3, except that 3.22 g (10 mmol) of 3,3',4,4'-benzophenone tetracarboxylic dianhydride as starting materials were reacted with 3.66 g (10 mmol) of 2,2'-bis(3-amino-4-hydroxy-phenyl)hexafluoropropane.

Formula 55

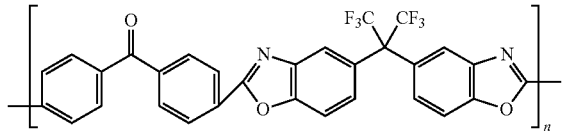

As a result of FT-IR analysis, characteristic bands of the resulting polybenzoxazole at 1,553, 1,480 cm$^{-1}$ (C=N) and 1,058 cm$^{-1}$ (C—O) which were not detected in polyhydroxyimide were confirmed.

Example 9

A polybenzothiazole represented by Formula 56 was prepared in the same manner as in Example 3, except that 4.44 g (10 mmol) of 4,4'-(hexafluoroisopropylidene)diphthalic anhydride as starting materials were reacted with 2.08 g (10 mmol) of 2,5-diamino-1,4-benzenedithiol dihydrochloride.

Formula 56

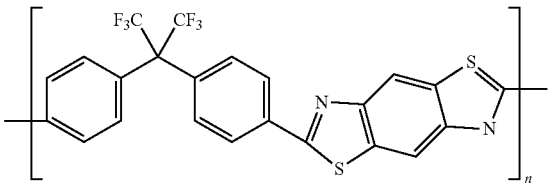

As a result of FT-IR analysis, characteristic bands of the resulting polybenzothiazole at 1,484 cm$^{-1}$ (C—S) and 1,404 cm$^{-1}$ (C—S) which were not detected in polythiolimide were confirmed.

Example 10

A polybenzopyrrolone represented by Formula 57 was prepared in the same manner as in Example 3, except that 4.44 g (10 mmol) of 4,4'-(hexafluoroisopropylidene)diphthalic anhydride as starting materials were reacted with 2.14 g (10 mmol) of 3,3'-diaminobenzidine.

Formula 57

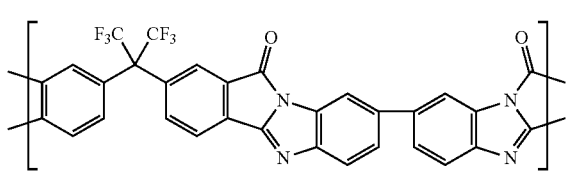

As a result of FT-IR analysis, characteristic bands of the resulting polybenzopyrrolone at 1,758 cm$^{-1}$ (C=O) and 1,625 cm$^{-1}$ (C=N) which were not detected in polyaminoimide were confirmed.

Example 11

A polybenzoxazole represented by Formula 58 was prepared in the same manner as in Example 3, except that 2.68 g (10 mmol) of 1,4,5,8-naphthalenic tetracarboxylic dianhydride as starting materials were reacted with 3.66 g (10 mmol) of 2,2'-bis(3-amino-4-hydroxy-phenyl)hexafluoropropane.

Formula 58

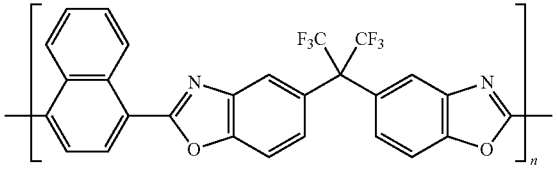

As a result of FT-IR analysis, characteristic bands of the resulting polybenzoxazole at 1,553, 1,480 cm$^{-1}$ (C=N) and 1,058 cm$^{-1}$ (C—O) which were not detected in polyhydroxyimide were confirmed.

Example 12

Chemical Imidization

A 250 ml reactor fitted with a teflon stirring system, an inlet for an nitrogen gas and placed in an oil bath to constantly maintain the reaction temperature at room temperature. The reactor was charged with 3.66 g (10 mmol) of 2,2'-bis(3-amino-4-hydroxy-phenyl)hexafluoropropane and N-methylpyrrolidone (NMP) as a solvent. 4.44 g (10 mmol) of 4,4'-(hexafluoroisopropylidene)diphthalic anhydride (6FDA) was slowly added into the solution. After 4 hours of vigorous stirring, 1.61 ml (20 mmol) of pyridine and 1.89 ml (20 mmol) of acetic anhydride were added to the solution as catalyst for chemical imidization. Subsequently, the oil bath was heated to temperature of 80° C. and allowed to react for about 24 hours to prepare a pale yellow viscous polyhydroxyimide solution.

The solution was cast on a glass plate and cured in vacuum oven for 6 hours at 180° C. Then, vacuum drying was carried out in a vacuum oven at 60° C. for 24 hours in order to completely remove the residual solvent. Consequently, the transparent brownish polyhydroxyimide film (4 cm×4 cm in size; 20-50 μm in thickness) was obtained. The polyhydroxyimide film was placed in the middle of a quartz tube, and thermally treated in the muffled tubular furnace at 450 at a heating rate of 5° C./min under argon flow (100 cm$^3$[STP]/min). Films were held for one hour at 450° C. and then cooled down slowly to room temperature.

As a result of FT-IR analysis, characteristic bands of the resulting polybenzoxazole at 1,553, 1,480 cm$^{-1}$ (C=N) and 1,058 cm$^{-1}$ (C—O) which were not detected in polyhydroxyimide were confirmed.

Example 13

Solution-Thermal Imidization

A polybenzoxazole was prepared in the same manner as in Example 12, except that the pale yellow viscous polyhydroxyamic acid solution was prepared without pyridine and acetic anhydride by solution-thermal imidization at 80° C. for 4 hour and 180° C. for 4 hour in solution. As a result of FT-IR analysis, characteristic bands of the resulting polybenzoxazole at 1,553, 1,480 cm$^{-1}$ (C=N) and 1,058 cm$^{-1}$ (C—O) which were not detected in polyhydroxyimide were confirmed.

Example 14

A 250 ml reactor fitted with a teflon stirring system, an inlet for an nitrogen gas and placed in an oil bath to constantly maintain the reaction at room temperature. The reactor was charged with 3.66 g (10 mmol) of 2,2'-bis(3-amino-4-hydroxy-phenyl)hexafluoropropane and N-methylpyrrolidone (NMP) as a solvent. 4.44 g (10 mmol) of 4,4'-(hexafluoroisopropylidene)diphthalic anhydride was slowly added into the solution. Then, the solution was allowed to react for about 4 hours to prepare a pale yellow viscous polyhydroxyamic acid solution.

The solution was cast on a glass plate and cured in vacuum oven for 2 hours at 100° C., 1 hour for 150° C., 1 hour for 200° C., and 1 hour for 250° C. Then, vacuum drying was carried out in a vacuum oven at 60° C. for 24 hours in order to completely remove the residual solvent. Consequently, the transparent brownish polyhydroxyimide film (4 cm×4 cm in size; 20-50 μm in thickness) was obtained. The polyhydroxyimide film was placed in the middle of a quartz tube, and thermally treated in the muffled tubular furnace at 350° C. at a heating rate of 5° C./min under argon flow (100 cm$^3$[STP]/min). Films were held for one hour at 350° C. and then cooled down slowly to room temperature.

Then, the polybenzoxazole films were treated in 10M HCl solution at one hour, washed with distilled water, and dried at 150° C.

As a result of FT-IR analysis, characteristic bands of the resulting polybenzoxazole at 1,553, 1,480 cm$^{-1}$ (C=N) and 1,058 cm$^{-1}$ (C—O) which were not detected in polyhydroxyimide were confirmed, and a characteristic band of chlorine anion at 920 cm$^{-1}$ was also confirmed.

Example 15

A polybenzoxazole was prepared in the same manner as in Example 14, except adding a final process in which the thermally rearranged films were treated in 10M NaOH solution until the pH was set to 7.

As a result of FT-IR analysis, characteristic bands of the resulting polybenzoxazole at 1,553, 1,480 cm$^{-1}$ (C=N) and 1,058 cm$^{-1}$ (C—O) which were not detected in polyhydroxyimide were confirmed, but a characteristic band of chlorine anion at 920 cm$^{-1}$ was not confirmed.

Example 16

A polybenzoxazole was prepared in the same manner as in Example 14, except adding two final processes in which the thermally rearranged films were treated in 10M NaOH solution until the pH was set to 7, and treated again in 10M HCl solution at one hour, washed and dried at 150° C.

As a result of FT-IR analysis, characteristic bands of the resulting polybenzoxazole at 1,553, 1,480 cm$^{-1}$ (C=N) and 1,058 cm$^{-1}$ (C—O) which were not detected in polyhydroxyimide were confirmed, and a characteristic band of chlorine anion at 920 cm$^{-1}$ was also confirmed.

Example 17

A polybenzoxazole was prepared in the same manner as in Example 14, except that the 10 M HCl solution was substituted for 10 M $H_3PO_4$ solution.

As a result of FT-IR analysis, characteristic bands of the resulting polybenzoxazole at 1,553, 1,480 cm$^{-1}$ (C=N) and 1,058 cm$^{-1}$ (C—O) which were not detected in polyhydroxyimide were confirmed, and a characteristic band of chlorine anion at 1,020 cm$^{-1}$ was also confirmed.

Example 18

Silica-dispersed solution with 5 weight percent was fabricated via dispersion of fumed silica powder (Aerosil 200) with average particle size of 13 nm in N-methylpyrrolidone, and added with content of 1 weight percent into the polyhydroxyamic acid solution in Example 3. The polyhydroxyamic acid solution containing dispersed silica was cast on a glass plate and cured in vacuum oven for 2 hours at 100° C., 1 hour for 150° C., 1 hour for 200° C., and 1 hour for 250° C. Then, vacuum drying was carried out in a vacuum oven at 60° C. for 24 hours in order to completely remove the residual solvent. Consequently, the transparent brownish polyhydroxyimide film (4 cm×4 cm in size; 20-50 μm in thickness) was obtained. The polyhydroxyimide film was placed in the middle of a quartz tube, and thermally treated in the muffled tubular furnace at 450° C. at a heating rate of 5° C./min under argon flow (100 cm³[STP]/min). Films were held for one hour at 450° C. and then cooled down slowly to room temperature.

As a result of FT-IR analysis, characteristic bands of the resulting polybenzoxazole at 1,553, 1,480 cm⁻¹ (C═N) and 1,058 cm⁻¹ (C—O) which were not detected in polyhydroxyimide were confirmed.

Example 19

Zirconium phosphate-dispersed solution with 5 weight percent was fabricated via dispersion of zirconium phosphate powder as a proton conductor in N-methylpyrrolidone as described in J. Membr. Sci. 2003, 226, 169 and added with content of 20 weight percent into the polyhydroxyamic acid solution in Example 3.

The polyhydroxyamic acid solution containing dispersed zirconium phosphate was cast on a glass plate and cured in vacuum oven for 2 hours at 100° C., 1 hour for 150° C., 1 hour for 200° C., and 1 hour for 250° C. Then, vacuum drying was carried out in a vacuum oven at 60° C. for 24 hours in order to completely remove the residual solvent. Consequently, the transparent brownish polyhydroxyimide film (4 cm×4 cm in size; 20-50 μm in thickness) was obtained. The polyhydroxyimide film was placed in the middle of a quartz tube, and thermally treated in the muffled tubular furnace at 450° C. at a heating rate of 5° C./min under argon flow (100 cm³[STP]/min). Films were held for one hour at 450° C. and then cooled down slowly to room temperature.

As a result of FT-IR analysis, characteristic bands of the resulting polybenzoxazole at 1,553, 1,480 cm⁻¹ (C═N) and 1,058 cm⁻¹ (C—O) which were not detected in polyhydroxyimide were confirmed.

Example 20

A polybenzoxazole represented by Formula 59 was prepared in the same manner as in Example 3, except that 4.44 g (10 mmol) of 4,4'-(hexafluoroisopropylidene)diphthalic anhydride as starting materials were reacted with 2.16 g (10 mmol) of 3,3'-dihydroxybenzidine.

Formula 59

As a result of FT-IR analysis, characteristic bands of the resulting polybenzoxazole at 1,553, 1,480 cm⁻¹ (C═N) and 1,052 cm⁻¹ (C—O) which were not detected in polyhydroxyimide were confirmed.

Example 21

A polybenzopyrrolone represented by Formula 60 was prepared in the same manner as in Example 3, except that 3.10 g (10 mmol) of 4,4'-oxydiphthalic anhydride as starting materials were reacted with 2.84 g (10 mmol) of benzene-1,2,4,5-tetramine tetrahydrochloride.

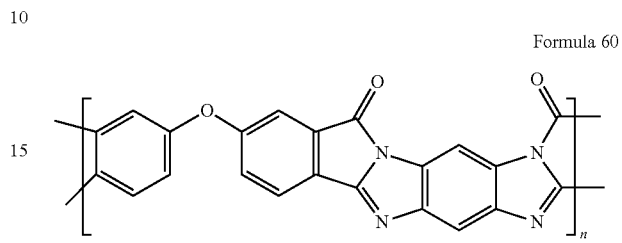

Formula 60

As a result of FT-IR analysis, characteristic bands of the resulting polybenzopyrrolone at 1,758 cm⁻¹ (C═O) and 1,625 cm⁻¹ (C═N), which were not detected in polyaminoimide were confirmed.

Example 22

A benzoxazole copolymer (molar ratio of benzoxazole:benzoxazole=5:5) represented by Formula 61 was prepared in the same manner as in Example 3, except that 5.88 g (20 mmol) of 3,3',4,4'-biphenyltetracarboxylic anhydride as starting materials were reacted with 3.66 g (10 mmol) of 2,2'-bis(3-amino-4-hydroxy-phenyl)hexafluoropropane and 2.16 g (10 mmol) of 3,3'-dihydroxybenzidine.

Formula 61

As a result of FT-IR analysis, characteristic bands of the resulting polybenzoxazole at 1,553, 1,480 cm⁻¹ (C═N) and 1,058 cm⁻¹ (C—O) which were not detected in polyhydroxyimide were confirmed.

Example 23

A benzoxazole-imide copolymer (molar ratio of benzoxazole:imide=8:2) represented by Formula 62 was prepared in the same manner as in Example 3, except that 6.45 g (20 mmol) of 3,3',4,4'-benzophenonetetracarboxylic dianhydride as starting materials were reacted with 5.86 g (16 mmol) of 2,2'-bis(3-amino-4-hydroxy-phenyl)hexafluoropropane and 0.8 g (4 mmol) of 4,4'-diaminodiphenylether.

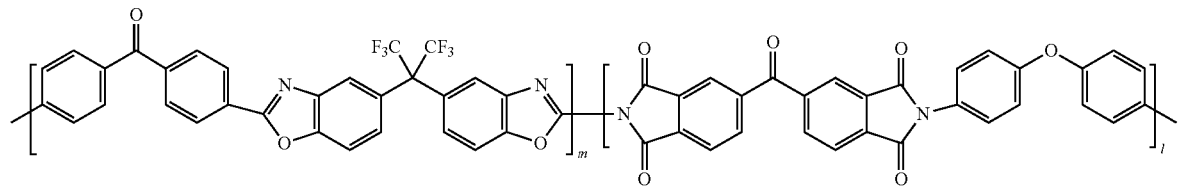

Formula 62

As a result of FT-IR analysis, the resulting benzoxazole-imide copolymer (molar ratio of benzoxazole:imide=8:2) copolymer thus prepared showed characteristic bands of polybenzoxazole block at 1,553, 1,480 cm$^{-1}$ (C=N) and 1,058 cm$^{-1}$ (C—O), and characteristic bands of polyimide block at 1,720 cm$^{-1}$ (C=O) and 1,580 cm$^{-1}$ (C=O).

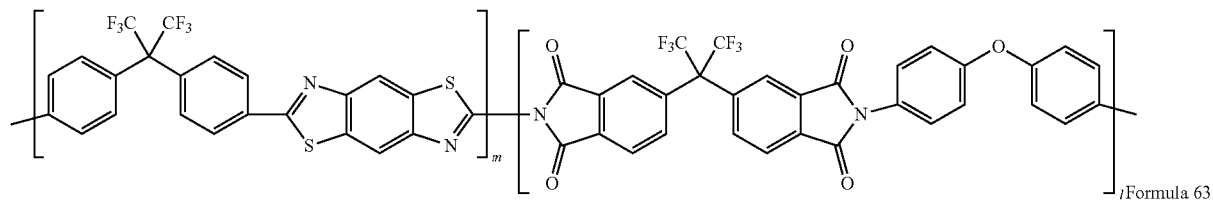

Formula 64

Example 24

A benzopyrrolone-imide copolymer (molar ratio of benzopyrrolone:imide=8:2) represented by Formula 63 was prepared in the same manner as in Example 3, except that 4.44 g (10 mmol) of 4,4'-(hexafluoroisopropylidene)diphthalic anhydride as starting materials were reacted with 1.71 g (8 mmol) of 3,3'-diaminobenzidine and 0.4 g (2 mmol) of 4,4'-diaminodiphenylether. As a result of FT-IR analysis, the resulting benzopyrrolone-imide copolymer (molar ratio of benzopyrrolone:imide=8:2) copolymer showed characteristic bands of polypyrrolone block at 1,758 cm$^{-1}$ (C=O) and 1,625 cm$^{-1}$ (C=N) and characteristic bands of polyimide block at 1,720 cm$^{-1}$ (C=O) and 1,580 cm$^{-1}$ (C=O).

Example 25

A benzothiazole-imide copolymer (molar ratio of benzothiazole:imide=8:2) represented by Formula 64 was prepared in the same manner as in Example 3, except that 8.88 g (10 mmol) of 4,4'-(hexafluoroisopropylidene)diphthalic anhydride as starting materials were reacted with 3.30 g (16 mmol) of 2,5-diamino-1,4-benzenedithiol dihydrochloride and 0.8 g (4 mmol) of 4,4'-diaminodiphenylether.

As a result of FT-IR analysis, the resulting benzothiazole-imide copolymer (molar ratio of benzothiazole:imide=8:2) copolymer showed characteristic bands of polybenzothiazole block at 1,484 cm$^{-1}$ (C—S) and 1,404 cm$^{-1}$ (C—S) and characteristic bands of polyimide block at 1,720 cm$^{-1}$ (C=O) and 1,580 cm$^{-1}$ (C=O).

Example 26

A benzoxazole-thiazole copolymer (molar ratio of benzoxazole:thiazole=5:5) represented by Formula 65 was prepared in the same manner as in Example 3, except that 2.94 g (10 mmol) of 3,3',4,4'-biphenyltetracarboxylic anhydride as starting materials were reacted with 1.08 g (5 mmol) of 3,3'-dihydroxybenzidine and 1.09 g (5 mmol) of 2,5-diamino-1,4-benzenedithiol dihydrochloride.

Formula 65

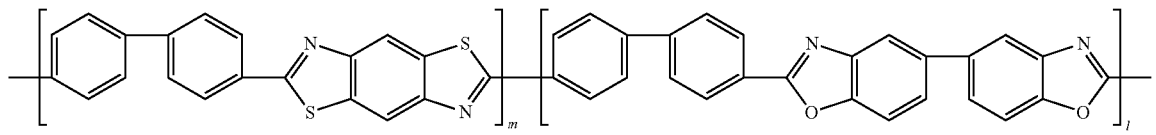

As a result of FT-IR analysis, the resulting benzoxazole-thiazole copolymer (molar ratio of benzoxazole:thiazole=5:5) copolymer showed characteristic bands of polybenzoxazole block at 1,595, 1,480 cm$^{-1}$ (C=N) and 1,052 cm$^{-1}$ (C—O), and characteristic bands of polybenzothiazole block at 1,484 cm$^{-1}$ (C—S) and 1,404 cm$^{-1}$ (C—S) which were not detected in polyimide were confirmed.

Example 27

A benzopyrrolone copolymer (molar ratio of benzopyrrolone:benzopyrrolone=8:2) represented by Formula 66 was prepared in the same manner as in Example 3, except that 8.88 g (20 mmol) of 4,4'-(hexafluoroisopropylidene)diphthalic anhydride as starting materials were reacted with 3.42 g (16 mmol) of 3,3'-diaminobenzidine and 1.14 g (4 mmol) of benzene-1,2,4,5-tetramine tetrahydrochloride.

Formula 66

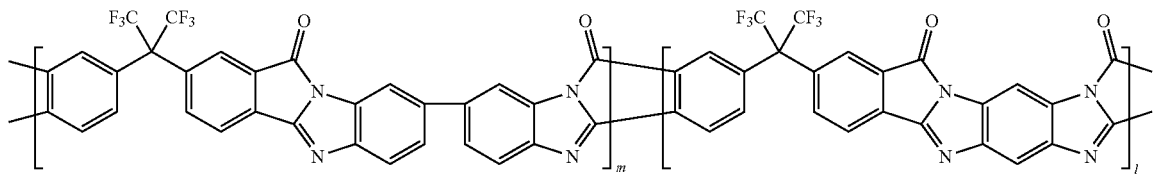

As a result of FT-IR analysis, characteristic bands of the resulting polybenzopyrrolone at 1,758 cm$^{-1}$ (C=O) and 1,625 cm$^{-1}$ (C=N), which were not detected in polyaminoimide, were confirmed.

Example 28

A benzoxazole-imide copolymer (molar ratio of benzoxazole:benzothiazole=5:5) represented by Formula 67 was prepared in the same manner as in Example 3, except that 2.94 g (10 mmol) of 3,3',4,4'-biphenyltetracarboxylic dianhydride as starting materials were reacted with 1.83 g (5 mmol) of 2,2'-bis(3-amino-4-hydroxy-phenyl)hexafluoropropane and 1.00 g (5 mmol) of 4,4'-diaminodiphenylether.

As a result of FT-IR analysis, the resulting benzoxazole-imide copolymer (molar ratio of benzoxazole:imide=5:5) copolymer thus prepared showed characteristic bands of polybenzoxazole block at 1,553, 1,480 cm$^{-1}$ (C=N) and 1,058 cm$^{-1}$ (C—O), and characteristic bands of polyimide block at 1,720 cm$^{-1}$ (C=O) and 1,580 cm$^{-1}$ (C=O).

Example 29

A benzoxazole-imide copolymer (molar ratio of benzoxazole:imide=2:8) was prepared in the same manner as in Example 28, except that copolymerization ratio of benzoxazole to imide was adjusted to 2:8.

Example 30

A benzoxazole-imide copolymer (molar ratio of benzoxazole:imide=8:2) was prepared in the same manner as in Example 28, except that copolymerization ratio of benzoxazole to imide was adjusted to 8:2.

Comparative Example 1

A 250 ml reactor fitted with a teflon stirring system, an inlet for an nitrogen gas and placed in an oil bath to constantly maintain the reaction temperature at room temperature. The reactor was charged with 3.66 g (10 mmol) of 2,2'-bis(3-amino-4-hydroxy-phenyl)hexafluoropropane and N-methylpyrrolidone (NMP) as a solvent. 4.44 g (10 mmol) of 4,4'-(hexafluoroisopropylidene)diphthalic anhydride was slowly added into the solution. Then, the solution was allowed to react for about 4 hours to prepare a pale yellow viscous polyhydroxyamic acid solution.

The solution was cast on a glass plate and cured in vacuum oven for 2 hours at 100° C., 1 hour for 150° C., 1 hour for 200°

Formula 67

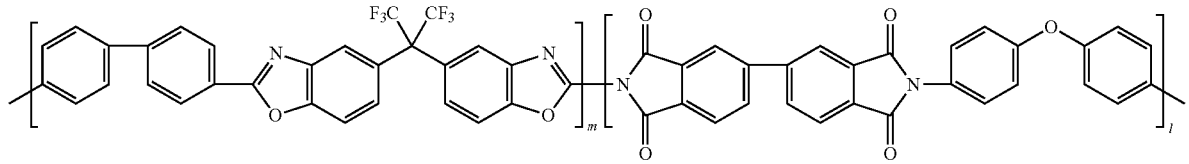

C., and 1 hour for 250° C. Then, vacuum drying was carried out in a vacuum oven at 60° C. for 24 hours in order to completely remove the residual solvent. Consequently, the transparent brownish polyhydroxyimide film (4 cm×4 cm in size; 20-50 μm in thickness) was obtained. The polyhydroxyimide film was placed in the middle of a quartz tube, and thermally treated in the muffled tubular furnace at 300° C. at a heating rate of 5° C./min under argon flow (100 cm³[STP]/min). Films were held for one hour at 300° C. and then cooled down slowly to room temperature.

Comparative Example 2

A polythiolimide was prepared in the same manner as in Comparative Example 1, except that 4.44 g (10 mmol) of 4,4'-(hexafluoroisopropylidene)diphthalic anhydride as starting materials were reacted with 2.08 g (10 mmol) of 2,5-diamino-1,4-benzenedithiol dihydrochloride.

Comparative Example 3

A polyaminoimide was prepared in the same manner as in Comparative Example 1, except that 4.44 g (10 mmol) of 4,4'-(hexafluoroisopropylidene)diphthalic anhydride as starting materials were reacted with 2.14 g (10 mmol) of 3,3'-diaminobenzidine.

Comparative Example 4

A polybenzoxazole was prepared in the same manner as in Comparative Example 1, except that 3.10 g (10 mmol) of 4,4'-oxydiphthalic anhydride as starting materials were reacted with 3.66 g (10 mmol) of 2,2'-bis(3-amino-4-hydroxy-phenyl)hexafluoropropane.

Comparative Example 5

A polybenzoxazole was prepared in the same manner as in Comparative Example 1, except that 2.18 g (10 mmol) of 1,2,4,5-benzenetetracarboxylic dianhydride as starting materials were reacted with 3.66 g (10 mmol) of 2,2'-bis(3-amino-4-hydroxy-phenyl)hexafluoropropane.

Comparative Example 6

A polybenzoxazole was prepared in the same manner as in Comparative Example 1, except that 3.22 g (10 mmol) of 3,3',4,4'-benzophenone tetracarboxylic dianhydride as starting materials were reacted with 3.66 g (10 mmol) of 2,2'-bis(3-amino-4-hydroxy-phenyl)hexafluoropropane.

Comparative Example 7

A polybenzoxazole was prepared in the same manner as in Example 3, except that 2.94 g (10 mmol) of 3,3',4,4'-biphenyl tetracarboxylic dianhydride as starting materials were reacted with 3.66 g (10 mmol) of 2,2'-bis(3-amino-4-hydroxy-phenyl)hexafluoropropane.

Comparative Example 8

A carbon molecular sieve film was prepared from carbonizing polyimide (Kapton®, Du Pont) at 600° C.
In detail, a commercial polyimide film prepared from equimolar 1,2,4,5-benzenetetracarboxylic dianhydride and 4,4'-diaminodiphenylether as starting materials was placed in the middle of a quartz tube, and thermally treated in the muffled tubular furnace at 600° C. at a heating rate of 5° C./min under argon flow (100 cm³[STP]/min). Films were held for one hour at 600° C. and then cooled down slowly to room temperature.

Comparative Example 9

A carbon molecular sieve film was prepared in the same manner as in Comparative Example 8, except that polyimide film (Kapton®, Du Pont) was carbonized at 800° C.

Comparative Example 10

A carbon molecular sieve film was prepared from carbonizing polyhydroxyimide of Comparative Example 1, except that the polyhydroxyimide film was carbonized at 600° C.

Comparative Example 11

As described in J. Polym. Sci., Part B: Polym. Phys. 30, 1215, 2,2'-bis(trimethylsilylamino-4-trimethylsiloxy-phenyl)-1,1,1,3,3,3-hexafluoropropane and hexafluoroisopropylidenebiphenyl-4,4-dicarboxylic acid chloride with the same equivalent was dissolved in dimethylacetamide at 0° C., and reacted to obtain poly(o-hydroxyamide). The solution was cast on a glass plate and thermal-treated at 300° C. under an inert atmosphere. Consequently, polybenzoxazole film was obtained.

Experimental Example 1

FT-IR Analysis

Figure 2:
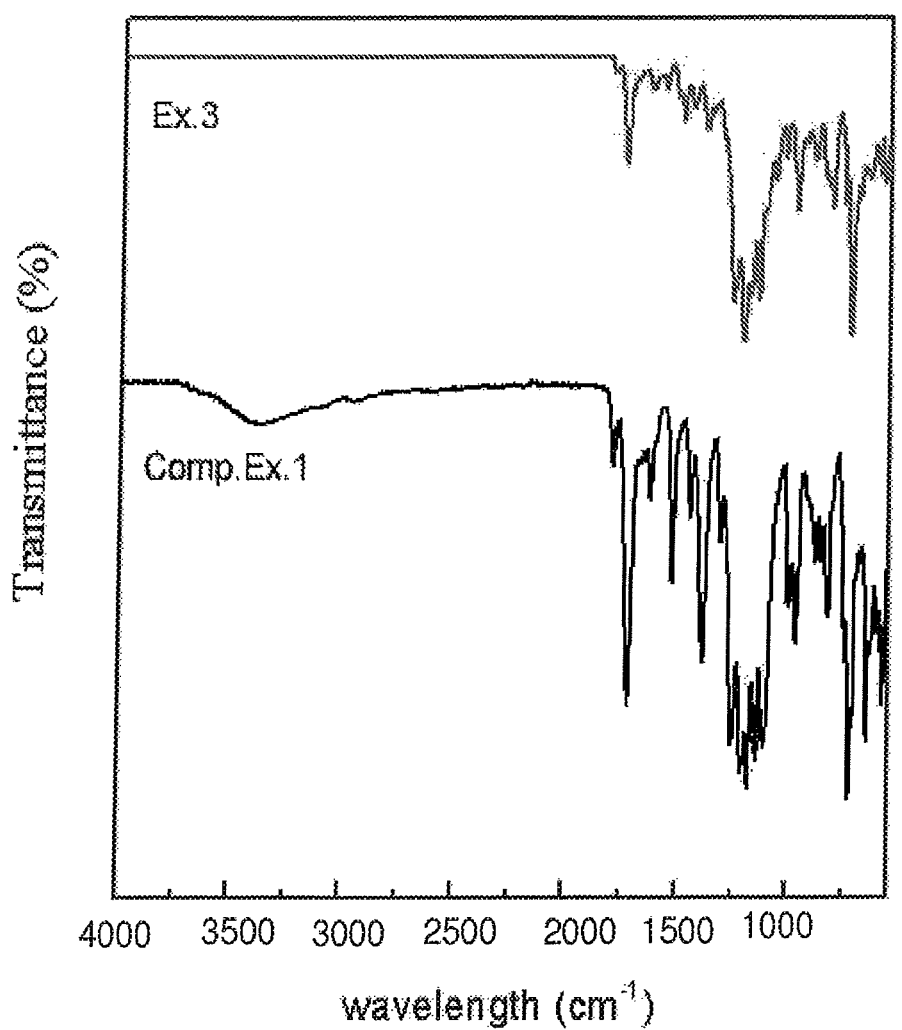
FIG. 2 is FT-IR spectra of polymer compounds of Example 3 and Comparative Example 1.
Figure 3:
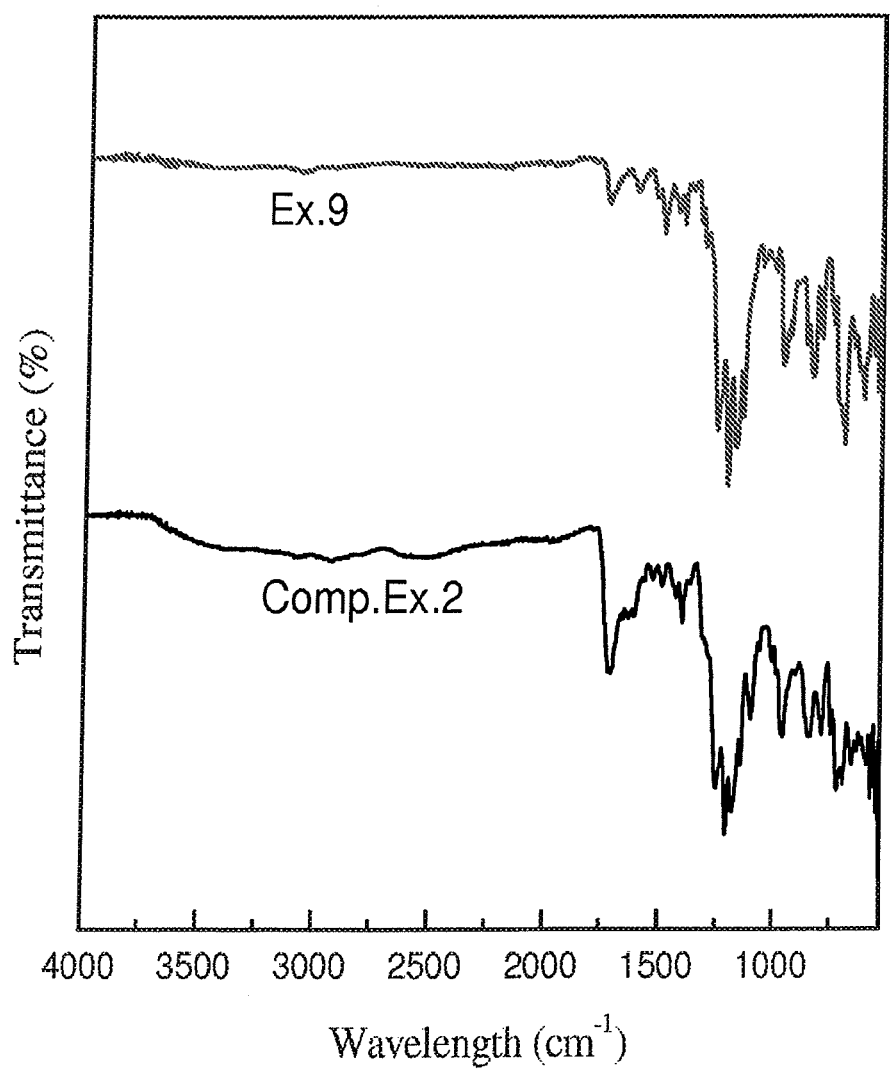
FIG. 3 is FT-IR spectra of polymer compounds of Example 9 and Comparative Example 2.
Figure 4:
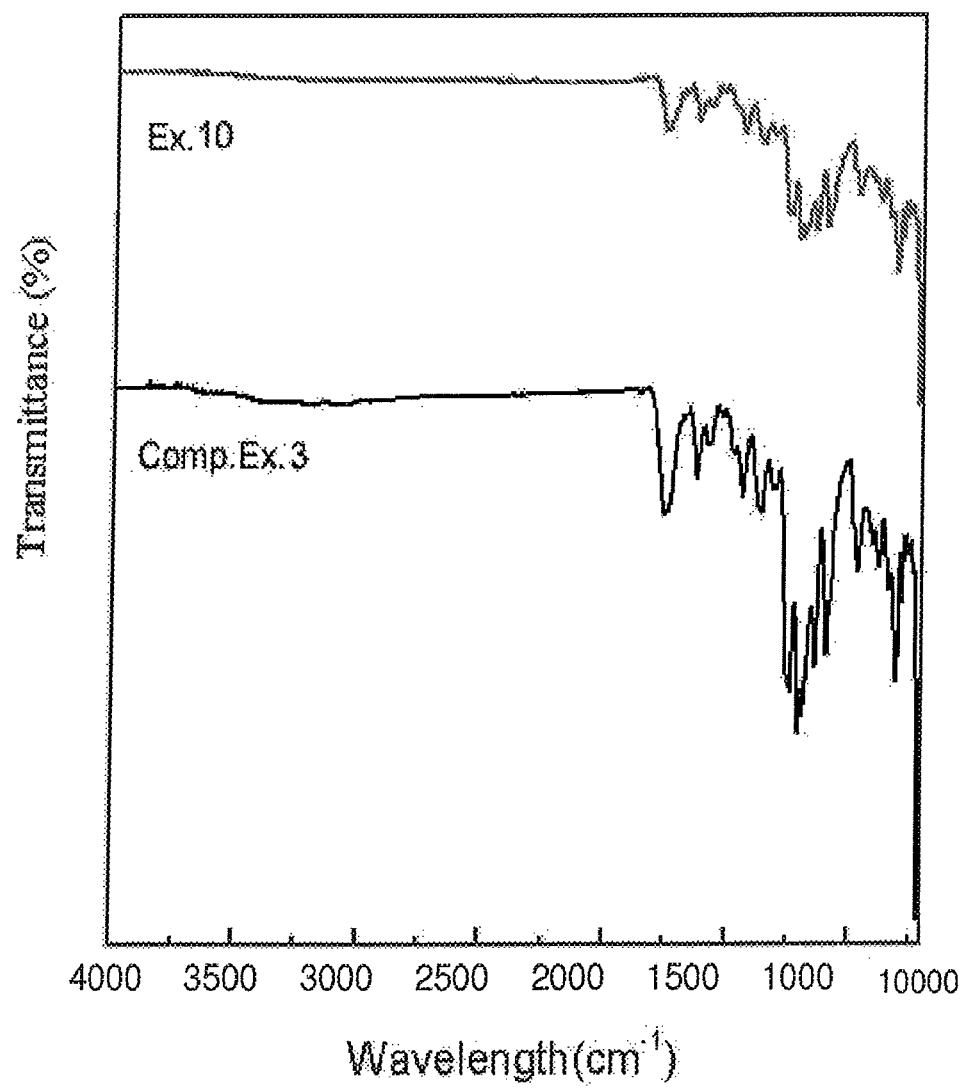
FIG. 4 is FT-IR spectra of polymer compounds of Example 10 and Comparative Example 3.

In order to characterize precursor and polymer compounds, ATR-FTIR spectra were obtained using an Infrared Microspectrometer (IlluminatIR, SensIR Technologies, Danbury, Conn., USA).
FIG. 2 is FT-IR spectra of polymer compounds of Example 3 and Comparative Example 1.
As can be seen from FIG. 2, in case of polyhydroxyimide of Comparative Example 1, characteristic peak of HO-phenylene at 3,400 cm$^{-1}$, characteristic imide peaks at 1,788 cm$^{-1}$ and 1,618 cm$^{-1}$ were observed, In addition, characteristic carbonyl group peak was observed at 1,720 cm$^{-1}$. On the other hand, in case of polybenzoxazole of Example 3, characteristic benzoxazole peaks were observed at 1,553, 1,480 and 1,052 cm$^{-1}$. It can be confirmed from FT-IR spectra that polyhydroxyimide of Comparative Example 1 was converted to polybenzoxazole of Example 3 by thermal treatment.
In addition, Examples 1, 2, 5 to 8, 11 to 20 and 22 which contain the similar structure and same functional groups to Example 3, and Comparative Examples 4 to 7 to Comparative Example 1 showed the same spectra with Example 3 and Comparative Example 1, respectively. FIG. 3 is FT-IR spectra of polymer compounds of Example 9 and Comparative Example 2.
As shown in FIG. 3, in case of polythiolimide of Comparative Example 2, characteristic broad and weak band of —SH at 2,400 to 2,600 cm$^{-1}$, characteristic imide peaks at 1,793 cm$^{-1}$ and 1,630 cm$^{-1}$ and characteristic carbonyl group peak at 1,720 cm$^{-1}$ were observed. On the other hand, in case of polybenzothiazole of Example 9, characteristic benzothiazole peaks were observed at 1,480 and 1,404 cm$^{-1}$. It can be confirmed from FT-IR spectra that polythiolimide of Comparative Example 2 was converted to polybenzothiazole of Example 9 by thermal treatment.
FIG. 4 is FT-IR spectra of polymer compounds of Example 10 and Comparative Example 3.

As can be seen from FIG. 4, in case of polyaminoimide of Comparative Example 3, characteristic broad and weak band of —$NH_2$ at 2,900 to 3,400 $cm^{-1}$, characteristic imide peaks at 1,793 $cm^{-1}$ and 1,630 $cm^{-1}$ and characteristic carbonyl group peak at 1,720 $cm^{-1}$ were observed. On the other hand, in case of polybenzopyrrolone of Example 10, characteristic polybenzopyrrolone peaks were observed at 1,758 (C=O) and 1,625 $cm^{-1}$ (C=N). It can be confirmed from FT-IR spectra that polyaminoimide of Comparative Example 3 was converted to polybenzopyrrolone of Example 10 by thermal treatment.

In addition, Examples 21 and 27 which contain the similar structure and same functional groups to Example 10 showed the same infrared spectra with Example 10.

Experimental Example 2

Thermogravimetric Analysis/Mass Spectroscopy (TGA-MS)

Figure 6:
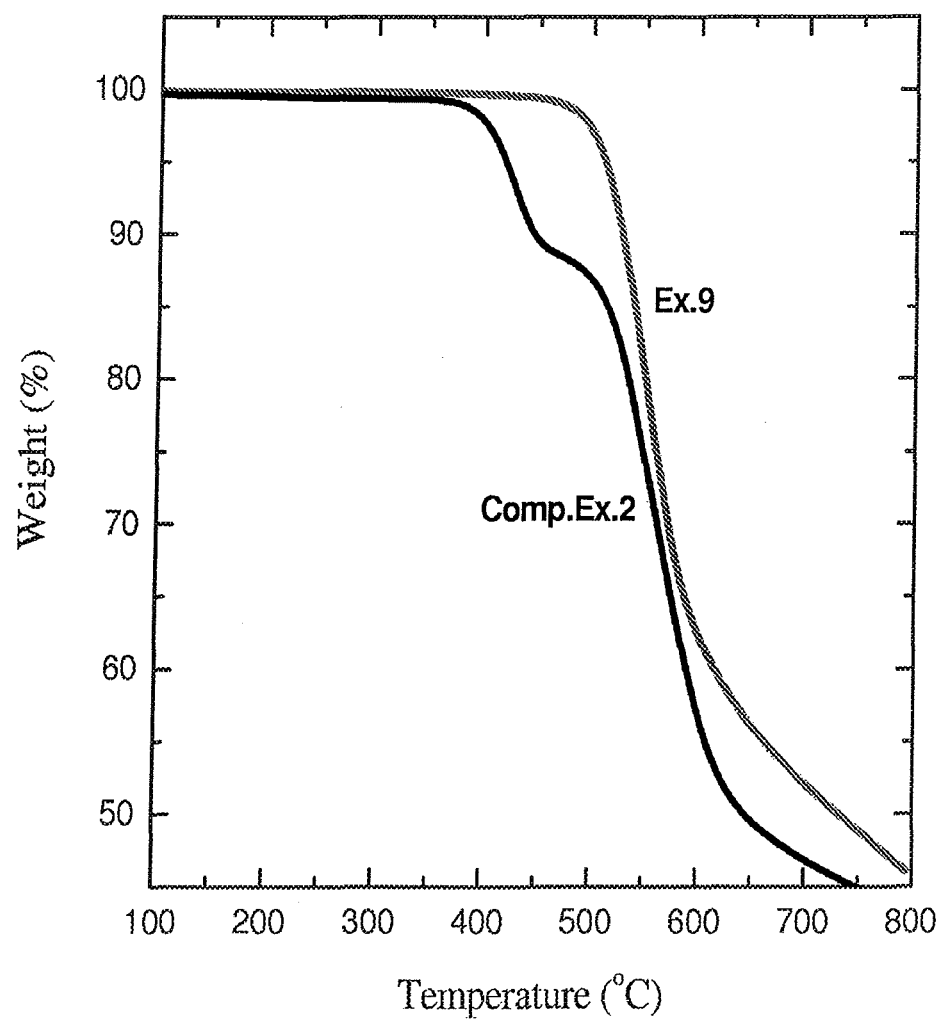
FIG. 6 is a TGA-MS thermogram of polythiolimide of Comparative Example 2 (precursor of Example 9) and Example 9.
Figure 7:
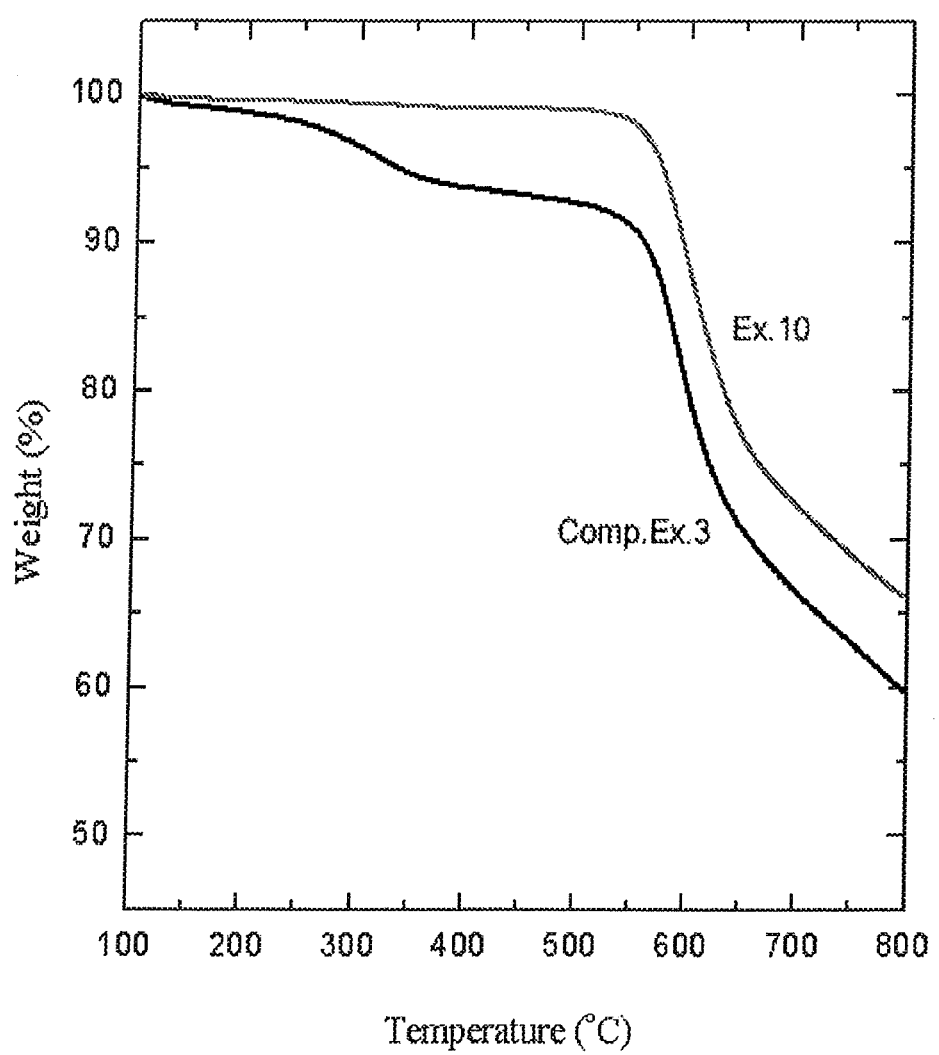
FIG. 7 is a TGA-MS thermogram of polyaminoimide of Comparative Example 3 (precursor of Example 10) and Example 10.

The polyimides of Comparative Example 1, 2, and 3, the polybenzoxazoles of Examples 1, 3 and 4, the polybenzothiazole of Example 9, and the polybenzopyrrolone of Example 10 were subjected to thermogravimetric analysis/mass spectroscopy (TGA-MS) to confirm the weight loss occurred from the thermal rearrangement. The TGA-MS was carried out using TG 209 F1 Iris and QMS 403C Aeolos (NETZSCH, Germany), while injecting Ar into each precursor membrane. At this time, heating rate was 10° C./min and Ar purge flow was 90 $cm^3$ (STP)/min. The results thus obtained are shown in FIGS. 5, 6 and 7.

Figure 5:
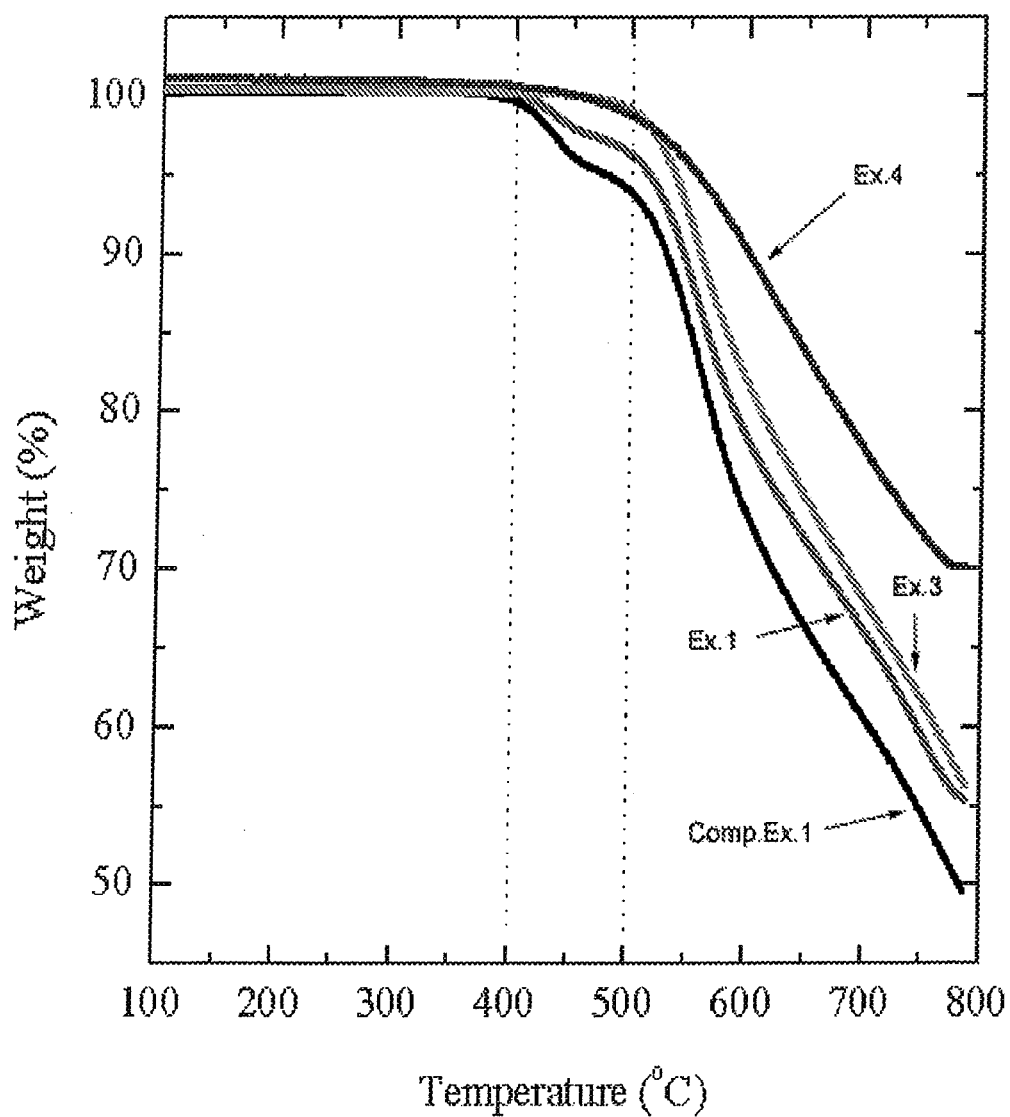
FIG. 5 is a TGA-MS thermogram of polyhydroxyimide of Comparative Example 1 and Examples 1, 3 and 4.

FIG. 5 is a TGA-MS thermogram of polyhydroxyimide of Comparative Example 1 and polybenzoxazole of Examples 1, 3 and 4.

As can be seen from FIG. 5, the thermal degradation of the polybenzoxazoles of Examples 3 and 4 is not observed within the thermal conversion temperature of 400 to 500° C. On the other hand, the polyhydroxyimide of Comparative Example 1 and the polybenzoxazole of Example 1 began to be thermally arranged at a thermal conversion temperature of 400 to 500° C. The polybenzoxazole of Example 1 which was treated at 350° C., a relatively lower temperature to complete the thermal conversion process, showed further conversion at the temperature range of 400 to 500° C. The evolved gas component was subjected to MS to confirm the presence of $CO_2$. According to elimination of $CO_2$, the weight of polyhydroxyimide of Comparative Example 1 and polybenzoxazole of Example 1 decreased 6 to 8%, 4 to 5% respectively at the temperature range of 400 to 500° C. due to the thermal rearragement through thermal treatment, but the weight of polybenzoxazoles of Examples 3 and 4 did not decrease to 500° C.

In addition, Examples 2, 5 to 8, 11 to 20 and 22 which contain the similar structure and same functional groups to Example 3, and Comparative Examples 4 to 7 to Comparative Example 1 showed the similar thermal decomposition curves to Example 3 and Comparative Example 1, respectively. FIG. 6 is a TGA-MS thermogram of polythiolimide of Comparative Example 2 (precursor of Example 9) and Example 9.

As can be seen from FIG. 6, the thermal degradation of the polybenzothiazole of Example 9 is not observed within the thermal conversion temperature of 400 to 500° C. On the other hand, the polythiolimide of Comparative Example 2 began to be thermally rearranged at a temperature range of 400 to 500° C. The evolved gas component was subjected to MS to confirm the presence of $CO_2$. According to elimination of $CO_2$, the weight of polythiolimide of Comparative Example 2 decreased 12 to 14% at the temperature range of 400 to 500° C. due to the thermal rearrangement through thermal treatment, but the weight of polybenzothiazoles of Example 9 did not decrease to 500° C.

FIG. 7 is a TGA-MS thermogram of polyaminoimide of Comparative Example 3 (precursor of Example 10) and Example 10.

As can be seen from FIG. 7, the thermal degradation of the polybenzopyrrolone of Example 10 is not observed within the thermal conversion temperature of 300 to 500° C. On the other hand, the polyaminoimide of Comparative Example 3 began to be thermally rearranged at a temperature range of 300 to 500° C. The evolved gas component was subjected to MS to confirm the presence of $H_2O$. According to elimination of $H_2O$. The weight of polyaminoimide of Comparative Example 3 decreased 7 to 9% at the temperature range of 300 to 500° C. due to the thermal rearrangement through thermal treatment, but the weight of polybenzothiazole of Example 10 did not decrease to 500° C.

In addition, Examples 21 and 27 which contain the similar structure and same functional groups to Example 10 showed the similar thermal decomposition curves to Example 10.

From these data, we can see that thermal resistance of the present invention thermally treated at high temperature is very good.

Experimental Example 3

Elemental Analysis

To observe structure change of the polymer compounds of Examples 1 to 4 and Comparative Example 1, elemental analyzer (Carlo Erba/Fison Inc, ThermoFinnigan EA1108) was engaged, $WO_3$/Cu was engaged as a catalyst, BBOT (2,5-bis(5-tert-butyl-benzoxazole-2-yl)thiophene) was engaged as Standard material. Table 1 shows the test result of examples at 1000° C.

TABLE 1

| Polymer | Formula | C (wt %) | H (wt %) | N (wt %) | O (wt %) | F (wt %) |
| --- | --- | --- | --- | --- | --- | --- |
| Ex. 1 | — | 54.1 ± 0.16 | 2.07 ± 0.00 | 3.87 ± 0.01 | 9.34 ± 0.18 | 30.6 ± 0.02 |
| Ex. 2 | — | 55.2 ± 0.01 | 2.02 ± 0.01 | 4.05 ± 0.00 | 7.23 ± 0.03 | 31.5 ± 0.04 |
| Ex. 3 | $[C_{32}H_{14}F_{12}N_2O_2]_n$ | 56.7 ± 0.01 (55.9)* | 1.93 ± 0.02 (2.06)* | 4.21 ± 0.01 (4.08)* | 4.89 ± 0.12 (4.66)* | 32.3 ± 0.12 (33.2)* |
| Comp. Ex. 1 | $[C_{34}H_{14}F_{12}N_2O_6]_n$ | 53.2 ± 0.08 (52.7)* | 1.87 ± 0.06 (1.82)* | 3.62 ± 0.01 (3.62)* | 11.3 ± 0.22 (11.3)* | 30.0 ± 0.08 (29.4)* |

*Calculated value
Measured using ThermoFinnigan (Carlo Erba/Fison) EA1108
Temperature: 1000° C., (1060° C. for $O_2$)

TABLE 1-continued

| Polymer | Formula | C (wt %) | H (wt %) | N (wt %) | O (wt %) | F (wt %) |
|---------|---------|----------|----------|----------|----------|----------|

Catalyst: $WO_3$/Cu (Nickel plated carbon, nickel wool, quartz turnings, soda lime, magnesium perchlorate anhydrone for O)
Sample mass: 5 mg, (2 mg for O)
Measured elements: C, H, N, O
Standard material: BBOT (2,5-bis(5-tert-butyl-benzoxazole-2-yl) thiophene), (sulfanilamide for O)

Referring table 1, polyhydroxyimide of Comparative Example 1 must be comprised of 52.7% C, 1.82% H, 3.62% N, 11.3% O, 29.4% F in the abstract. The constituents of polyhydroxyimide of Comparative Example 1 (53.2±0.08% C, 1.87±0.06% H, 3.62±0.01% N, 11.3±0.22% O, 30.0±0.08% F) was consistent with the above theoretic polyhydroxyimide constituents.

In addition, polybenzoxazole of Example 3 must be comprised of 55.9% C, 2.06% H, 4.08% N, 4.66% O, 33.2% F in the abstract. The constituents of polybenzoxazole of Example 3 (56.7±0.01% C, 1.93±0.02% H, 4.21±0.01% N, 4.89±0.12% O, 32.3±0.12% F) was consistent with the above theoretic polybenzoxazole constituents.

From these data, we can confirm that the formula of the thermally rearranged polymer compounds of the present invention is consistent with the supposed chemical formula.

Experimental Example 4

Mechanical Properties

The mechanical properties of the precursor and polymer films shown were measured at 25° C. using AGS-J 500N (shimadzu). Five specimens of each sample were tested. Standard deviation from the mean was within ±5%. The results thus obtained are shown in Table 2.

TABLE 2

| Sample | Tensile strength (MPa) | Elongation percent at break (%) |
|--------|------------------------|--------------------------------|
| Ex. 1 | 87 | 3.8 |
| Ex. 2 | 95 | 3.5 |
| Ex. 3 | 98 | 3.9 |
| Ex. 4 | 101 | 3.2 |
| Ex. 5 | 96 | 4.7 |
| Ex. 6 | 104 | 4.2 |
| Ex. 7 | 109 | 3.1 |
| Ex. 8 | 103 | 4.1 |
| Ex. 9 | 95 | 5.7 |
| Ex. 10 | 88 | 4.2 |
| Ex. 11 | 96 | 3.7 |
| Ex. 12 | 92 | 5.2 |
| Ex. 13 | 88 | 2.6 |
| Ex. 20 | 117 | 4.2 |
| Ex. 21 | 109 | 5.3 |
| Ex. 22 | 98 | 5.9 |
| Ex. 23 | 84 | 6.7 |
| Ex. 24 | 91 | 5.5 |
| Ex. 25 | 101 | 4.5 |
| Ex. 26 | 96 | 3.2 |
| Ex. 27 | 88 | 3.8 |
| Ex. 28 | 96 | 5.2 |
| Ex. 29 | 82 | 6.7 |
| Ex. 30 | 95 | 4.3 |
| Comp. Ex. 1 | 83 | 3.1 |
| Comp. Ex. 2 | 76 | 4.2 |
| Comp. Ex. 3 | 75 | 4.8 |
| Comp. Ex. 4 | 81 | 3.5 |
| Comp. Ex. 5 | 90 | 2.5 |
| Comp. Ex. 6 | 78 | 3.3 |
| Comp. Ex. 7 | 85 | 3.1 |
| Comp. Ex. 8 | 42 | 0.4 |
| Comp. Ex. 9 | 52 | 0.3 |
| Comp. Ex. 10 | 34 | 0.6 |

As can be seen from Table 2, the polymer compounds of the present invention showed better tensile strength and elongation percent than that of Comparative Example, because the polyimide main chain structure was changed into stiff and rigid aromatic-connected polybenzoxazole structure through thermal rearrangement. Therefore, it is advantageous that the polymer compounds of the present invention can endure harsh conditions such as long operation temperature, acidic conditions and high humidity due to the rigid polymer backbone present in the polymer compounds.

Experimental Example 5

Adsorption and Desorption Isotherm Analysis

This experiment was performed to determine $N_2$ adsorption/desorption characteristics of the polymer compounds according to the present invention. $N_2$ adsorption isotherms of the polymer compounds were measured by a BET method. The results thus obtained are shown in FIGS. 8 to 9.

Figure 8:
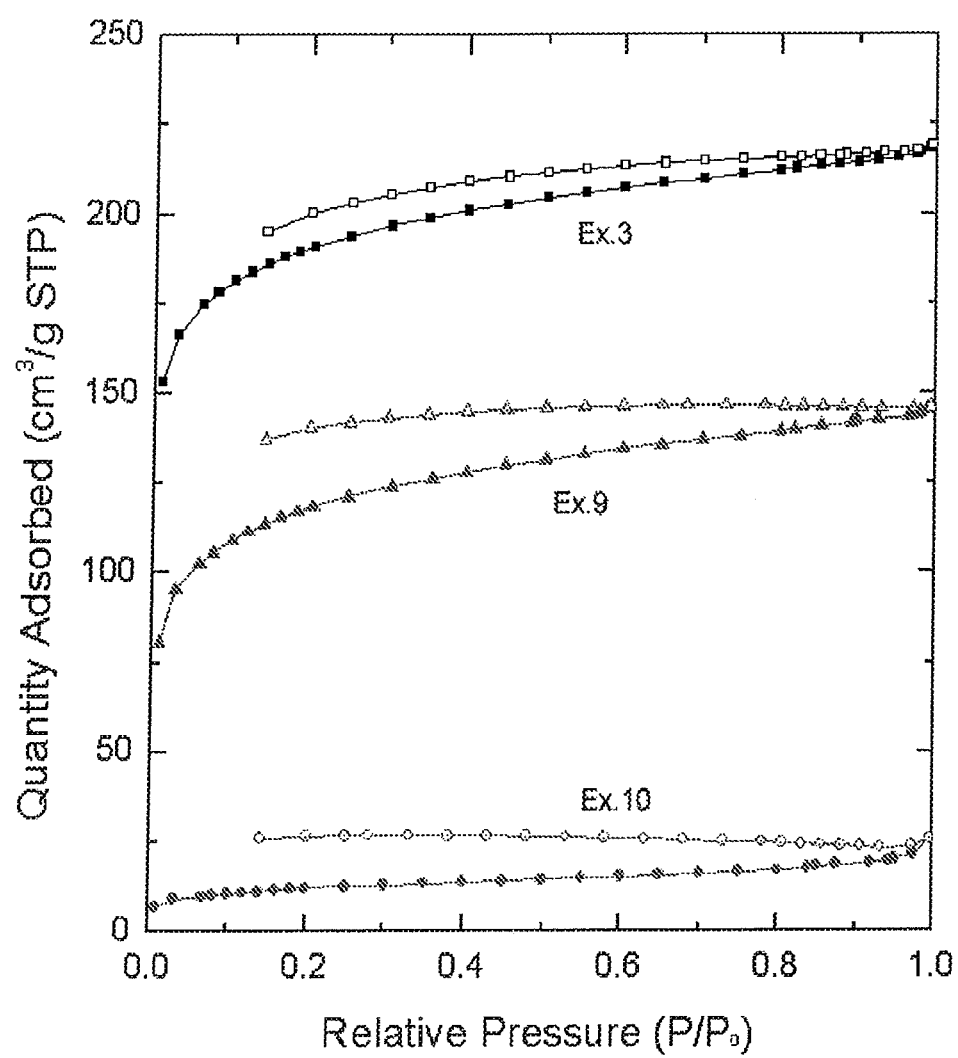
FIG. 8 is nitrogen adsorption/desorption isotherms at −196° C. for Examples 3, 9 and 10.

FIG. 8 is nitrogen adsorption/desorption isotherms at −196° C. for Examples 3, 9 and 10. FIG. 9 is nitrogen adsorption/desorption isotherms at −196° C. for Examples 3, 5, 6, 7 and 8.

Figure 9:
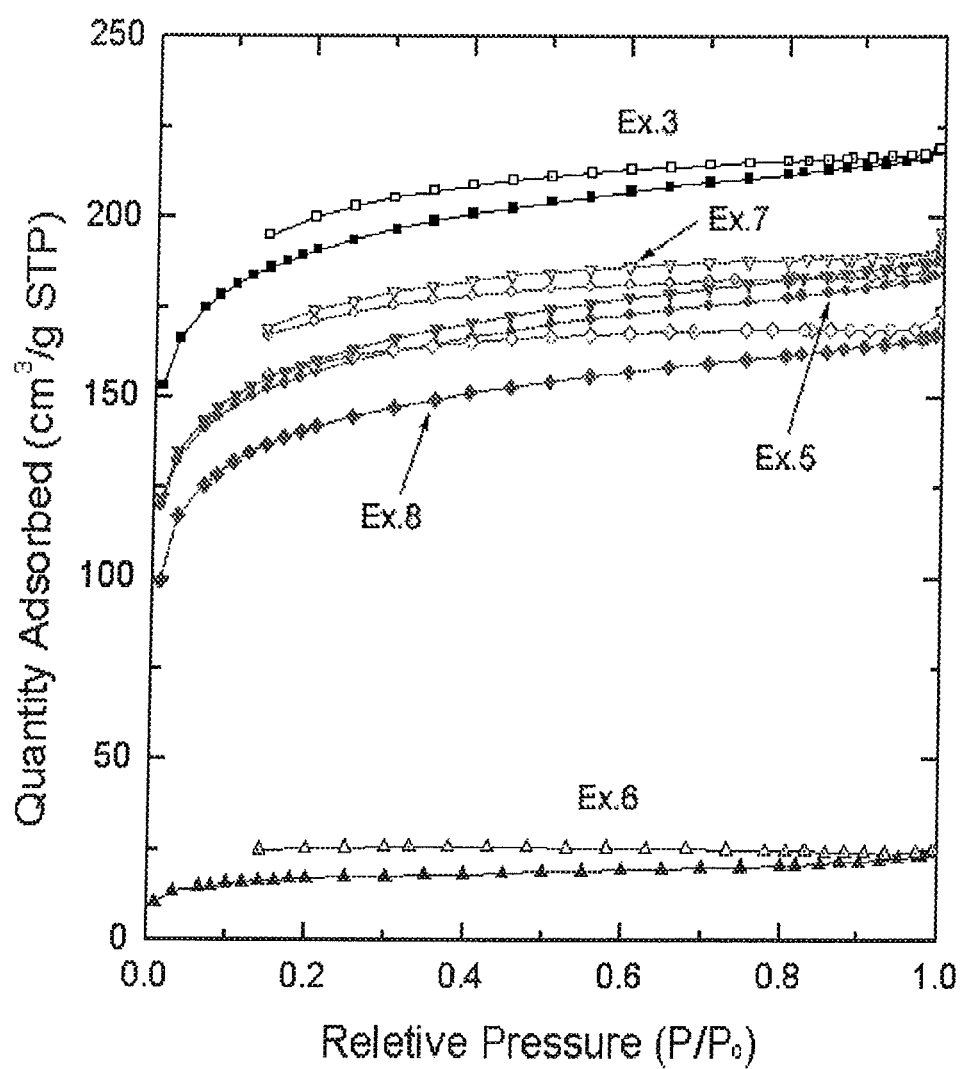
FIG. 9 is nitrogen adsorption/desorption isotherms at −196° C. for Examples 3, 5, 6, 7 and 8.

As shown in FIGS. 8 and 9, the nitrogen adsorption/desorption isotherm of the present invention are the irreversible Type I form with hysteresis. This result confirmed that mesopores were formed accessible from micropores.

In order to realize more precise characterization, the pore volume of polymer compounds according to the present invention was measured using a specific surface area and pore analyzer (ASAP2020, Micromeritics, GA, USA). At this time, the polymer compounds were transferred to pre-weighed analytic tubes which were capped with Transeal™ to prevent permeation of oxygen and atmospheric moisture during transfers and weighing. The polymer compounds were evacuated under dynamic vacuum up to 300° C. until an outgas rate was less than 2 mTorr/min. The results are shown in Table 3 below.

Specific surface area and total pore volume were calculated by measuring nitrogen adsorption degree until saturated pressure ($P/P_o=1$) by the $cm^3/g$ unit and using liquefied nitrogen at 77K through Equations 1 to 2 well-known as Brunauer-Emmett-Teller (BET) within $0.05<P/P_o<0.3$.

$$\frac{1}{v[(P_0/P)-1]} = \frac{c-1}{v_m c}\left(\frac{P}{P_0}\right) + \frac{1}{v_m c} \qquad \text{Equation 1}$$

In the Equation 1, P is balance pressure of gas, $P_0$ is saturated pressure of gas, v is quantity of gas adsorbed, vm is quantity of gas adsorbed at single phase at adsorption temperature, and c is BET constant of Equation 2.

$$c = \exp\left(\frac{E_1 - E_L}{RT}\right) \qquad \text{Equation 2}$$

In the Equation 2, $E_1$ is adsorption heat at first phase, and $E_L$ is adsorption heat beyond second phase, R is a gas constant, and T is measuring temperature.

TABLE 3

| sample | Maximum adsorption quantity ($cm^3/g$ [STP]) | BET surface area ($m^2/g$) | total pore volume at a single point ($cm^3/g$ [STP]) |
|---|---|---|---|
| Ex. 1 | 3.58 | 2.73 | 0.002 |
| Ex. 2 | 16.9 | 31.47 | 0.023 |
| Ex. 3 | 219.2 | 661.5 | 0.335 |
| Ex. 4 | 236.7 | 638.2 | 0.309 |
| Ex. 5 | 185.5 | 545.5 | 0.283 |
| Ex. 6 | 24.8 | 59.78 | 0.036 |
| Ex. 7 | 195.9 | 556.1 | 0.290 |
| Ex. 8 | 174.4 | 492.0 | 0.257 |
| Ex. 9 | 145.8 | 409.9 | 0.223 |
| Ex. 10 | 173.2 | 532.9 | 0.266 |
| Ex. 11 | 209.5 | 592.8 | 0.297 |
| Ex. 12 | 163.9 | 457.6 | 0.239 |
| Ex. 13 | 142.8 | 352.8 | 0.213 |
| Ex. 20 | 89.2 | 76.4 | 0.096 |
| Ex. 21 | 117.6 | 92.7 | 0.141 |
| Comp. Ex. 1 | 23.4 | 9.97 | 0.018 |
| Comp. Ex. 2 | 68.6 | 44.8 | 0.072 |
| Comp. Ex. 3 | 14.7 | 27.9 | 0.19 |

As can be seen from Table 3, the BET surfaces area of Example 3 are markedly large for polymers, 661.5 $m^2\ g^{-1}$, total pore volume at a single point are 0.335 $cm^3\ g^{-1}$. It indicates the presence of substantial amount of free volume.

Experimental Example 6

Positron Annihilation Lifetime Spectroscopy (PALS) Measurements

The PALS measurements were performed in nitrogen at ambient temperature using an automated EG&G Ortec fast-fast coincidence spectrometer. The timing resolution of the system was 240 ps. The polymer films were stacked to a thickness of 1 mm on either side of a 22Na—Ti foil source. There was no source correction needed for the Ti foil (thickness 2.5 μm). Each spectrum consisted of approximately 10 million integrated counts. The spectra were modeled as the sum of three decaying exponentials or as a continuous distribution. The shortest lifetime, $\tau_1$, was fixed at 0.125 ns, which is characteristic of para-positronium self-annihilation. The second lifetime, $\tau_2$, was approximately 0.35-0.45 ns for all samples, characteristic of free and trapped positrons. The longer lifetime, $\tau_3$, was >1 ns and attributed to annihilations of o-Ps in the free volume elements of the polymer.

Positron annihilation lifetime spectroscopy (PALS) is an instrument measuring 0.511 MeV of 2-γ signals regarding β+ positron disappearance by combining with electron in the pore. β+ positron is emitted during radioisotope decay of $^{22}Na$ to $^{22}Ne$. The size of pore can be calculated through Equation 3 using disappearance time of 0.511 MeV of 2-γ signals.

$$\tau_{o-Ps} = \frac{1}{2}\left[1 - \frac{R}{R+\Delta R} + \frac{1}{2\pi}\sin\left(\frac{2\pi R}{R+\Delta R}\right)\right]^{-1} \qquad \text{Equation 3}$$

In the Equation 3, $\tau_{o-Ps}$ is disappearance time of positron (ns), R is pore size, and $\Delta R$ is empirical parameter of the supposition that the pore is sphere.

Figure 10:
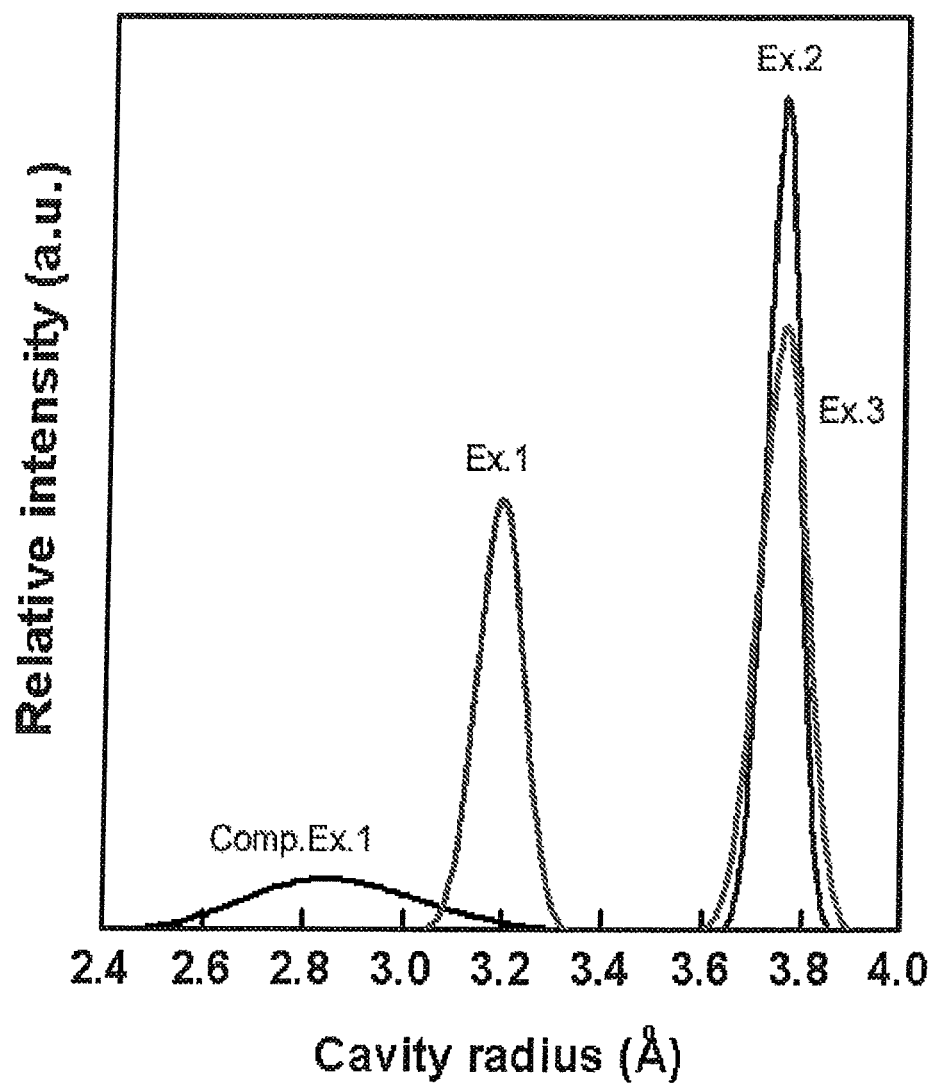
FIG. 10 is a graph showing cavity radius distribution of Examples 1 to 3 and Comparative Example 1 measured by PALS.

The results thus obtained are shown in FIG. 10 and Table 4.

TABLE 4

| Polymers | Intensity I3 [%] | Lifetime [$\tau_3$/ns] | FWHM* | Treated Temperature [° C.] |
|---|---|---|---|---|
| Ex. 1 | 4.6 | 2.3 | 0.14 | 350 |
| Ex. 2 | 14.3 | 3.2 | 0.12 | 400 |
| Ex. 3 | 8.0 | 3.3 | 0.17 | 450 |
| Comp. Ex. 1 | 2.0 | 2.0 | 0.48 | 300 |

*FWHM, full width at half maximum from the o-PS lifetime τ3 distribution

FIG. 10 is a graph showing cavity radius distribution of Examples 1 to 3 and Comparative Example 1 measured by PALS.

Micropore size and uniformity can be seen from FIG. 10 and Table 4. Polymer compound of Comparative Example 1 has wide distribution area and small quantity of pore as conventional polymers. But polymer compound of Example 1 has narrow distribution area and large quantity of pore size of about 3.2 Å. And polymer compounds of Examples 2 to 3 have narrow distribution area and large quantity of pore size of 3.7-3.8 Å generated by thermal conversion. The reason why the numbers of pores decrease in Example 3 rather than Example 2 is that the pores are linked to each other at a higher thermal conversion temperature, and explains the connectivity of the micropores.

Experimental Example 7

Gas Permeability Measurements

In order to ascertain gas permeability and selectivity of Examples 1 to 11, 14 to 18, 20 to 30 and Comparative Examples 1 to 10, the following processes were performed using a high-vacuum time-lag apparatus (the calibrated downstream volume was 30 $cm^3$, the upstream and the downstream pressures were measured using a Baratron transducer with a full scale of 33 and 0.002 atm, respectively). The results are shown in Table 5 and FIGS. 11 and 12.

All pure gas permeation tests were performed at 35° C. more than five times, and the standard deviation from the mean values of the permeabilities was within ±2%. The sample-to-sample reproducibility was very good, within ±5%. The effective area of the membranes was 4.00 $cm^2$.

For theses pure gases, it is possible to measure either the volume of permeate at fixed pressure or the rate of rise of permeate pressure in a fixed receiver volume. The pressure at permeate, $p_2$, has very small value (<2 Torr) while the pressure at inlet, $p_1$, is atmospheric pressure or more. While pressure at permeate side was measured by recording of $p_2$ versus time (sec), it is capable of approximating the permeabilities of gas molecules through the thin films. The permeability coefficient of A molecules, $P_A$, can be calculated from the rate at which the downstream pressure increases in the fixed permeate volume at the steady state as follows;

$$P_A = \frac{Vl}{p_1 ART}\left(\frac{dp_2}{dt}\right)_{ss}$$ Equation 4 where V is the volume of fixed downstream receiver, l is the film thickness, A is the film area, $p_1$ and $p_2$ are the pressures in the upstream and downstream, respectively, R, T and t are the gas constant, temperature and time, respectively.

TABLE 5

| | $H_2$ permeability (GPU) | $O_2$ permeability (GPU) | $CO_2$ permeability (GPU) | $O_2/N_2$ selectivity | $CO_2/CH_4$ selectivity |
|---|---|---|---|---|---|
| Ex. 1 | 60.9 | 5.5 | 23.6 | 6.9 | 26.2 |
| Ex. 2 | 372.4 | 59.8 | 296.9 | 5.1 | 61.2 |
| Ex. 3 | 2855.9 | 776.1 | 3575.3 | 5 | 44.3 |
| Ex. 4 | 8867.5 | 1547.2 | 5963.2 | 6.5 | 40.7 |
| Ex. 5 | 443.5 | 92.8 | 596.9 | 4.7 | 40.5 |
| Ex. 6 | 91.2 | 14.3 | 72.79 | 6.1 | 58.2 |
| Ex. 7 | 634.9 | 148.2 | 951.8 | 4.4 | 40.7 |
| Ex. 8 | 356.4 | 81.4 | 468.6 | 5.4 | 45.5 |
| Ex. 9 | 2560 | 524.5 | 1251.3 | 5.9 | 61.4 |
| Ex. 10 | 495.3 | 84.4 | 442 | 4.5 | 37.2 |
| Ex. 11 | 4671.3 | 900.6 | 4111.5 | 5.5 | 62.5 |
| Ex. 14 | 1231 | 236.5 | 912.3 | 5.8 | 61.6 |
| Ex. 15 | 1061.5 | 250.1 | 759.3 | 4.5 | 37.2 |
| Ex. 16 | 941.8 | 203.3 | 701.9 | 4.6 | 41.3 |
| Ex. 17 | 738 | 82.4 | 295.1 | 6.8 | 89.4 |
| Ex. 18 | 445.4 | 82.1 | 392.2 | 4.4 | 31.3 |
| Ex. 20 | 53 | 3.5 | 12 | 8.3 | 54.5 |
| Ex. 21 | 135.4 | 39.7 | 171.4 | 6.5 | 49.1 |
| Ex. 22 | 742.3 | 122.1 | 461.7 | 5.5 | 38.5 |
| Ex. 23 | 491.6 | 107 | 389.1 | 4.2 | 19.5 |
| Ex. 24 | 300.1 | 59.7 | 314.4 | 5.5 | 40.3 |
| Ex. 25 | 350.4 | 89.6 | 451.3 | 5.6 | 41 |
| Ex. 26 | 2699.8 | 650.1 | 2604.1 | 5.4 | 30.2 |
| Ex. 27 | 752.1 | 150.4 | 429.5 | 5.5 | 23 |
| Ex. 28 | 192.7 | 12.5 | 251.9 | 4.9 | 28.6 |
| Ex. 29 | 8.6 | 2.2 | 11.4 | 5.7 | 38.2 |
| Ex. 30 | 294.2 | 106.6 | 388.9 | 4.2 | 19.4 |
| Comp. Ex. 1 | 35.2 | 2.6 | 9.9 | 7.2 | 123.4 |
| Comp. Ex. 2 | 14.3 | 1.8 | 8.5 | 6.5 | 48.2 |
| Comp. Ex. 3 | 206.8 | 22.7 | 80.2 | 5.9 | 38 |
| Comp. Ex. 4 | 12.2 | 0.8 | 1.8 | 13 | 110.7 |
| Comp. Ex. 5 | 42.8 | 3.7 | 17 | 6.8 | 79.5 |
| Comp. Ex. 6 | 11.1 | 0.6 | 1.43 | 6.6 | 47.4 |
| Comp. Ex. 7 | 14.3 | 0.7 | 2.7 | 7.7 | 90.6 |
| Comp. Ex. 8 | 534 | 383 | 1820 | 4.7 | — |
| Comp. Ex. 9 | 248 | 34.8 | 128 | 11.5 | — |
| Comp. Ex. 10 | 4973.9 | 401.5 | 1140.7 | 7.65 | 50.2 |

FIGS. 11 and 12 are the graphs comparing oxygen permeability (Barrer), oxygen/nitrogen selectivity and carbon dioxide permeability (Barrer) and carbon dioxide/methane selectivity for flat films prepared in Examples 1 to 11, 14 to 18, 20 to 30 of the present invention and Comparative Examples 1 to 10 (the numbers 1 to 11, 14 to 18, 20 to 30 indicate Examples 1 to 11, 14 to 18, 20 to 30, respectively; and the numbers Comp. 1 to Comp. 10 indicate Comparative Examples 1 to 10, respectively).

In the two plots, these microporous materials of the present invent showed superior gas permeabilities with proper selectivities due to the well-organized free volumes of these polymers, and most of them exceeded the conventional polymeric upperbounds well-known to an imaginary limitation for certain gas mixtures [L. M. Robeson, Correlation of separation factor versus permeability for polymeric membrane, J. Membr. Sci., 1991, 62, 165, L. M. Robeson, The upper bound revisited, J. Membr. Sci., 2008, 320, 390].

Experimental Example 8

Fractional Free Volume

The fractional free volume of the precursor and polymer compounds was measured. Density of polymer is related with degree of free-volume, has an influence on transmittance. First, density of the membranes was measured by a buoyancy method using a Sartorius LA 310S analytical balance in accordance with Equation 5.

$$\rho_P = \frac{\omega_a}{\omega_a - \omega_\omega} \times \rho_\omega$$ Equation 5

In the Equation 5, $\rho_P$ is density of polymer, $\rho_\omega$ is density of deionized water, $\omega_a$ is weight of polymer measured in the air, $\omega_\omega$ is weight of polymer measures in the deionized water.

The fractional free volume (FFV, Vf) was calculated from the data in accordance with Equation 6 below [W. M. Lee. Selection of barrier materials from molecular structure. Polym Eng Sci. 1980; 20:65-9].

$$FFV = \frac{V - 1.3Vw}{V}$$ Equation 6 wherein V is the polymer specific volume and Vw is the specific Van der Waals volume. The Van der Waals volume was estimated by a Cerius 4.2 program using a synthia module based on the work of J. Bicerano [J. Bicerano. Prediction of polymer properties, Third Edition. Marcel Dekker Inc. 2002].

The d-spacing was calculated in accordance with Bragg's equation from X-ray diffraction pattern results.

TABLE 6

| sample | Density (g/cm³) | Volume (V, cm³/g) | $V_w$ (cm³/g) | FFV ($V_f$) | Increment in FFV (%) | d-spacing (nm) |
|---|---|---|---|---|---|---|
| Comp. Ex.1 | 1.503 | 0.665 | 0.430 | 0.159 | 65 | 0.548 |
| Ex.3 | 1.293 | 0.773 | 0.439 | 0.263 | | 0.600 |
| Comp. Ex.7 | 1.453 | 0.688 | 0.459 | 0.134 | 64 | 0.546 |
| Ex.5 | 1.271 | 0.787 | 0.473 | 0.219 | | 0.606 |
| Comp. Ex.4 | 1.469 | 0.681 | 0.455 | 0.131 | 57 | 0.503 |
| Ex.6 | 1.304 | 0.767 | 0.469 | 0.205 | | 0.611 |
| Comp. Ex.5 | 1.478 | 0.677 | 0.443 | 0.148 | 28 | 0.560 |
| Ex.7 | 1.362 | 0.734 | 0.457 | 0.190 | | 0.698 |
| Comp. Ex.6 | 1.482 | 0.675 | 0.457 | 0.120 | 102 | 0.539 |
| Ex.8 | 1.240 | 0.806 | 0.470 | 0.243 | | 0.602 |
| Comp. Ex.3 | 1.475 | 0.678 | 0.373 | 0.172 | 64 | 0.576 |
| Ex.10 | 1.406 | 0.711 | 0.610 | 0.282 | | 0.634 |

As can be seen from Table 6, porosity in the polymer matrix of the present invention greatly increased from the result that Vf of Example 3, 5 to 8, 10 compared with Comparative Examples 1, 3 to 7 increased 28% to 102% due to the decrease in density of Example 3, 5 to 8, 10 after thermal treatment.

What is claimed is:

1. A co-polymer compound comprising at least one repeating unit represented by the following Formulae in Group A and at least one repeating unit represented by the following Formula in Group B:

Group A:

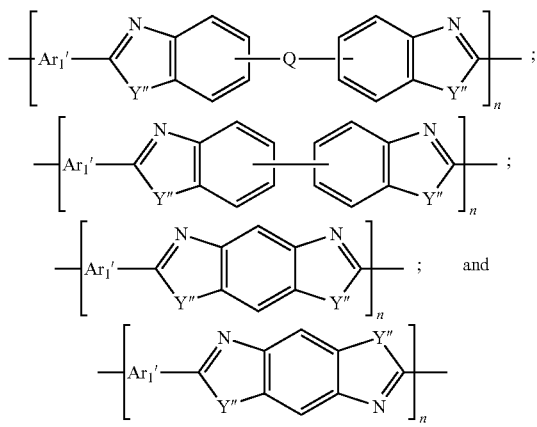

Group B:

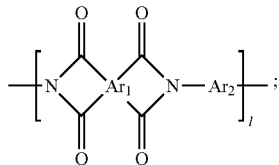

wherein $Ar_1$ is a tetravalent $C_5$-$C_{24}$ arylene group or a tetravalent $C_5$-$C_{24}$ heterocyclic ring, which is substituted or unsubstituted with at least one substituent selected from the group consisting of $C_1$-$C_{10}$ alkyl, $C_1$-$C_{10}$ alkoxy, $C_1$-$C_{10}$ haloalkyl and $C_1$-$C_{10}$ haloalkoxy, or two or more of which are fused together to form a condensation ring or covalently bonded to each other via a functional group selected from the group consisting of O, S, C(=O), CH(OH), S(=O)$_2$, Si(CH$_3$)$_2$, (CH$_2$)$_p$ (in which $1 \leq p \leq 10$), (CF$_2$)$_q$ (in which $1 \leq q \leq 10$), C(CH$_3$)$_2$, C(CF$_3$)$_2$ and C(=O)NH;

$Ar_1'$ is a bivalent $C_5$-$C_{24}$ arylene group or a bivalent $C_5$-$C_{24}$ heterocyclic ring, which is substituted or unsubstituted with at least one substituent selected from the group consisting of $C_1$-$C_{10}$ alkyl, $C_1$-$C_{10}$ alkoxy, $C_1$-$C_{10}$ haloalkyl and $C_1$-$C_{10}$ haloalkoxy, or two or more of which are fused together to form a condensation ring or covalently bonded to each other via a functional group selected from the group consisting of O, S, C(=O), CH(OH), S(=O)$_2$, Si(CH$_3$)$_2$, (CH$_2$)$_p$ (in which $1 \leq p \leq 10$), (CF$_2$)$_q$ (in which $1 \leq q \leq 10$), C(CH$_3$)$_2$, C(CF$_3$)$_2$ and C(=O)NH;

$Ar_2$ is a bivalent $C_5$-$C_{24}$ arylene group or a bivalent $C_5$-$C_{24}$ heterocyclic ring, which is substituted or unsubstituted with at least one substituent selected from the group consisting of $C_1$-$C_{10}$ alkyl, $C_1$-$C_{10}$ alkoxy, $C_1$-$C_{10}$ haloalkyl and $C_1$-$C_{10}$ haloalkoxy, or two or more of which are fused together to form a condensation ring or covalently bonded to each other via a functional group selected from the group consisting of O, S, C(=O), CH(OH), S(=O)$_2$, Si(CH$_3$)$_2$, (CH$_2$)$_p$ (in which $1 \leq p \leq 10$), (CF$_2$)$_q$ (in which $1 \leq q \leq 10$), C(CH$_3$)$_2$, C(CF$_3$)$_2$ and C(=O)NH, provided that $Ar_1'$ and $Ar_2$ are different if either $Ar_1'$ or $Ar_2$ is $C_6H_4$, and wherein the other end of $Ar_2$ is bonded to a nitrogen atom;

Q is O, S, C(=O), CH(OH), S(=O)$_2$, Si(CH$_3$)$_2$, (CH$_2$)$_p$ (in which $1 \leq p \leq 10$), (CF$_2$)$_q$ (in which $1 \leq q \leq 10$), C(CH$_3$)$_2$, C(CF$_3$)$_2$, C(=O)NH, C(CH$_3$)(CF$_3$), $C_1$-$C_6$ alkyl-substituted phenyl or $C_1$-$C_6$ haloalkyl-substituted phenyl in which Q is linked to opposite both phenyl rings in the position of m-m, m-p, p-m or p-p;

Y" is —O or S;

n is an integer from 10 to 400; and l is an integer from 10 to 400.

2. The co-polymer compound according to claim 1, wherein $Ar_1$ is selected from the following compounds:

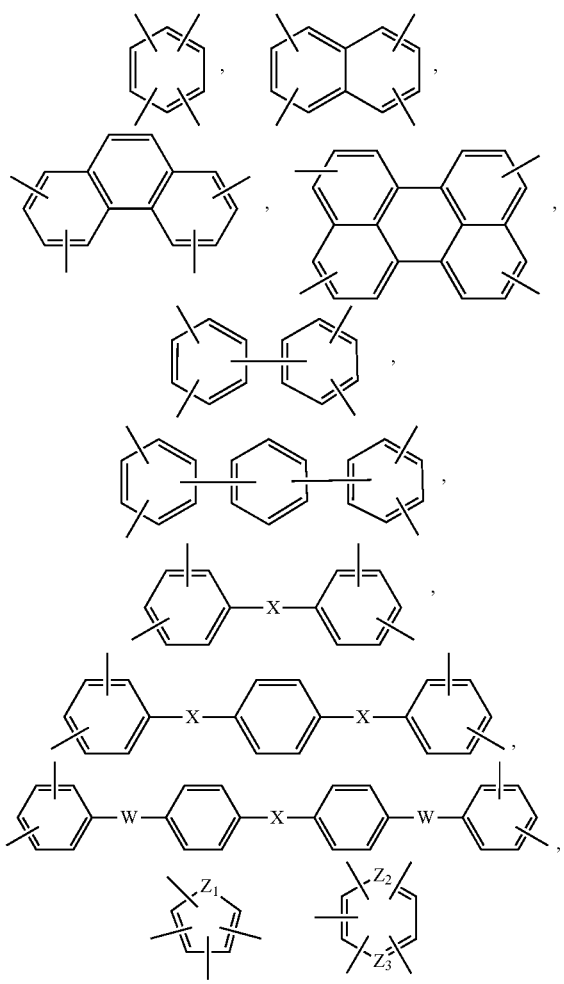

wherein X is O, S, C(=O), CH(OH), S(=O)$_2$, Si(CH$_3$)$_2$, (CH$_2$)$_p$ (in which $1 \leq p \leq 10$), (CF$_2$)$_q$ (in which $1 \leq q \leq 10$), C(CH$_3$)$_2$, C(CF$_3$)$_2$, or C(=O)NH; W is O, S or C(=O); and $Z_1$, $Z_2$ and $Z_3$ are identical to or different from each other and are O, N or S.

3. The co-polymer compound according to claim 1, wherein $Ar_1$ is selected from the following compounds:

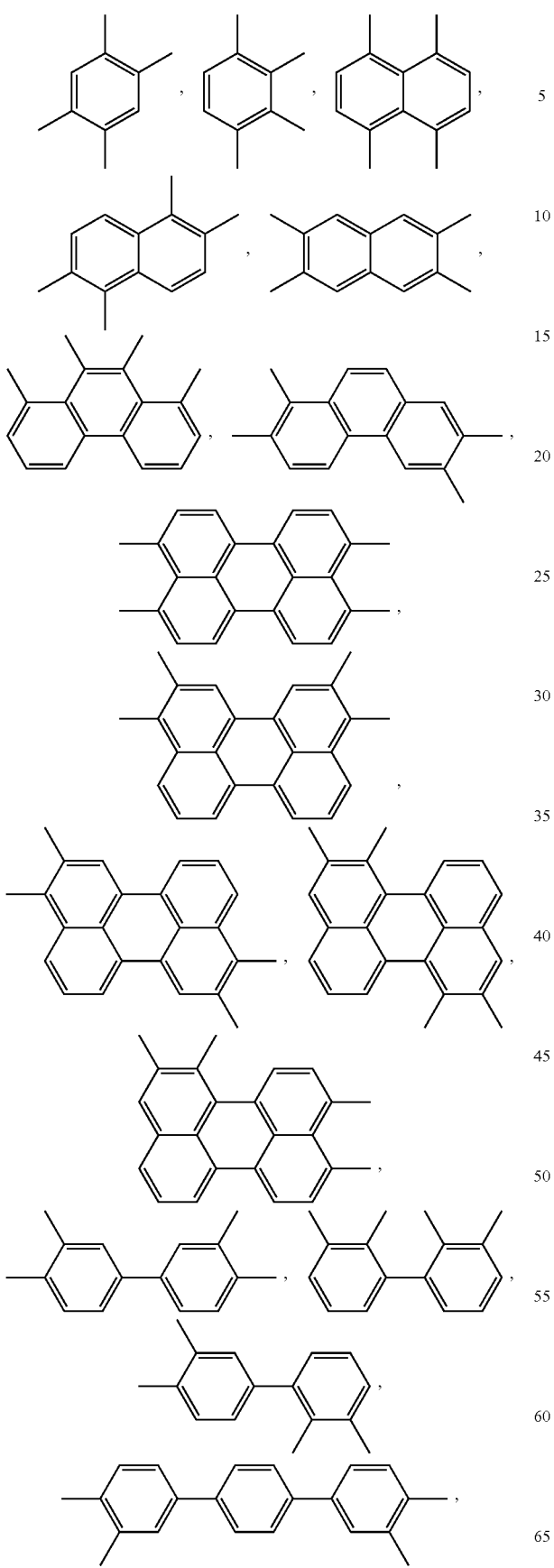
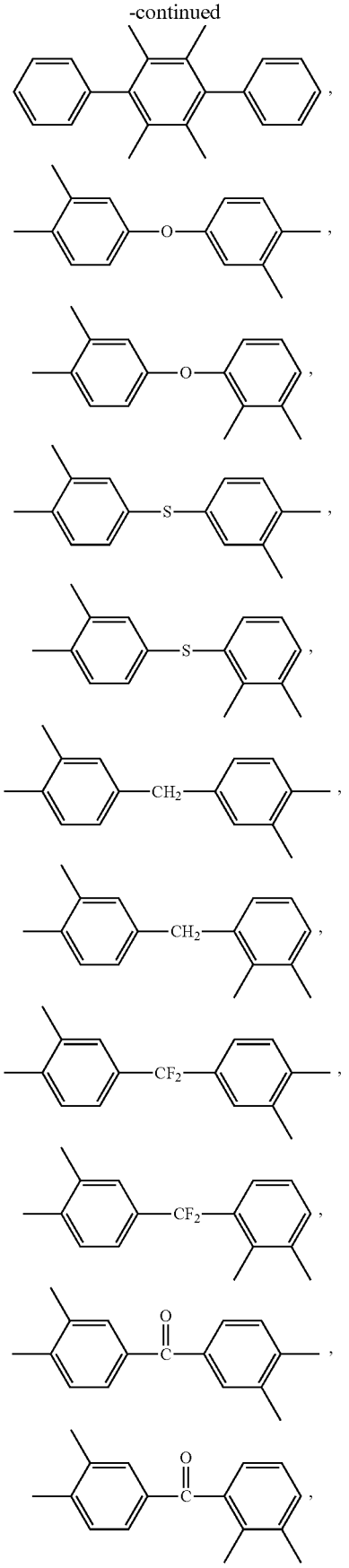

-continued
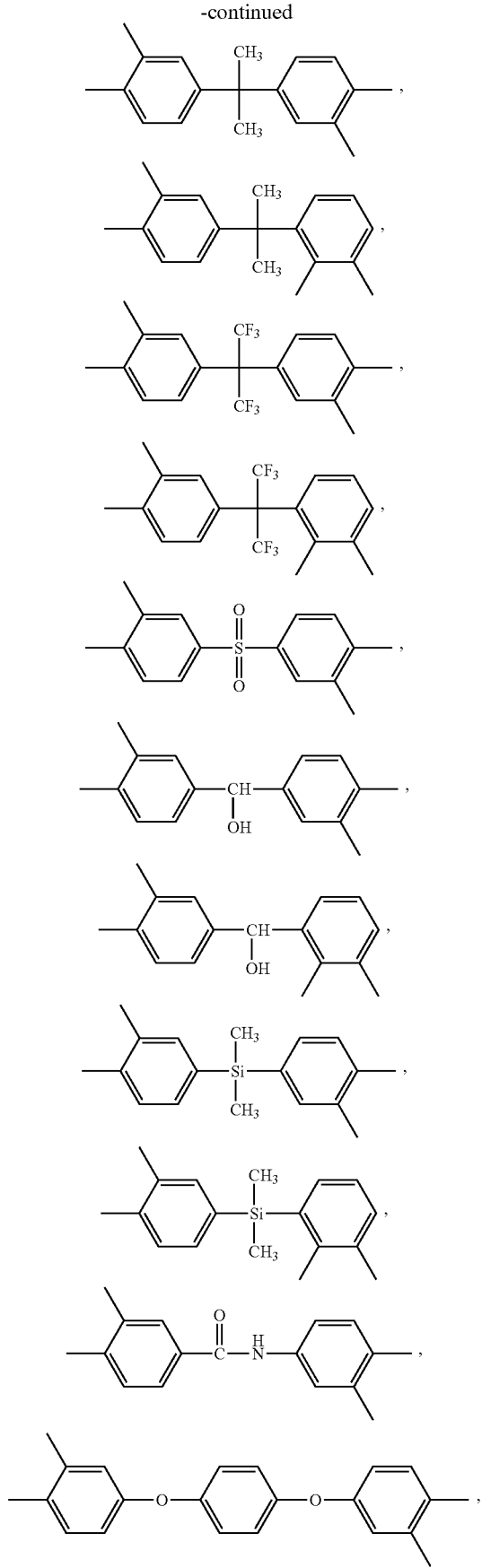
-continued
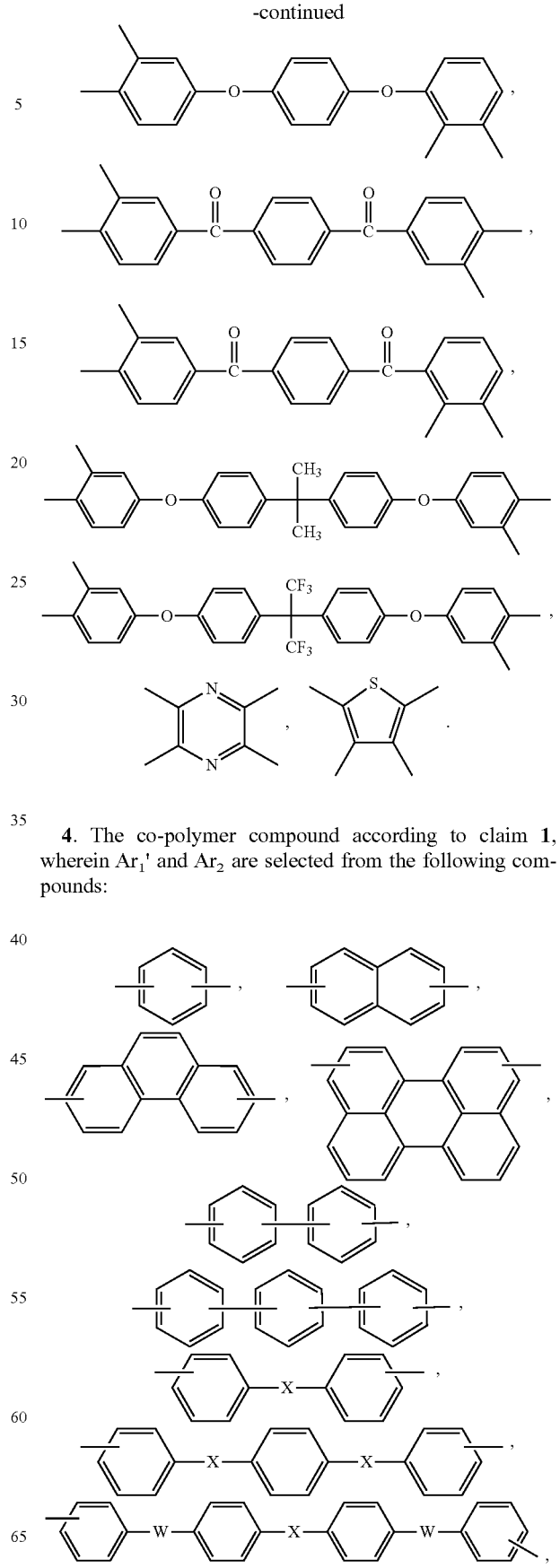
4. The co-polymer compound according to claim 1, wherein $Ar_1'$ and $Ar_2$ are selected from the following compounds:

-continued
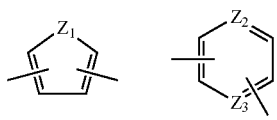
wherein X is O, S, C(=O), CH(OH), S(=O)$_2$, Si(CH$_3$)$_2$, (CH$_2$)$_p$ (in which $1 \leq p \leq 10$), (CF$_2$)$_q$ (in which $1 \leq q \leq 10$), C(CH$_3$)$_2$, C(CF$_3$)$_2$, or C(=O)NH; W is O, S or C(=O); and Z$_1$, Z$_2$ and Z$_3$ are identical to or different from each other and are O, N or S.
5. The co-polymer compound according to claim 1, wherein Ar$_1$' and Ar$_2$ are selected from the following compounds:
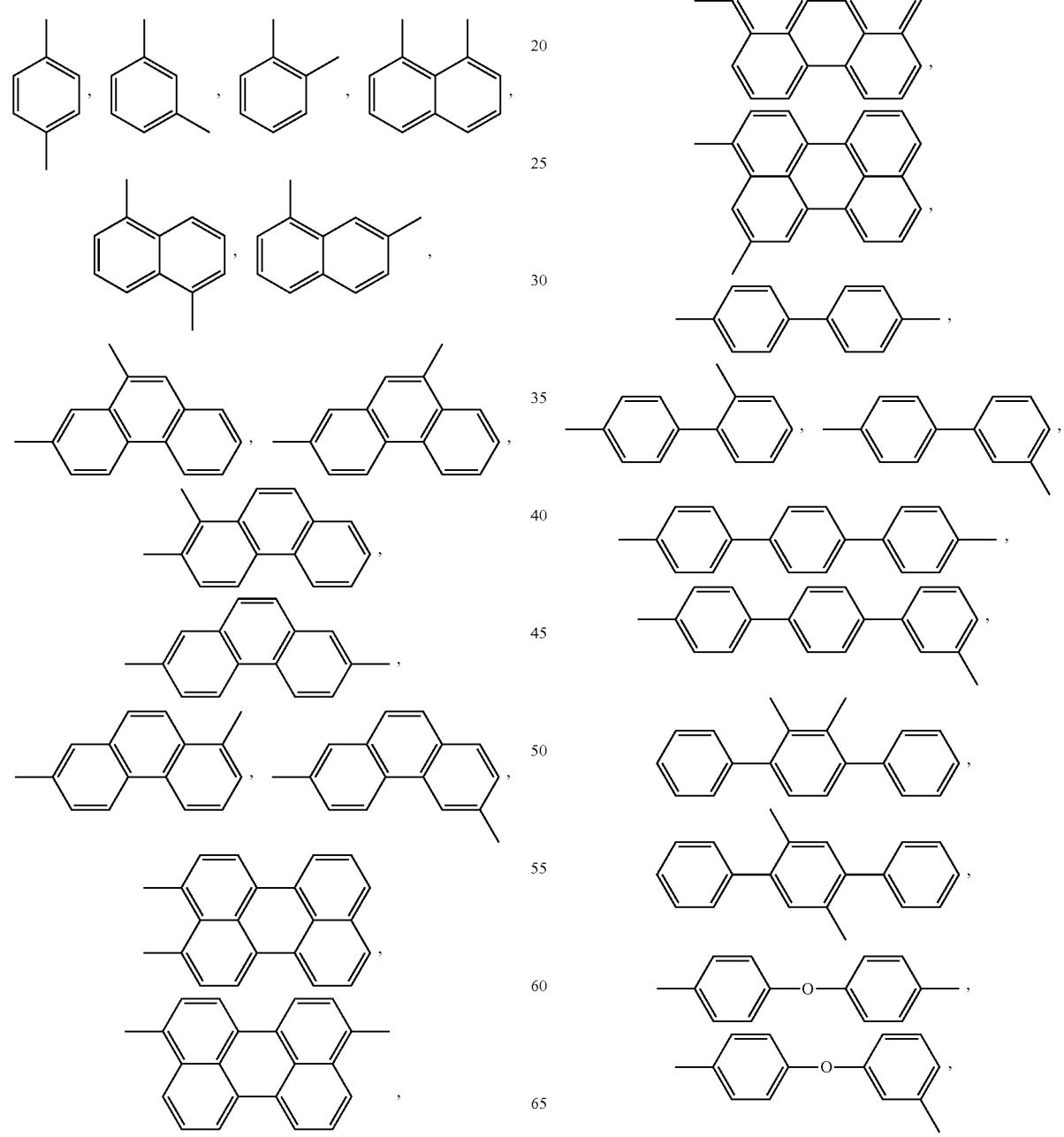

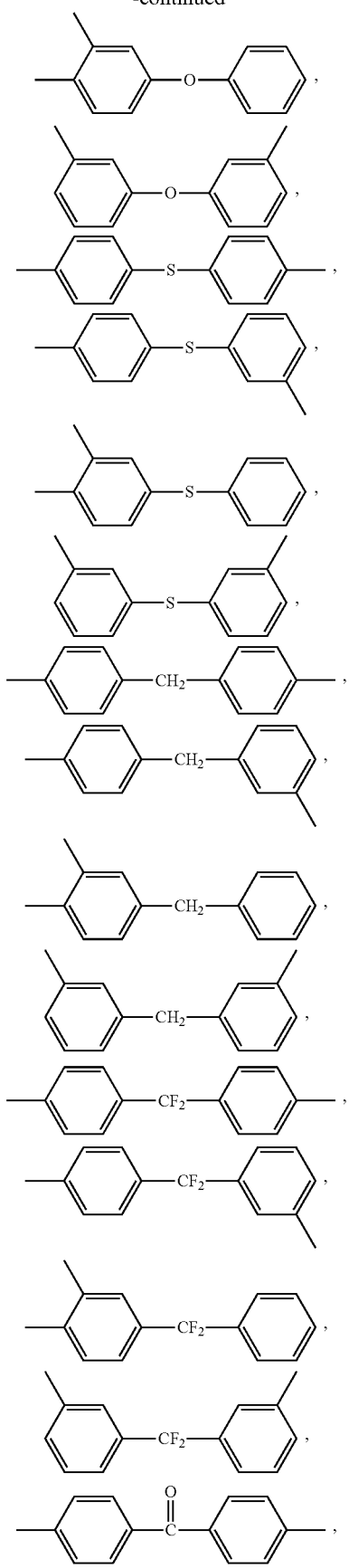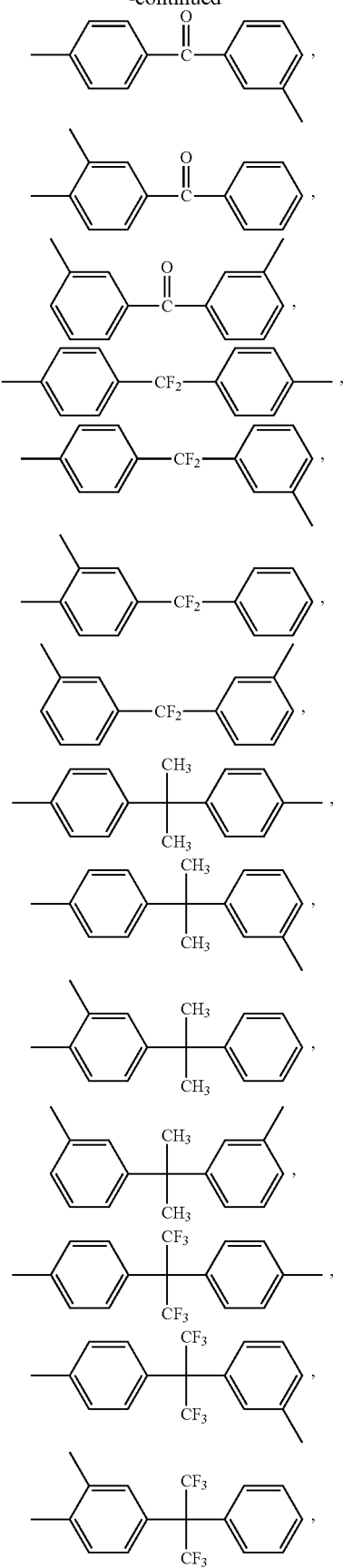

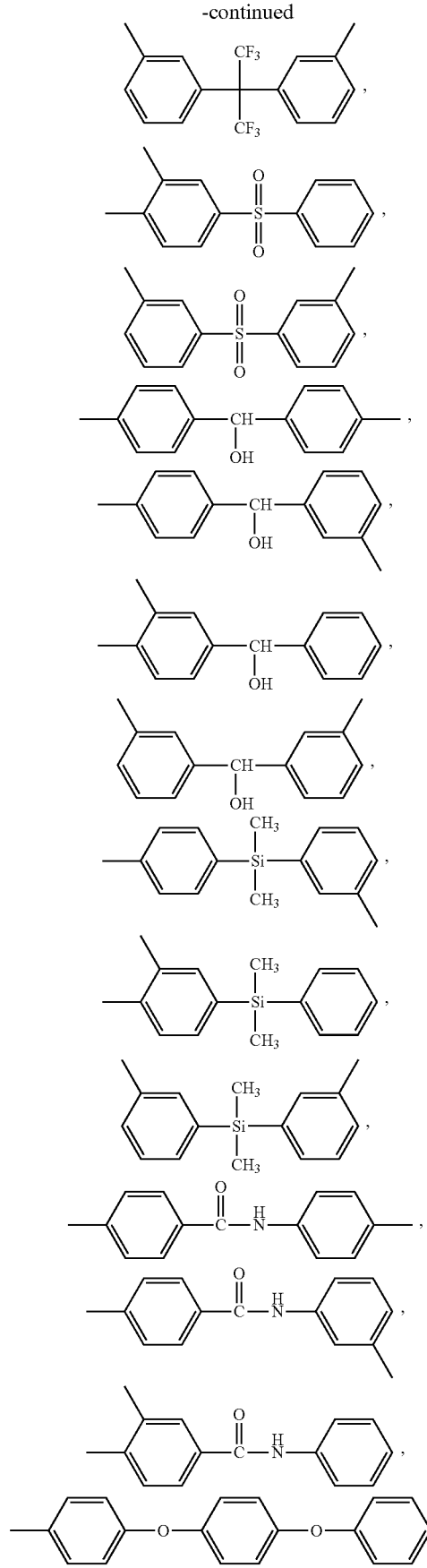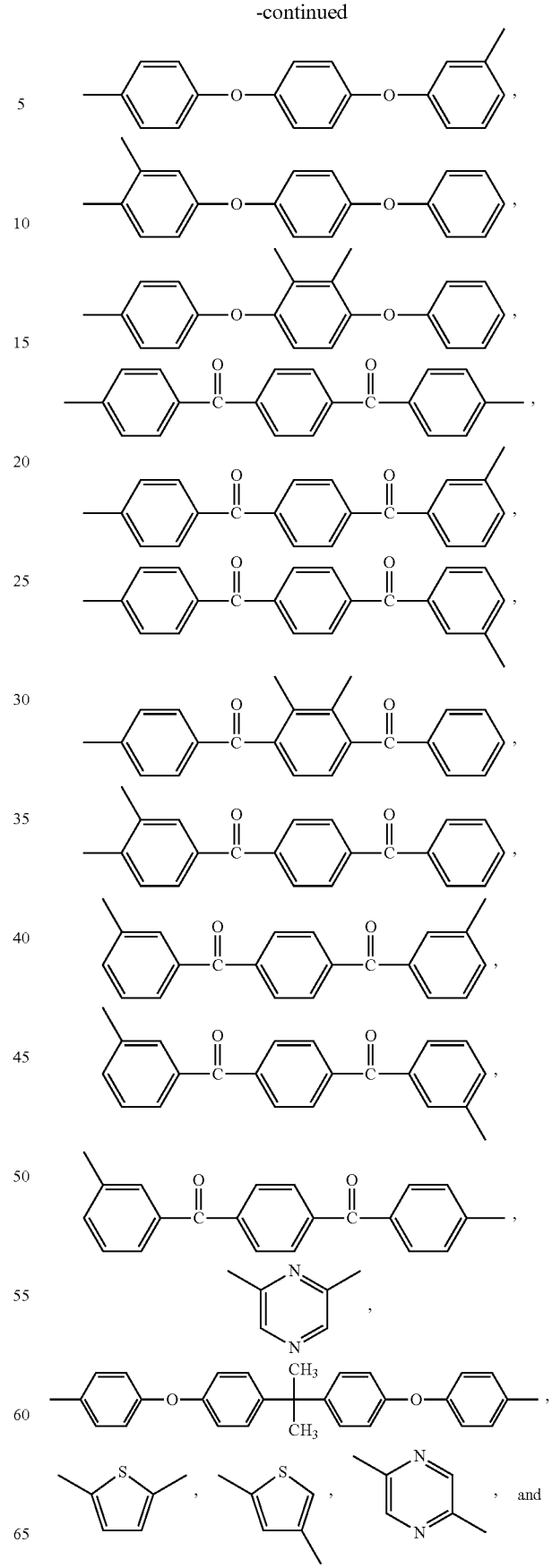

-continued

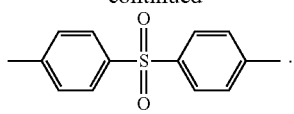

6. The co-polymer compound according to claim 1, wherein Q is selected from the group consisting of $CH_2$, $C(CH_3)_2$, $C(CF_3)_2$, O, S, $S(=O)_2$ and $C(=O)$.

7. The co-polymer compound according to claim 1, wherein $Ar_1$ is

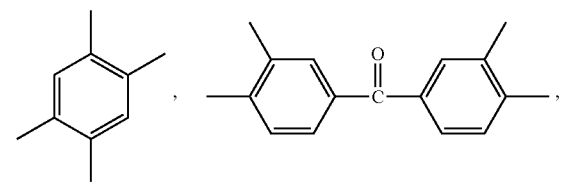

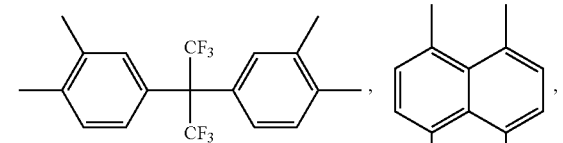

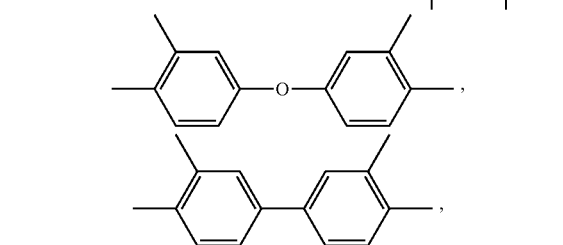

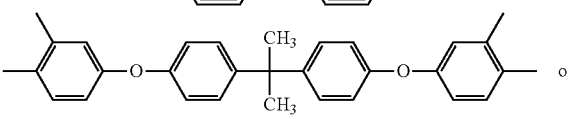

$Ar_1'$ is

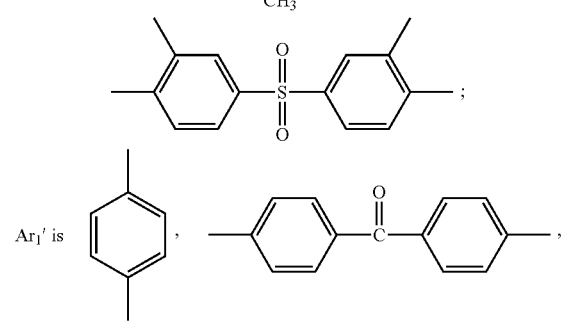

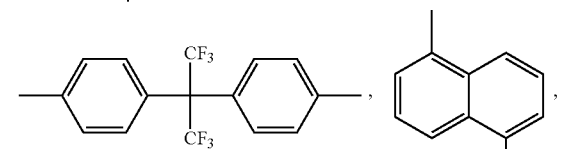

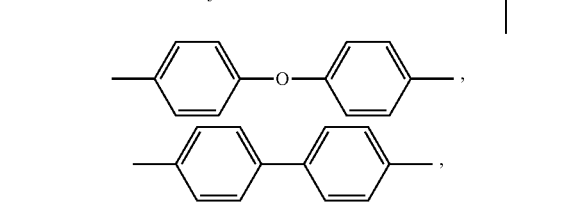

-continued

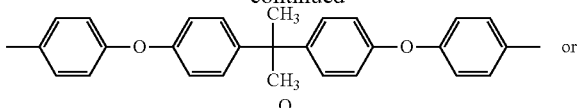

$Ar_2$ is

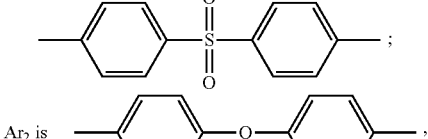

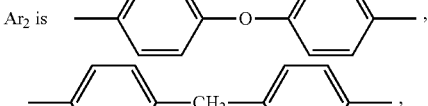

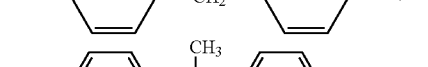

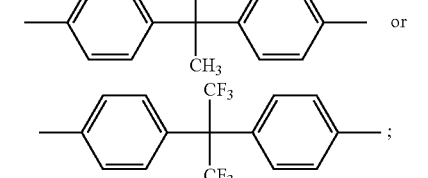

and

Q is $C(CF_3)_2$.

8. The co-polymer compound according to claim 1, wherein the co-polymer compound is treated by an acidic dopant.

9. The co-polymer compound according to claim 8, wherein the acidic dopant is selected from the group consisting of sulfuric acid, hydrochloric acid, phosphoric acid, nitric acid, $HBrO_3$, $HClO_4$, $HPF_6$, $HBF_6$, 1-methyl-3-methylimidazolium cation ($BMIM^+$) and mixtures thereof.

10. The co-polymer compound according to claim 1, wherein the co-polymer compound includes inorganic oxide selected from the group consisting of fumed silica, zirconium oxide, tetraethoxy silane, montmorillonite clay and mixtures thereof.

11. The co-polymer compound according to claim 1, wherein the co-polymer compound includes inorganic filler selected from the group consisting of phosphotungstic acid (PWA), phosphomolybdenic acid, silicotungstic acid (SiWA), molybdophosphoric acid, silicomolybdic acid, phosphotin acid, zirconium phosphate (ZrP) and mixtures thereof.

12. The co-polymer compound according to claim 1, wherein the co-polymer compound has a fractional free volume (FFV) of 0.18 to 0.40.

13. The co-polymer compound according to claim 1, wherein the co-polymer compound has a d-spacing of 0.58 to 0.80 nm.

14. The co-polymer compound according to claim 1, wherein the co-polymer compound has a cavity radius difference of 0.1 to 0.4 Å between maximum cavity radius and minimum cavity radius.

15. The co-polymer compound according to claim 1, wherein $Ar_2$ is selected from the group consisting of:

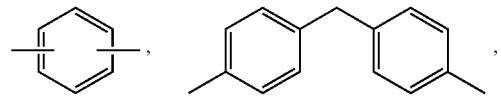

-continued
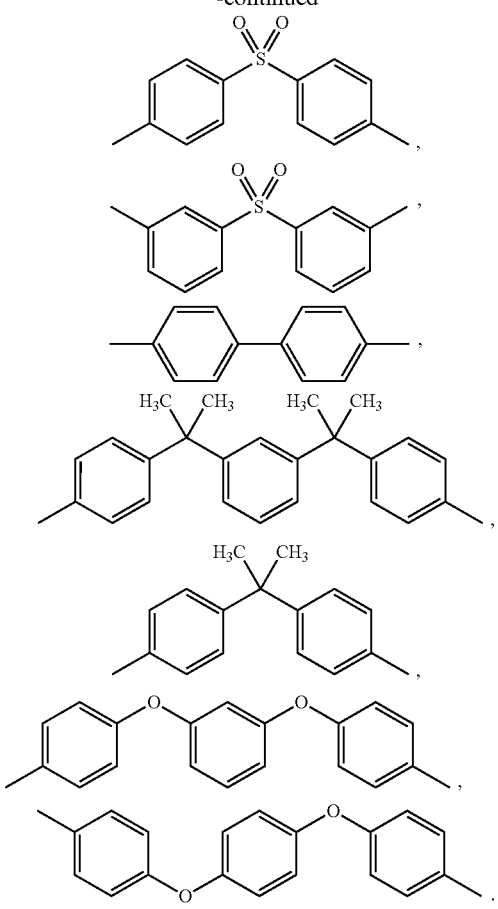
and
16. The co-polymer compound according to claim 1, wherein Ar$_2$ is selected from the group consisting of:
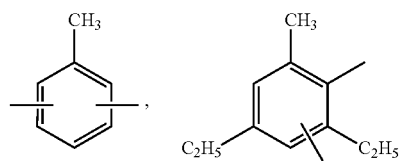
-continued
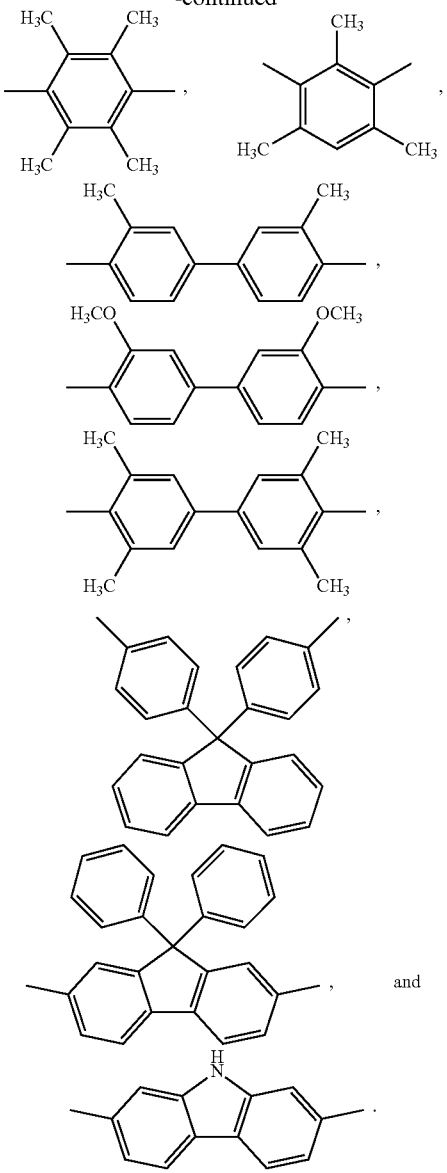
and
* * * * *